United States Patent
Hirayama et al.

(10) Patent No.: US 10,317,610 B2
(45) Date of Patent: Jun. 11, 2019

(54) ILLUMINATION DEVICE AND DISPLAY DEVICE

(71) Applicant: Sharp Kabushiki Kaisha, Osaka (JP)

(72) Inventors: Yoshinobu Hirayama, Osaka (JP); Shugo Yagi, Yonago (JP); Toru Inata, Yonago (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 18 days.

(21) Appl. No.: 15/105,537

(22) PCT Filed: Dec. 12, 2014

(86) PCT No.: PCT/JP2014/082932
§ 371 (c)(1),
(2) Date: Jun. 16, 2016

(87) PCT Pub. No.: WO2015/093396
PCT Pub. Date: Jun. 25, 2015

(65) Prior Publication Data
US 2016/0313496 A1     Oct. 27, 2016

(30) Foreign Application Priority Data
Dec. 18, 2013   (JP) ................................. 2013-261098

(51) Int. Cl.
*F21V 8/00*     (2006.01)
*G02F 1/1335*   (2006.01)
(Continued)

(52) U.S. Cl.
CPC ........... *G02B 6/0053* (2013.01); *G02B 6/005* (2013.01); *G02B 6/0036* (2013.01);
(Continued)

(58) Field of Classification Search
CPC .... G02B 6/0036; G02B 6/0038; G02B 6/005; G02B 6/0055; G02B 6/0058;
(Continued)

(56) References Cited

U.S. PATENT DOCUMENTS

2008/0008434 A1* 1/2008 Lee ....................... G02B 6/0036
                                                                385/129
2009/0122229 A1* 5/2009 Kim ...................... G02B 6/0038
                                                                 349/65

(Continued)

FOREIGN PATENT DOCUMENTS

JP            9-61631 A     3/1997
JP       2009-122637 A      6/2009
(Continued)

OTHER PUBLICATIONS

U.S. Appl. No. 15/107,902, filed Jun. 23, 2016.

*Primary Examiner* — Jessica M Merlin
(74) *Attorney, Agent, or Firm* — ScienBiziP, P.C.

(57) ABSTRACT

A backlight device is provided with: LEDs; a light guide plate having a light-receiving face, a light-exiting surface, and an opposite plate surface; a prism sheet that is disposed on the light-exiting side of the light guide plate and that includes a plurality of light-exiting side prisms aligned along a second direction; a light-exiting surface-side prism portion that is disposed in the light-exiting surface of the light guide plate and that includes a plurality of light-exiting surface-side prisms aligned along the second direction; a light emission reflection portion that is disposed in the opposite plate surface of the light guide plate and that includes a plurality of reflection units aligned along a first direction at an interval; and an opposite plate surface-side prism portion that is disposed in the opposite plate surface of the light
(Continued)

guide plate and that includes a plurality of opposite plate surface-side prisms aligned along the second direction.

13 Claims, 29 Drawing Sheets

(51) Int. Cl.
  *G02F 1/1333* (2006.01)
  *G02B 27/22* (2018.01)

(52) U.S. Cl.
  CPC ......... *G02B 6/0038* (2013.01); *G02B 6/0055* (2013.01); *G02B 6/0058* (2013.01); *G02B 6/0068* (2013.01); *G02B 6/0073* (2013.01); *G02B 6/0083* (2013.01); *G02B 6/0088* (2013.01); *G02B 6/0093* (2013.01); *G02F 1/13338* (2013.01); *G02F 1/133308* (2013.01); *G02F 1/133606* (2013.01); *G02B 27/2214* (2013.01); *G02F 2001/133331* (2013.01)

(58) Field of Classification Search
  CPC ............... G02B 6/0053; G02B 6/0068; G02B 6/0073; G02B 6/0083; G02B 6/0093; G02B 6/0088; G02B 27/2214; G02F 1/133606; G02F 1/13338; G02F 1/133308; G02F 2001/133331
  See application file for complete search history.

(56) References Cited

U.S. PATENT DOCUMENTS

| | | | |
|---|---|---|---|
| 2010/0165243 A1* | 7/2010 | Yoon | G02B 6/0053 349/62 |
| 2013/0170250 A1 | 7/2013 | Kikuchi et al. | |
| 2013/0194823 A1 | 8/2013 | Yagi et al. | |
| 2014/0146561 A1 | 5/2014 | Yuki et al. | |
| 2016/0320545 A1 | 11/2016 | Hirayama et al. | |

FOREIGN PATENT DOCUMENTS

| | | |
|---|---|---|
| JP | 2011-14442 A | 1/2011 |
| JP | 2012-104390 A | 5/2012 |
| JP | 2012-113890 A | 6/2012 |
| WO | 2012/050121 A1 | 4/2012 |

* cited by examiner

FIG. 15

| | Apex Angle Θv2 (°) of prism on light exiting surface side | Apex Angle Θv3 (°) of prism on opposite surface side | Relative Brightness (%) |
|---|---|---|---|
| Comparative Example 3 | — | — | 100.0 |
| Working Example 1 | 110 | 140 | 117.3 |
| Working Example 2 | 150 | 150 | 115.4 |
| Working Example 3 | 120 | 140 | 112.3 |
| Working Example 4 | 110 | 100 | 108.6 |
| Working Example 5 | 140 | 140 | 107.8 |
| Working Example 6 | 100 | 140 | 107.1 |
| Working Example 7 | 140 | 100 | 106.5 |
| Working Example 8 | 110 | 130 | 105.8 |

| | First location | | Second location | | Third location | | Fourth location | | Fifth location | |
|---|---|---|---|---|---|---|---|---|---|---|
| | Height Dimension of Unit Reflective Portion (μm) | Shape Reproducibility | Height Dimension of Unit Reflective Portion (μm) | Shape Reproducibility | Height Dimension of Unit Reflective Portion (μm) | Shape Reproducibility | Height Dimension of Unit Reflective Portion (μm) | Shape Reproducibility | Height Dimension of Unit Reflective Portion (μm) | Shape Reproducibility |
| Comparative Example 3 | 0.60 | Not Good | 0.81 | Not Good | 1.14 | Not Good | 1.72 | Not Good | 4.34 | Good |
| Working Example 1 | 3.05 | OK | 3.24 | Good | 3.53 | Good | 4.16 | Good | 6.13 | Good |

FIG. 17

| | Comparative Example 4 | Working Example 9 | Working Example 10 |
|---|---|---|---|
| Proportion of Planar Section (%) | 0 | 20 | 40 |
| Picture | | | |
| Uneven Brightness | Slightly Uneven | Almost Even | Completely Even |

FIG. 20

| | Angle of Tangent 20° | Angle of Tangent 30° | Angle of Tangent 40° | Angle of Tangent 60° | Angle of Tangent 70° |
|---|---|---|---|---|---|
| Picture | 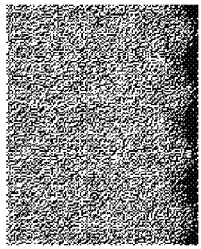 | 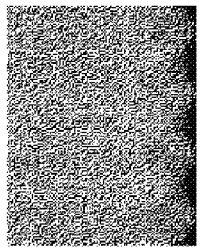 | 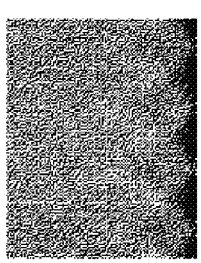 | 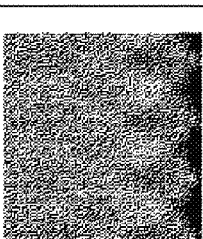 | 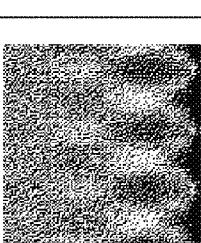 |
| Uneven Brightness | Uneven | Uneven | Even | Even | Even |
FIG. 24

ILLUMINATION DEVICE AND DISPLAY DEVICE

TECHNICAL FIELD

The present invention relates to an illumination device and a display device.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. In the liquid crystal display device, a liquid crystal panel used therein does not emit light, and therefore, it is necessary to separately provide a backlight device as an illumination device. Backlight devices are largely categorized into a direct-lighting type and an edge-lighting type depending on the mechanism thereof. Edge lit backlight devices include a light guide plate that guides light emitted from light sources disposed on the edge, and an optical member that applies optical effects on the light from the light guide plate and supplies the light as even planar light to the liquid crystal panel, and one known example thereof is the matter disclosed in Patent Document 1 below. Patent Document 1 discloses a configuration in which a light guide plate has a light focusing function by arranging a plurality of cylindrical lenses on the light-exiting surface of the light guide plate, and a prism sheet is disposed on the light-exiting surface.

RELATED ART DOCUMENT

Patent Document

Patent Document 1: WO 2012/050121

Problems to be Solved by the Invention

In Patent Document 1 mentioned above, a configuration is adopted in which the light focusing effect is heightened by the cylindrical lenses provided on the light-exiting surface of the light guide plate having the same light focusing direction as the prism sheet disposed on the light-exiting surface. However, if further improvement in luminance of the backlight device is needed, then there is a risk that the light focusing effect is insufficient with the configuration above, and there is room for improvement.

SUMMARY OF THE INVENTION

The present invention was completed in view of the above-mentioned situation, and an object thereof is to improve luminance.

Means for Solving the Problems

An illumination device of the present invention includes: a light source; a light guide plate having a rectangular plate shape, a light-receiving face formed from at least one of a pair of edge faces forming opposing sides among outer edge faces of the light guide plate and into which light emitted by the light source is radiated, a light-exiting surface formed from one plate surface of the light guide plate and from which light exits, and an opposite plate surface formed from another plate surface of the light guide plate; and a light-exiting side anisotropic light focusing member disposed on a light-exiting side of the light guide plate, the light-exiting side anisotropic light focusing member being formed by arranging a plurality of light-exiting side light focusing units that extend along a first direction in a second direction, the first direction being parallel to a pair of edge faces of the light guide plate that do not include the light-receiving face, and the second direction being perpendicular to the first direction; wherein the light guide plate further includes: a light-exiting surface-side anisotropic light focusing portion that is disposed in the light-exiting surface of the light guide plate, and that is formed by arranging a plurality of light-exiting surface-side light focusing units, extending in the first direction, along the second direction; a light emission reflection portion that is disposed in the opposite plate surface of the light guide plate and that is formed by arranging a plurality of reflection units, extending in the second direction, along the first direction with gaps therebetween; and an opposite plate surface-side anisotropic light focusing portion that is disposed in the opposite plate surface of the light guide plate, and that is formed by arranging a plurality of opposite plate surface-side light focusing units, extending in the first direction, along the second direction.

In this manner, light emitted from the light source enters the light-receiving face of the light guide plate, is propagated inside the light guide plate, and in the process is reflected by the light emission reflection portions disposed in the opposite plate surface of the light guide plate. The light emission reflection portions are formed by arranging a plurality of reflection units, extending in the second direction, along the first direction with gaps therebetween, and thus, by reflecting light traveling in the light guide plate along the first direction off of the plurality of reflection units, the light can be caused to travel upward towards the light-exiting surface. In this manner, it is possible to cause the light to be emitted from the light-exiting surface.

The light that has reached the light-exiting surface of the light guide plate is anisotropically focused by the light-exiting surface-side anisotropic light focusing portion disposed in the light-exiting surface of the light guide plate. In other words, the light-exiting surface-side anisotropic light focusing portion has a configuration in which a plurality of light-exiting surface-side light focusing units, extending along the first direction, are arranged in the second direction, and thus, the light emitted from the light-exiting surface-side light focusing units is selectively focused in the second direction, which is the direction along which the light-exiting surface-side light focusing units are aligned. The light emitted from the light-exiting surface is further anisotropically focused by the light-exiting side anisotropic light focusing portion disposed in the light-exiting side of the light guide plate. In other words, the light-exiting side anisotropic light focusing portion has a configuration in which a plurality of light-exiting side light focusing units, extending along the first direction, are arranged in the second direction, and thus, the light emitted from the light-exiting side light focusing unit is selectively focused in the second direction, which is the direction along which the light-exiting side light focusing units are aligned.

In this manner, the light emitted from the illumination device is first selectively focused in the second direction by the light-exiting surface-side anisotropic light focusing portion, and then selectively focused in the second direction by the light-exiting side anisotropic light focusing portion, causing the light to travel towards the front in an excellent manner. However, when the light that has been anisotropically focused by the light-exiting surface-side anisotropic light focusing portion has entered the light-exiting side anisotropic light focusing portion, there is still a lot of light that is retroreflected by the light-exiting side light focusing units, which means that the usage rate of light is not sufficiently high, which has meant that there is room for improvement in the luminance of light emitted by the illumination device.

However, the opposite plate surface-side anisotropic light focusing portion is disposed in the opposite plate surface of the light guide plate, and the opposite plate surface-side anisotropic light focusing portion has a configuration in which a plurality of opposite plate surface-side light focusing units, extending along the first direction, are arranged along the second direction, and thus, the light that was propagated in the light guide plate and has reached the opposite plate surface is selectively focused in the second direction, which is the direction along which the opposite plate surface-side light focusing units are aligned. The light that has been anisotropically focused at the opposite plate surface is caused to travel upward towards the light-exiting surface by the light emission reflection portions and then further selectively focused in the second direction by the light-exiting surface-side anisotropic light focusing portion at the light-exiting surface. In this manner, it is possible to include, in the light that was emitted from the light-exiting surface towards the light-exiting side anisotropic light focusing portion, a large portion of light that would be emitted by the light-exiting side light focusing units without being retroreflected. In this manner, the usage rate of light can be sufficiently increased, and it is possible to increase the luminance of light emitted by the illumination device. Furthermore, as a result of the opposite plate surface-side anisotropic light focusing portion being disposed in the opposite plate surface of the light guide plate, it is possible to decrease the number of parts required and to contribute to the thinning of the illumination device, compared to an arrangement whereby an anisotropic light focusing portion is added to the light-emitting side of the light guide plate.

As embodiments of the illumination device of the present invention, the following configurations are preferred.

(1) In the light emission reflection portion, the reflection units are constituted by a plurality of split reflection units that are arranged discontinuously along the second direction with gaps therebetween. In the reflection unit, the amount of light reflected tends to be proportional to the surface area thereof, and thus, in order to attain the necessary amount of light reflection, the surface area must be set accordingly. Here, if the reflection unit were to be formed so as to extend along the entire length of the light guide plate in the second direction, the dimension of the reflection unit in the direction normal to the plate surface of the light guide plate would need to be formed at or above a certain size in order to attain the above-mentioned surface area of the reflection unit. By contrast, if the reflection units are constituted of a plurality of split reflection units that are arranged discontinuously with gaps therebetween in the second direction, it is possible to set the dimensions of the reflection units in the direction normal to the plate surface of the light guide plate to be relatively larger when setting the above-mentioned surface area of the reflection units. Therefore, when manufacturing the light guide plate by resin molding and integrally forming the light emission reflection portions on the opposite plate surface, for example, it is easier to form the split reflection units of the reflection units as designed on the opposite plate surface. In this manner, it is possible for the light emission reflection portions to appropriately exhibit optical properties.

If the reflection units are formed so as to extend along the entire length of the light guide plate in the second direction, then by reducing the number of reflection units arranged in the first direction it is possible to adjust the total of the surface areas of the reflection units, but this would result in a larger gap between reflection units in the first direction, which presents the risk of uneven luminance occurring. By the reflection units being constituted of the plurality of split reflection units arranged in a discontinuous manner with gaps therebetween, there is no need to modify the number of and gap between the reflection units in the first direction, and thus, there is little risk of uneven luminance in the light emitted by the illumination device.

(2) In the light emission reflection portion, the reflection units are formed by partially cutting vertex portions of the opposite plate surface-side light focusing units of the opposite plate surface-side anisotropic light focusing portion, thereby forming openings along the second direction. If the reflection units have a side face along the first direction without any openings in the second direction, the light is refracted or reflected by the side face along the first direction, which presents the risk of decreased light focusing performance by the opposite plate surface-side anisotropic light focusing portion. The light emission reflection portion is formed such that the reflection units are formed by partially cutting the vertex portions of the opposite plate surface-side light focusing units, thereby forming openings along the second direction, which allows for excellent light focusing performance by the opposite plate surface-side anisotropic light focusing portion, and enables the luminance of the light emitted by the illumination device to be further increased.

(3) The opposite plate surface-side anisotropic light focusing portion is configured such that the opposite plate surface-side light focusing units are opposite plate surface-side prisms having a substantially triangular cross-section. In this manner, the opposite plate surface-side anisotropic light focusing portions constituting the opposite plate surface-side prism portion are opposite plate surface-side prisms having a substantially triangular cross-section, and thus, it is possible to adjust the intensity and the like of the focusing effect on light that has reached the opposite plate surface of the light guide plate according to the vertex angle.

(4) The light-exiting side anisotropic light focusing portion is configured such that the light-exiting side light focusing units are light-exiting side prisms having a substantially triangular cross-section, and the light-exiting side prisms have a smaller vertex angle than the opposite plate surface-side prisms. In this manner, the light-exiting side light focusing units constituting the light-exiting side anisotropic light focusing portion are light-exiting side prisms having a substantially triangular cross-section, and thus, it is possible to adjust the intensity and the like of the focusing effect on light that has reached the light-exiting surface of the light guide plate according to the vertex angle.

Also, in the light-exiting side anisotropic light focusing portion, the vertex angle of the light-exiting side prisms is less than the vertex angle of the opposite plate surface-side prisms, and thus, compared to the opposite plate surface-side anisotropic light focusing portion, the light-exiting side prisms cause more light to be retroreflected, and the emission angle of the light is more tightly regulated, thereby providing a stronger light focusing effect. By contrast, light supplied to the light-exiting side anisotropic light focusing portion is anisotropically focused by the opposite plate surface-side anisotropic light focusing portion at the opposite plate surface of the light guide plate, and then anisotropically focused by the light-exiting side anisotropic light focusing portion at the light-exiting surface. Thus, the proportion of light retroreflected at the light-exiting side prisms of the light-exiting side anisotropic light focusing portion is low, and as a result, the light is efficiently emitted by the light-exiting side prisms. In this manner, the usage rate of light can be increased, and it is possible to increase the luminance of light emitted by the illumination device.

(5) The light-exiting side prisms have a vertex angle of 90°, whereas the opposite plate surface-side prisms have a vertex angle of 100° to 150°. In this manner, light that has been anisotropically focused by the opposite plate surface-side prisms, which have a vertex angle of 100° to 150°, at the opposite plate surface of the light guide plate is anisotropically focused by the light-exiting surface-side anisotropic light focusing portion at the light-exiting surface, and then is anisotropically focused by the light-exiting side prisms having a vertex angle of 90°. In this manner, the usage rate of light can be further increased, and it is possible to further increase the luminance of light emitted by the illumination device.

(6) The light-exiting surface-side anisotropic light focusing portion is configured such that the light-exiting surface-side light focusing units are light-exiting surface-side prisms having a substantially triangular cross-section, and the light-exiting surface-side prisms have a larger vertex angle than the light-exiting side prisms. In this manner, the light-exiting surface-side light focusing units constituting the light-exiting surface-side anisotropic light focusing portion are light-exiting surface-side prisms having a substantially triangular cross-section, and thus, it is possible to adjust the intensity and the like of the focusing effect on light that has reached the light-exiting surface of the light guide plate according to the vertex angle.

Also, in the light-exiting side anisotropic light focusing portion, the vertex angle of the light-exiting side prisms is less than the vertex angles of both the opposite plate surface-side prisms and the light-exiting surface-side prisms, and thus, compared to the opposite plate surface-side anisotropic light focusing portion and the light-exiting surface-side anisotropic light focusing portion, the light-exiting side prisms cause more light to be retroreflected, and the emission angle of the light is more tightly regulated, thereby providing the strongest light focusing effect. By contrast, light supplied to the light-exiting side anisotropic light focusing portion is anisotropically focused by the opposite plate surface-side anisotropic light focusing portion at the opposite plate surface of the light guide plate, and then anisotropically focused by the light-exiting side anisotropic light focusing portion at the light-exiting surface. Thus, the proportion of light retroreflected at the light-exiting side prisms of the light-exiting side anisotropic light focusing portion is low, and as a result, the light is efficiently emitted by the light-exiting side prisms. In this manner, the usage rate of light can be further increased, and it is possible to further increase the luminance of light emitted by the illumination device.

(7) The light-exiting side prisms have a vertex angle of 90°, whereas the light-exiting surface-side prisms have a vertex angle of 100° to 150°. In this manner, light that has been anisotropically focused by the opposite plate surface-side anisotropic light focusing portion at the opposite plate surface of the light guide plate is anisotropically focused by the light-exiting surface-side prisms, which have a vertex angle of 100° to 150°, at the light-exiting surface, and then is anisotropically focused by the light-exiting side prisms having a vertex angle of 90°. In this manner, the usage rate of light can be further increased, and it is possible to further increase the luminance of light emitted by the illumination device.

(8) The light-exiting surface-side prisms have a vertex angle of 110°, whereas the opposite plate surface-side prisms have a vertex angle of 140°. In this manner, it is possible to attain the greatest luminance of light emitted by the illumination device.

(9) In the light-exiting surface-side anisotropic light focusing portion, the light-exiting surface-side light focusing units are cylindrical lenses having arc-shaped surfaces. In this manner, compared to a case in which the light-exiting surface-side light focusing units are prisms having triangular cross-sections, it is possible to further avoid uneven luminance in light emitted from the illumination device.

(10) The light-exiting surface-side anisotropic light focusing portion and the opposite plate surface-side anisotropic light focusing portion are formed integrally with the light guide plate. In this manner, compared to a case in which the light-exiting surface-side anisotropic light focusing portion and the opposite plate surface-side anisotropic light focusing portion were provided as separate items from the light guide plate, the number of parts is reduced, which is preferable from the perspective of cost reduction and the like.

(11) Flat portions that are flat along the first direction and the second direction are disposed in the light-exiting surface of the light guide plate between the light-exiting surface-side light focusing units that are adjacent to each other in the second direction. In this manner, the light that was propagated in the light guide plate and that has reached the light-exiting surface is totally reflected by the flat portions and returned back to the opposite plate surface. The light that is returned to the opposite plate surface by the flat portions spreads in the second direction as it is propagated in the light guide plate compared to the light that was totally reflected by the light-exiting surface-side light focusing units and returned to the opposite plate surface. Thus, the light emitted by the illumination device is less susceptible to uneven luminance.

(12) A plurality of the light-exiting surface-side light focusing units included in the light-exiting surface-side anisotropic light focusing portion include a first light-exiting surface-side light focusing unit having a vertex portion at a relatively low position, and a second light-exiting surface-side light focusing unit having a vertex portion at a relatively high position, and a gap is present between the first light-exiting surface-side light focusing unit and the light-exiting side anisotropic light focusing portion. In this manner, a gap is formed between the first light-exiting surface-side light focusing units included among the plurality of light-exiting side anisotropic light focusing portion and the light-exiting side anisotropic light focusing portion, which means that the light-exiting side anisotropic light focusing portion is less susceptible to sticking to the light-exiting surface-side anisotropic light focusing portion. In this manner, it is possible to mitigate the occurrence of uneven luminance for the light emitted by the illumination device.

Next, in order to achieve the above-mentioned object, a display device of the present invention includes the above-mentioned illumination device and a display panel that performs display using light from the illumination device.

According to the display device configured in this manner, the front luminance of light emitted by the illumination device is high and unevenness in the luminance is unlikely, and thus, high display quality can be attained.

The display panel is a liquid crystal panel including a pair of substrates and liquid crystal sealed therebetween. Such a display device can be applied as a liquid crystal display device to various applications such as displays for smartphones and tablet PCs, for example.

Effects of the Invention

According to the present invention, it is possible to improve luminance.

BRIEF DESCRIPTION OF THE DRAWINGS

FIG. 15 is a table of Comparison Experiment 3 showing the relative luminance of emitted light obtained by passing light emitted by the light guide plates of Comparison Example 3 and Working Examples 1 to 8 through a prism sheet.

FIG. 17 is a table of Comparison Experiment 4 showing the height dimensions of reflection units from a first position to a fifth position of the respective light guide plates of Comparison Example 3 and Working Example 1, and the reproducibility of the shapes of the reflection units.

FIG. 20 is a table of Comparison Experiment 5 showing photographs taken from the light-exiting surface of light guide plates of Comparison Example 4 and Working Examples 9 and 10, and determination results for uneven luminance.

FIG. 24 is a table of Comparison Experiment 7 showing photographs taken from the light-exiting surface of light guide plates when the tangent angle of cylindrical lenses of a light-exiting surface-side lenticular lens portion is modified, and determination results for uneven luminance.

DETAILED DESCRIPTION OF EMBODIMENTS

<Embodiment 1>

Embodiment 1 of the present invention will be described with reference to FIGS. 1 to 17. In the present embodiment, a liquid crystal display device 10 will be described as an example. The drawings indicate an X axis, a Y axis, and a Z axis in a portion of the drawings, and each of the axes indicates the same direction for the respective drawings. The up-and-down direction is based on that of FIGS. 3 to 5, and the upper side thereof is the front side while the lower side thereof is the rear side.

Figure 1:
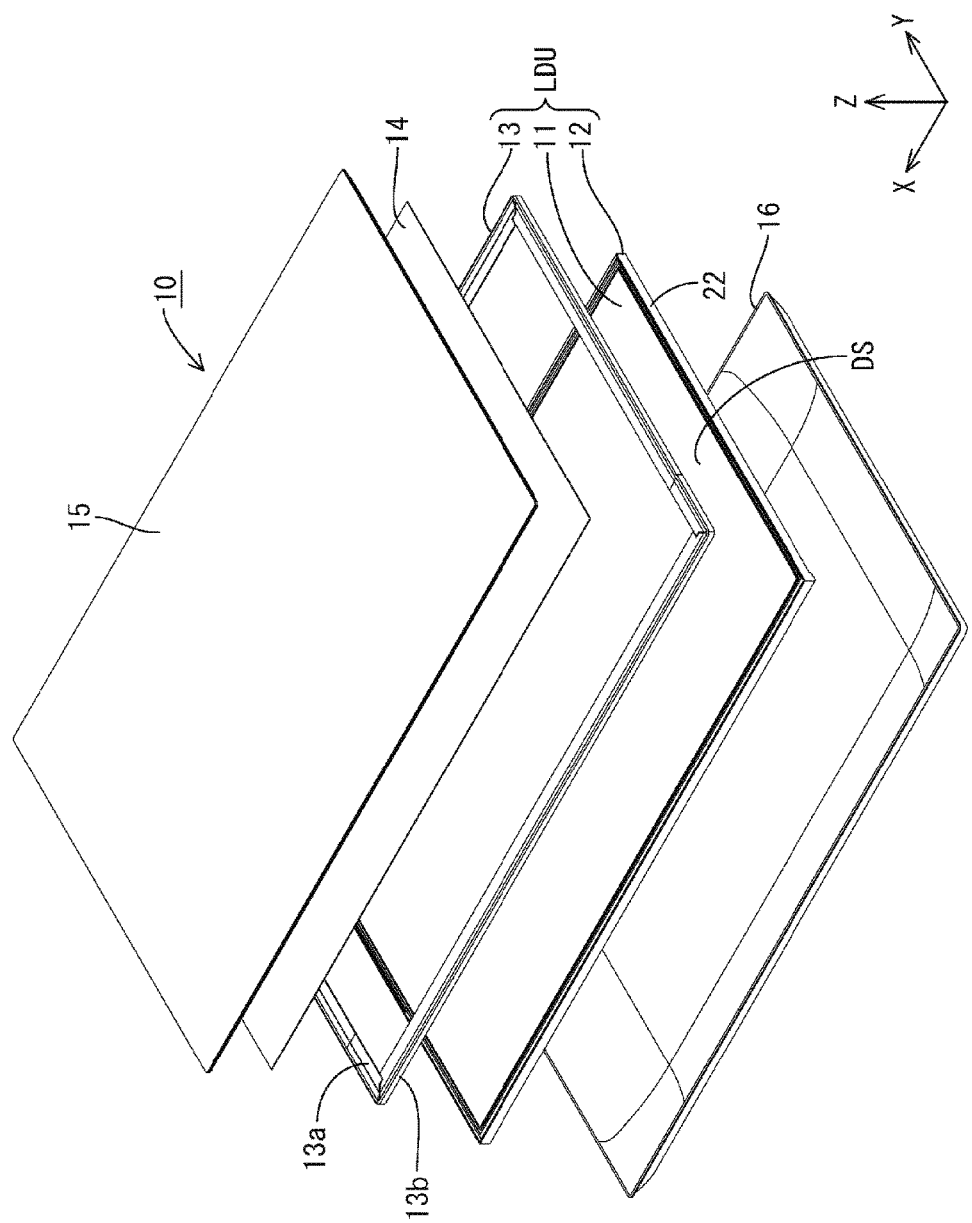
FIG. 1 is an exploded perspective view schematically showing a liquid crystal display device according to Embodiment 1 of the present invention.

As shown in FIG. 1, the liquid crystal display device 10 is formed in a rectangular shape overall in a plan view, and is made by assembling together parts such as a touch panel 14, a cover panel 15 (protective panel, cover glass), and a casing 16 onto a liquid crystal display unit LDU, which is the main part. The liquid crystal display unit LDU has a liquid crystal panel 11 (display panel) having a display surface DS on the front that displays images, a backlight device 12 (illumination device) that is disposed on the rear of the liquid crystal panel 11 and radiates light towards the liquid crystal panel 11, and a frame 13 (case member) that presses the liquid crystal panel 11 from the front, or in other words from the side opposite to the backlight device 12 (from the display panel DS side). The touch panel 14 and the cover panel 15 are housed within the frame 13 of the liquid crystal display unit LDU from the front, and the outer portions (including the outer edges) are received by the frame 13 from the rear. The touch panel 14 is disposed on the front of the liquid crystal panel 11 at a prescribed gap therefrom, and the rear surface (inner surface) thereof opposes the display surface DS. The cover panel 15 covers the touch panel 14 from the front, and the rear surface (inner surface) of the cover panel 15 opposes the front surface of the touch panel 14. An antireflective film AR is interposed between the touch panel 14 and the cover panel 15 (see FIG. 5). The casing 16 is assembled to the frame 13 to cover the liquid crystal display unit LDU from the rear. Of the components of the liquid crystal display device 10, a portion of the frame 13 (looped portion 13b described later), the cover panel 15, and the casing 16 constitute the outer appearance of the liquid crystal display device 10. The liquid crystal display device 10 of the present embodiment is used in electronic devices such as tablet PCs, for example, and the display size thereof is approximately 20 inches, for example.

Figure 3:
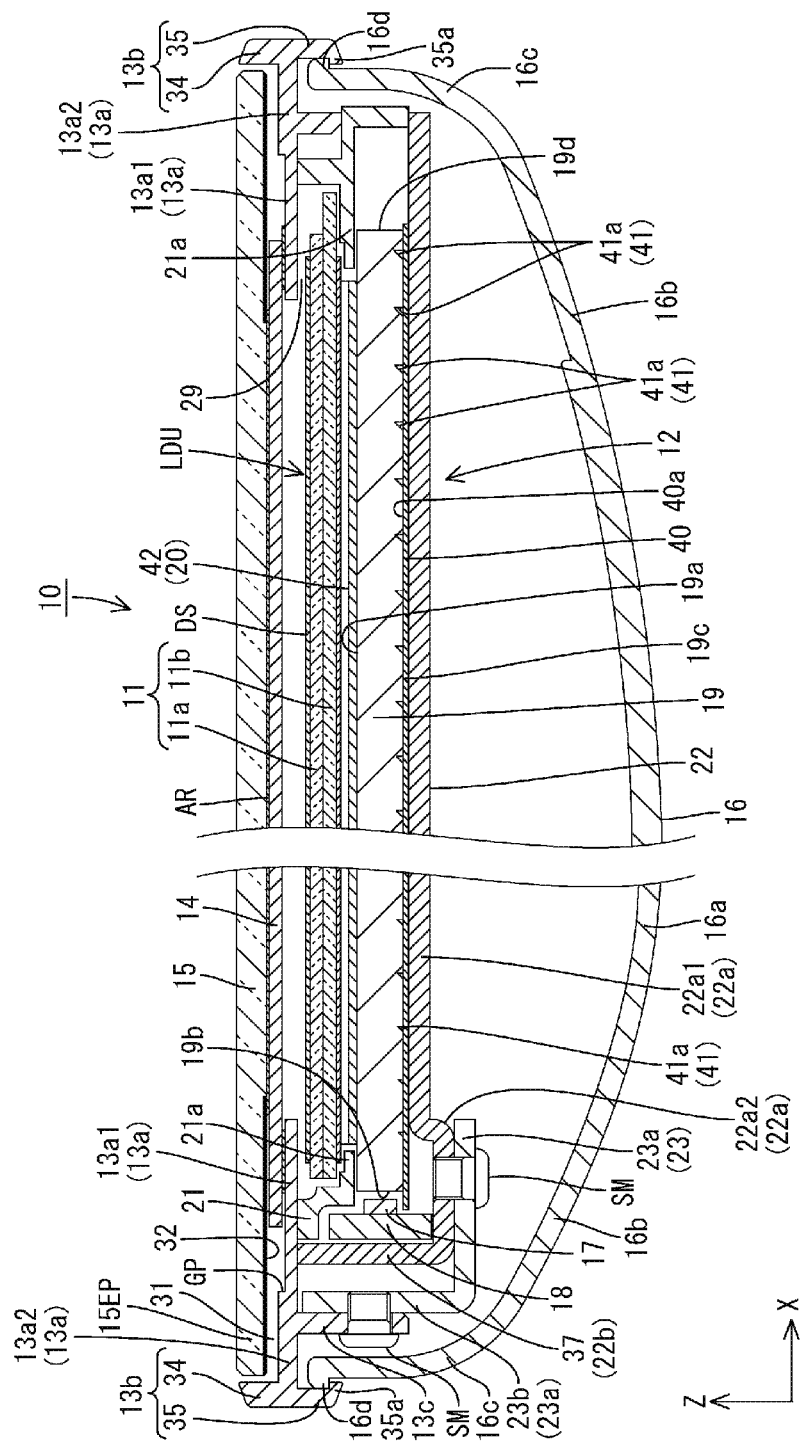
FIG. 3 is a cross-sectional view of a configuration of the liquid crystal display device along the longer side direction (first direction, X axis direction).
Figure 4:
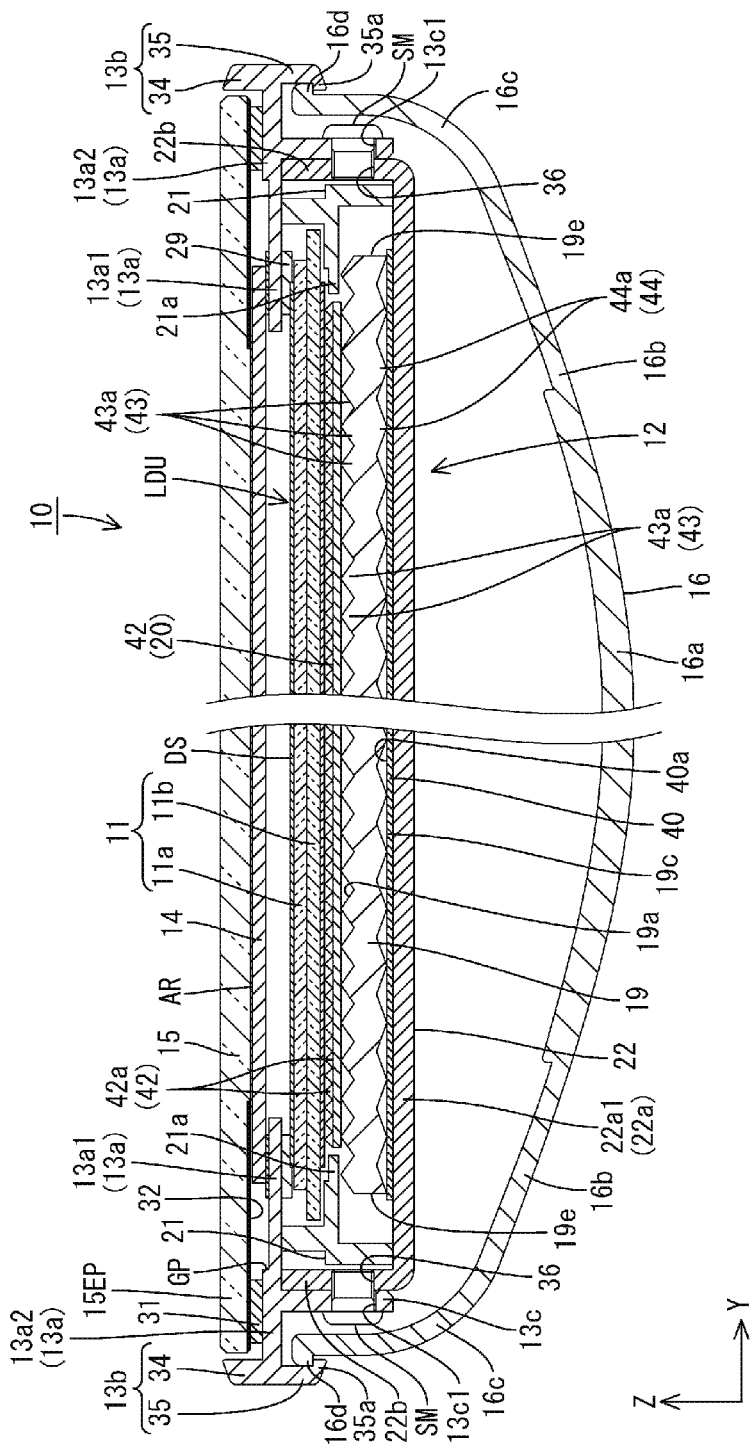
FIG. 4 is a cross-sectional view of a configuration of the liquid crystal display device along the shorter side direction (second direction, Y axis direction).

First, the liquid crystal panel 11 included in the liquid crystal display unit LDU will be described in detail. As shown in FIGS. 3 and 4, the liquid crystal panel 11 includes a pair of substantially transparent glass substrates 11a and 11b having excellent light-transmissive qualities and having a rectangular shape in a plan view, and a liquid crystal layer (not shown) including liquid crystal molecules, which are a substance that changes optical properties in response to an applied electric field, the liquid crystal layer being interposed between the substrates 11a and 11b, and the substrates 11a and 11b are bonded together by a sealing member (not shown) maintaining a gap at a width equal to the thickness of the liquid crystal layer. The liquid crystal panel 11 has a display region where images are displayed (central portion surrounded by a surface light-shielding layer 32) and a non-display region surrounding the display region in a frame shape where images are not displayed (outer periphery overlapping the surface light-shielding layer 32 to be described later). The longer side direction of the liquid crystal panel 11 matches the X axis direction, the shorter side direction thereof matches the Y axis direction, and the thickness direction thereof matches the Z axis direction.

Of the two substrates 11a and 11b, the one on the front side (front surface side) is the CF substrate 11a, and the other on the rear side (rear surface side) is the array substrate 11b. A plurality of TFTs (thin film transistors), which are switching elements, and a plurality of pixel electrodes are provided on the inner surface of the array substrate 11b (surface facing the liquid crystal layer and opposing the CF substrate 11a), and gate wiring lines and source wiring lines surround each of these TFTs and pixel electrodes to form a grid pattern. Each of the wiring lines is fed a prescribed image signal from control circuits, which are not shown. Each pixel electrode, which is disposed in a quadrilateral region surrounded by the gate wiring lines and source wiring lines, is a transparent electrode made of ITO (indium tin oxide) or ZnO (zinc oxide).

The CF substrate 11a has formed thereon a plurality of color filters in positions corresponding to the pixels. The color filters are arranged such that the three colors R, G, and B are alternately disposed. A light-shielding layer (black matrix) is formed between the color filters to prevent color mixing. An opposite electrode is provided on the surfaces of the color filters and the light-shielding layer so as to face the pixel electrodes on the array substrate 11b. The CF substrate 11a is formed to be slightly smaller than the array substrate 11b. Alignment films for aligning the liquid crystal molecules included in the liquid crystal layer are respectively formed on the inner surfaces of the substrates 11a and 11b. Polarizing plates 11c and 11d are respectively bonded to the outer surfaces of the substrates 11a and 11b (see FIG. 5).

Figure 2:
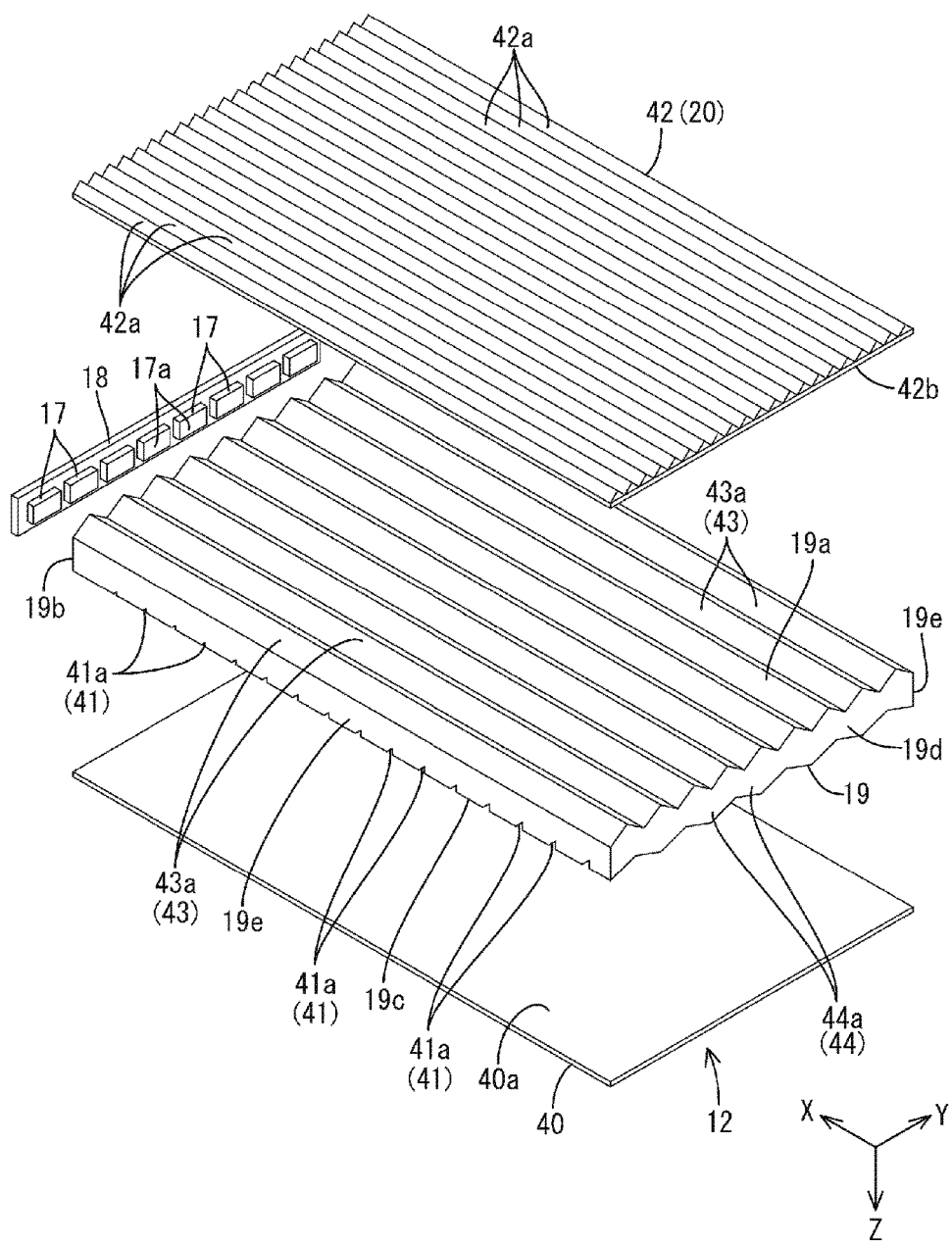
FIG. 2 is an exploded perspective view showing a schematic configuration of a backlight device of the liquid crystal display device.

Next, the backlight device 12 included in the liquid crystal display unit LDU will be described in detail. As shown in FIG. 1, the backlight device 12 overall has a substantially block shape that is rectangular in a plan view overall, in a manner similar to the liquid crystal panel 11. As shown in FIGS. 2 to 4, the backlight device 12 includes LEDs 17 (light-emitting diodes), which are light sources; an LED substrate 18 (light source substrate) on which the LEDs 17 are mounted; a light guide plate 19 that guides light from the LEDs 17; a reflective sheet 40 (reflective member) that reflects light from the light guide plate 19; an optical sheet 20 (optical member) stacked over the light guide plate 19; a light-shielding frame 21 that presses the light guide plate 19 from the front; a chassis 22 that houses the LED substrate 18, the light guide plate 19, the optical sheet 20, and the light-shielding frame 21; and a heat-dissipating member 23 attached so as to be in contact with the outer surface of the chassis 22. The backlight device 12 has LEDs 17 (LED substrate 18) disposed along one shorter side among the outer edges of the backlight device 12, and is of a single-side lit edge lit type (side lit type).

Figure 5:
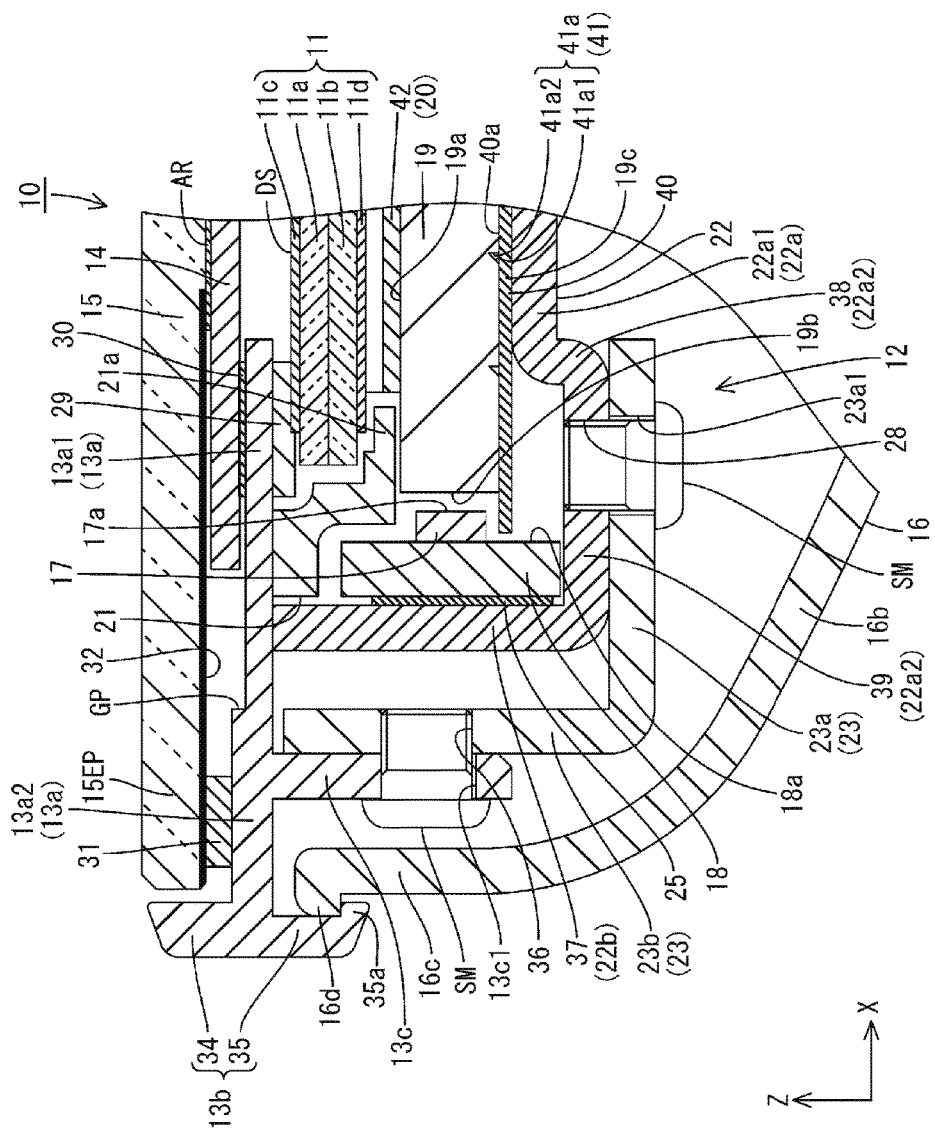
FIG. 5 is an enlarged cross-sectional view of a portion of FIG. 3 in the vicinity of an LED.

As shown in FIGS. 2, 3, and 5, each LED 17 has a configuration in which an LED chip is sealed by a resin material onto a portion of the LED substrate 18 where the LED 17 is to be bonded. The LED chip mounted on the portion of the substrate has one type of primary light emitting wavelength, and specifically, only emits blue light. On the other hand, the resin material that seals the LED chip has a fluorescent material dispersed therein, the fluorescent material emitting light of a prescribed color by being excited by the blue light emitted from the LED chip. This combination of the LED chip and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. The LEDs 17 are of a so-called top-type in which the side opposite to that mounted onto the LED substrate 18 is a light-emitting surface 17a.

As shown in FIGS. 2, 3, and 5, the LED substrate 18 has a long plate shape that extends in the Y axis direction (shorter side direction of light guide plate 19 and chassis 22), and is housed in the chassis 22 such that the surface thereof is parallel to the Y axis direction and the Z axis direction, or in other words, perpendicular to the surfaces of the liquid crystal panel 11 and the light guide plate 19. In other words, the LED substrates 18 are disposed such that the long side direction of the plate surface thereof is the same as the Y axis direction, the short side direction of the plate surface thereof is the same as the Z axis direction, and the plate thickness direction perpendicular to the main surface is the same as the X axis direction. The LED substrate 18 is disposed such that the inner surface thereof (mounting surface 18a) faces one shorter side edge face (light-receiving face 19b, light source-opposing edge face) of the light guide plate 19 with a prescribed gap in the X axis direction therefrom. Therefore, the direction in which the LEDs 17, the LED substrate 18, and the light guide plate 19 are aligned substantially matches the X axis direction. The longer dimension of the LED substrate 18 substantially matches or is longer than the shorter dimension of the light guide plate 19, and the LED substrate 18 is attached to one shorter edge of the chassis 22 to be described later.

As shown in FIG. 5, the LEDs 17 having the configuration above are mounted on the inner surface of the LED substrate 18, or in other words, the surface facing the light guide plate 19 (surface opposing the light guide plate 19), and this surface is the mounting surface 18a. On the mounting surfaces 18a of the LED substrates 18, a plurality of LEDs 17 are arranged in a row (in a line) along the length direction (Y axis direction) at prescribed intervals. In other words, the plurality of LEDs 17 are arranged intermittently along the shorter side direction on one shorter side of the backlight device 12. The alignment interval (alignment pitch) between adjacent LEDs 17 is substantially the same. Also, the mounting surface 18a of the LED substrate 18 has formed thereon a wiring pattern (not shown) made of a metal film (copper foil or the like) that extends in the Y axis direction across the group of LEDs 17 so as to connect adjacent LEDs 17 in series. Terminal portions formed on either side of the wiring pattern are connected to an LED driver circuit such that driving power can be supplied to the respective LEDs 17. In addition, the base material of the LED substrate 18 is made of metal like the chassis 22, and the wiring pattern (not shown) is formed on the LED substrate 18 across an insulating layer. It is also possible to form the base material of the LED substrate 18 of an insulating material such as a ceramic.

Figure 6:
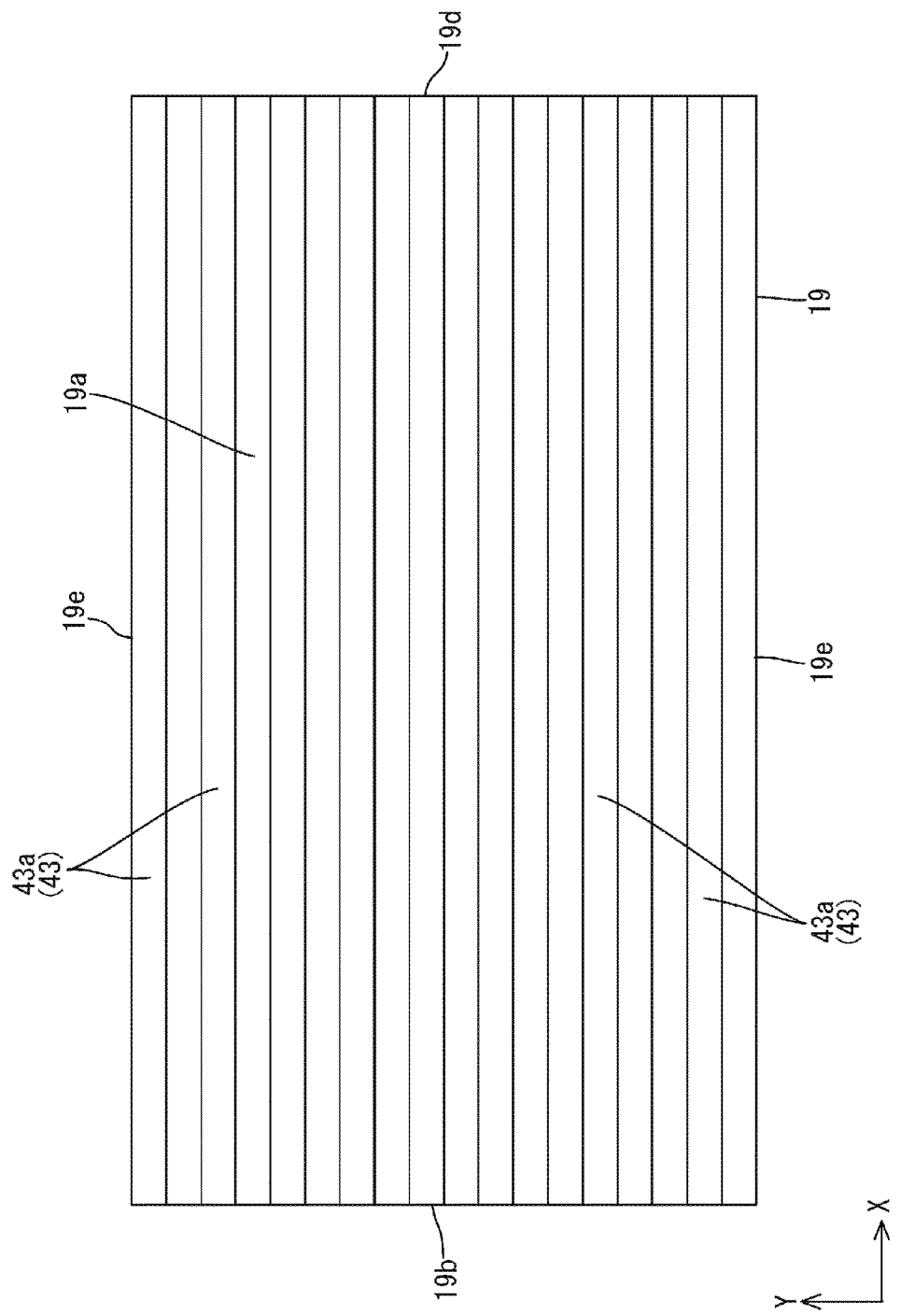
FIG. 6 is a plan view of a light guide plate.

The light guide plate 19 is made of a synthetic resin (an acrylic resin such as PMMA, for example) with a higher refractive index than air and almost completely transparent, having excellent light transmission. As shown in FIGS. 2 and 6, like the liquid crystal panel 11, the light guide plate 19 is formed as a substantially rectangular flat plate as seen in a plan view, and the surface of the light guide plate 19 is parallel to the surface of the liquid crystal panel 11 (display surface DS). The longer side direction of the surface of the light guide plate 19 matches the X axis direction and the shorter side direction thereof matches the Y axis direction, while the thickness direction perpendicular to the surface of the light guide plate 19 matches the Z axis direction. As shown in FIGS. 3 and 4, the light guide plate 19 is disposed in the chassis 22 directly below the liquid crystal panel 11 and the optical sheet 20, and one of the shorter sides of the outer edge faces opposes the LEDs 17 on the LED substrate 18 disposed on one of the shorter sides of the chassis 22. Thus, the LEDs 17 (LED substrate 18) and the light guide plate 19 are arranged in the X axis direction with respect to each other whereas the optical sheet 20 (liquid crystal panel 11) and the light guide plate 19 are arranged (stacked) in the Z axis direction with respect to each other, and the two directions are perpendicular to each other. The light guide plate 19 has the function of receiving light emitted by the LEDs 17 towards the light guide plate 19 in the X axis direction (direction in which the LEDs 17 are aligned with respect to the light guide plate 19) at the shorter side edge face thereof, and propagating this light therein and causing the light to be emitted upward from the surface thereof towards the optical sheet 20 (front, light-emission side).

Of the surfaces of the plate-shaped light guide plate 19, the surface facing the front (light emission side; surface facing the liquid crystal panel 11 and the optical sheet 20) is, as shown in FIGS. 3 and 4, the light-exiting surface 19a from which internal light is emitted towards the optical sheet 20 and the liquid crystal panel 11. Of the outer edge faces adjacent to the plate surface of the light guide plate 19, one of the pair of longer side edges faces (on the left side of FIG. 3) having an elongated shape in the X axis direction (direction in which the LEDs 17 are aligned; longer side direction of the LED substrate 18) faces the LEDs 17 (LED substrate 18) at a prescribed gap therefrom as shown in FIG. 5, and this is the light-receiving face 19b into which light emitted from the LEDs 17 enters. In other words, the light-receiving face 19b is the LED-opposing edge face (light source-opposing edge face) that opposes the LEDs 17. The light-receiving face 19b is on a plane parallel to that defined by the Y axis and the Z axis, and is substantially perpendicular to the light-exiting surface 19a. The direction along which the LEDs 17 and the light-receiving faces 19b (light guide plate 19) are aligned with respect to each other is the same as the X axis direction, and is parallel to the light-exiting surface 19a. Of the pair of shorter side edge faces among the outer edge faces of the light guide plate 19, the other edge face opposite to the light-receiving face 19b (edge face that is an opposite side to the light-receiving face 19b) is an opposite edge face 19d, whereas a pair of longer side edge faces (a pair of edge faces that form opposite sides and that do not include the light-receiving face 19b) that are adjacent to the light-receiving face 19b and the opposite edge face 19d are respectively side edge faces 19e. The pair of side edge faces 19e are surfaces parallel to the X axis direction (direction in which the LEDs 17 and light guide plate 19 are aligned with respect to each other) and the Z axis direction. Of the outer edge faces of the light guide plate 19, the three edge faces other than the light-receiving face 19b, or in other words, the opposite edge face 19d and the pair of side edge faces 19e are, as shown in FIGS. 3 and 4 non-LED-facing edge faces (non-light source-facing edge faces) that do not face the LEDs 17. Light from the LEDs 17 that has entered the light guide plate 19 through the light-receiving face 19b, which is an outer edge face of the light guide plate 19, is reflected by the reflective sheet 40 to be described next, and totally reflected by the light-exiting surface 19a, the opposite plate surface 19c, and other outer edge faces (opposite edge face 19d and respective side edge faces 19e), thereby being efficiently propagated inside the light guide plate 19. If the light guide plate 19 is made of an acrylic resin such as PMMA, then the index of refraction thereof is 1.49, and thus, the critical angle is approximately 42°, for example. Below, among the outer edge faces of the light guide plate 19, the direction (X axis direction) in which the pair of edge faces (longer side edge faces, side edge faces 19e), which are opposing sides and do not include the light-receiving face 19b, are aligned is designated as the "first direction"; the direction (Y axis direction) in which the pair of edge faces (shorter side edge faces, light-receiving face 19b and opposite edge face 19d), which are opposing sides and include the light-receiving face 19b, are aligned is designated as the "second direction"; and the direction normal to the surface of the light guide plate 19 (direction perpendicular to both the first direction and second direction) is designated as the "third direction."

Of the surfaces of the light guide plate 19, the surface (opposing the reflective sheet 40 and the bottom plate 22*a* of the chassis 22) facing the rear (opposite to the light-exiting side), that is, the surface opposite to the light-exiting surface 19*a*, is an opposite plate surface 19*c* as shown in FIGS. 3 and 4. On the opposite plate surface 19*c*, a reflective sheet 40 that can reflect light from the light guide plate 19 toward the front, or in other words toward the light-exiting surface 19*a*, is provided so as to cover the entire opposite plate surface 19*c*. In other words, the reflective sheet 40 is sandwiched between a bottom plate 22*a* of the chassis 22*a* and the light guide plate 19. The reflective sheet 40 has a reflective surface 40*a* that opposes the opposite plate surface 19*c* of the light guide plate 19 and reflects light, and the light reflected by the reflective surface 40*a* can be efficiently propagated inside the light guide plate 19. As shown in FIG. 5, the edge of the reflective sheet 40 at the light-receiving face 19*b* of the light guide plate 19 extends farther outward than the light-receiving face 19*b*, or in other words, towards the LEDs 17, and this extended portion reflects light from the LEDs 17, thereby enabling an improvement in the light-receiving efficiency of the light-receiving face 19*b*. As shown in FIGS. 3 and 5, the opposite plate surface 19*c* of the light guide plate 19 is provided with a light emission reflection portion 41 for encouraging light to be emitted from the light-exiting surface 19*a* by reflecting light that is being propagated inside the light guide plate 19. The light emission reflection portion 41 includes reflection units 41*a* (unit light emission reflection portions) that extend along the second direction (Y direction) on the opposite plate surface 19*c* of the light guide plate 19, and that are formed in grooves and have a substantially triangular (substantially V-shaped) cross-section, a plurality of the reflection units 41*a* being arranged with gaps therebetween (intermittent arrangement) along the first direction (X axis direction). The reflection units 41*a* have an inclined surface 41*a*1 that is inclined with respect to the third direction (Z axis direction) and the first direction (X axis direction), and a parallel surface 41*a*2 that is parallel to the third direction and the second direction. The inclined surface 41*a*1 is arranged towards the light-receiving face 19*b* in the first direction (left side of FIGS. 5 and 10), but the parallel surface 41*a*2 is arranged towards the opposite edge face 19*d* in the first direction (right side of FIGS. 5 and 10). The reflection units 41*a* reflect light at the inclined surfaces 41*a*1 arranged towards the light-receiving face 19*b* in the first direction, thereby producing light incident on the light-exiting surface 19*a* that does not exceed the critical angle, and encouraging light to be emitted from the light-exiting surface 19*a*. The reflection units 41*a* are arranged so as to be taller in the height direction (third direction) with the areas of the inclined surfaces 41*a*1 and the parallel surfaces 41*a*2 (surface areas) becoming larger, the further way from the light-receiving face 19*b* (LEDs 17) the reflection units 41*a* are in the first direction. In this manner, the light emitted from the light-exiting surface 19*a* is controlled to have an even distribution along the surface of the light-exiting surface 19*a*. The reflection units 41*a* are arranged such that the alignment interval (alignment pitch) is substantially uniform in the first direction, that is, the reflection units 41*a* are arranged at even pitch.

As shown in FIGS. 2 to 4, the optical sheet 20 is rectangular in a plan view, similar to the liquid crystal panel 11 and the chassis 22. The optical sheet 20 is disposed on the front (light-exiting side) of the light-exiting surface 19*a* of the light guide plate 19 so as to overlap therewith. In other words, the optical sheet 20 is interposed between the liquid crystal panel 11 and the light guide plate 19, thus allowing light emitted from the light guide plate 19 therethrough while applying prescribed optical effects thereon, and emitting the light to the liquid crystal panel 11. The optical sheet 20 will be described in detail later.

As shown in FIGS. 3 and 4, a light-shielding frame 21 is formed in a substantially frame shape that extends along the outer edges of the light guide plate 19, and can press almost the entirety of the outer edges of the light guide plate 19 from the front. The light-shielding frame 21 is made of a synthetic resin, and by having the surface thereof colored black, for example, the light-shielding frame 21 has light-shielding properties. The light-shielding frame 21 has an inner edge 21*a* that is present in the entire area between the outer edge portion of the light guide plate 19 and the LEDs 17, and respective outer edge portions of the liquid crystal panel 11 and the optical sheet 20, thereby optically isolating them from each other. As a result, light that was emitted by the LEDs 17 but did not enter the light-receiving face 19*b* of the light guide plate 19 and light that has leaked from the opposite edge face 19*d* and the side edge faces 19*e* can be prevented from directly entering the outer edge portions of the liquid crystal panel 11 and the optical sheet 20 (particularly the edge faces). The three sides of the light-shielding frame 21 that do not overlap the LEDs 17 and the LED substrate 18 in a plan view (pair of long sides and short side opposite to that facing the LED substrate 18) have a portion rising from the bottom plate 22*a* of the chassis 22 and a portion supporting the frame 13 from the rear, whereas the short side overlapping the LEDs 17 and the LED substrate 18 in a plan view covers the edge of the light guide plate 19 and the LED substrate 18 (LEDs 17) from the front while bridging the pair of long sides. The light-shielding frame 21 is fixed to the chassis 22 to be described next by a fixing member such as a screw member (not shown).

The chassis 22 is made of sheet metal having excellent thermal conductivity made of an aluminum plate, an electro galvanized steel sheet (SECC), or the like, and as shown in FIGS. 3 and 4, the chassis 22 has a bottom plate 22*a* having a rectangular shape in a plan view similar to the liquid crystal panel 11, and side plates 22*b* that rise towards the front from the respective outer edges (pair of long sides and pair of short sides) of the bottom plate 22*a*. In the chassis 22 (bottom plate 22*a*), the long side direction thereof matches the X axis direction, and the short side direction thereof matches the Y axis direction. A majority of the bottom plate 22*a* is a light guide plate supporting portion 22*a*1 that supports the light guide plate 19 from the rear (side opposite to the light-exiting surface 19*a*), whereas the edge thereof by the LED substrate 18 is a substrate housing portion 22*a*2 that protrudes in a step shape to the rear. As shown in FIG. 5, the substrate housing portion 22*a*2 has a substantially L shape in a cross-sectional view, and includes a rising portion 38 that bends from the edge of the light guide plate supporting portion 22*a*1 and extends to the rear, and a housing bottom portion 39 that is bent from the end of the rising portion 38 and protrudes towards a direction opposite to the light guide plate supporting portion 22*a*1. The portion of the rising portion 38 that bends from the edge of the light guide plate supporting portion 22*a*1 is located to a side of the light-receiving face 19*b* of the light guide plate 19 opposite to the LEDs 17 (towards center of the light guide plate supporting portion 22*a*1). A longer side plate 22*b* rises towards the front from a bend at the protruding tip of the housing bottom portion 39. The shorter side plate 22*b* connected to the substrate housing portion 22*a*2 has the LED substrate 18 attached thereto, and this side plate 22*b* is a substrate attaching portion 37. The substrate attaching portion 37 has a surface opposing the light-receiving face 19b of the light guide plate 19, and the LED substrate 18 is attached to this opposing surface. A surface of the LED substrate 18 opposite to the mounting surface 18a to which the LEDs 17 are mounted is fixed to the inner surface of the substrate attaching portion 37 by a substrate fixing member 25 such as double-sided tape. The attached LED substrate 18 is at a small gap from the inner surface of the housing bottom portion 39 of the substrate housing portion 22a2. The rear surface of the bottom plate 22a of the chassis 22 has attached thereto a liquid crystal panel driver circuit substrate (not shown) for controlling the driving of the liquid crystal panel 11, an LED driver circuit substrate (not shown) for supplying driving power to the LEDs 17, a touch panel driver circuit substrate (not shown) for controlling the driving of the touch panel 14, and the like.

The heat-dissipating member 23 is made of sheet metal having excellent thermal conductivity such as an aluminum plate, and as shown in FIG. 3, the heat-dissipating member 23 extends along one shorter side of the chassis 22, and specifically, along the substrate housing portion 22a2, which houses the LED substrate 18. As shown in FIG. 5, the heat-dissipating member has a substantially L shape in a cross-sectional view, and includes a first heat-dissipating portion 23a that is parallel to the outer surface of the substrate housing portion 22a2 and is in contact with this outer surface, and a second heat-dissipating portion 23b that is parallel to the outer surface of the side plate 22b (substrate attaching portion 37), which is connected to the substrate housing portion 22a2. The first heat-dissipating portion 23a has a narrow plate shape extending along the Y axis direction, and the surface thereof facing the front and parallel to the X axis direction and the Y axis direction abuts almost the entire length of the outer surface of the housing bottom portion 39 in the substrate housing portion 22a2. The first heat-dissipating portion 23a is screwed into the housing bottom portion 39 by a screw member SM, and has a screw insertion hole 23a1 for inserting the screw member SM. The housing bottom portion 39 has a screw hole 28 that is threaded to engage the screw member SM. As a result, heat emitted by the LEDs 17 is transmitted to the first heat-dissipating portion 23a through the LED substrate 18, the substrate attaching portion 37, and the substrate housing portion 22a2. A plurality of the screw members SM are attached to the first heat-dissipating portion 23a at a gap from each other along the extension direction thereof. The second heat-dissipating portion 23b has a narrow plate shape extending along the Y axis direction and the surface thereof facing the inside and parallel to the Y axis direction and the Z axis direction is arranged to oppose the substrate attaching portion 37 at a prescribed gap therefrom.

Next, the frame 13 included in the liquid crystal display unit LDU will be described. The frame 13 is made of a metal such as aluminum having excellent thermal conductivity, and as shown in FIG. 1 has an overall rectangular frame shape in a plan view along the outer edges of the liquid crystal panel 11, the touch panel 14, and the cover panel 15. The frame 13 is formed by press working or the like. As shown in FIGS. 3 and 4, the frame 13 presses the outer edges of the liquid crystal panel 11 from the front, and sandwiches the liquid crystal panel 11, the optical sheet 20, and the light guide plate 19, which are stacked one on top of the other, with the chassis 22 of the backlight device 12. On the other hand, the frame 13 receives the outer edges of the touch panel 14 and the cover panel 15 from the rear, and is interposed between the outer edges of the liquid crystal panel 11 and the touch panel 14. As a result, a prescribed gap is set between the liquid crystal panel 11 and the touch panel 14, and when an external force acts on the cover panel 15 causing the touch panel 14 to warp towards the liquid crystal panel 11, the warped touch panel 14 is unlikely to interfere with the liquid crystal panel 11.

As shown in FIGS. 3 and 4, the frame 13 has: a frame-shaped portion 13a (main frame portion) disposed along the outer edges of the liquid crystal panel 11, the touch panel 14, and the cover panel 15; a loop portion 13b (cylindrical portion) that is connected to the outer edge of the frame-shaped portion 13a and surrounds the touch panel 14, the cover panel 15, and the casing 16 from the outside; and an attaching plate portion 13c protruding towards the rear from the frame-shaped portion 13a, the attaching plate portion 13c being attached to the chassis 22 and the heat-dissipating member 23. The frame-shaped portion 13a has a substantially plate shape with a surface parallel to the respective surfaces of the liquid crystal panel 11, the touch panel 14, and the cover panel 15, the frame-shaped portion 13a having a rectangular frame shape in a plan view. In the frame-shaped portion 13a, the outer edge portion 13a2 has a greater thickness than the inner edge portion 13a1, and a step GP (gap) is formed at the boundary between the two. In the frame-shaped portion 13a, the inner edge portion 13a1 is disposed between the outer edge portion of the liquid crystal panel 11 and the outer edge portion of the touch panel 14, whereas the outer edge portion 13a2 receives the outer edge portion of the cover panel 15 from the rear. In this manner, almost the entire front surface of the frame-shaped portion 13a is covered by the cover panel 15, which means that almost none of the front surface is exposed. As a result, even if the temperature of the frame 13 increases due to heat from the LEDs 17 or the like, the user of the liquid crystal display device 10 is unlikely to directly touch the exposed portions of the frame 13, which is excellent for safety. As shown in FIG. 5, the rear surface of the inner edge portion 13a1 of the frame-shaped portion 13a has fixed thereto a cushioning material 29 for pressing the liquid crystal panel 11 while cushioning it, whereas the front surface of the inner edge portion 13a1 has fixed thereto a first fixing member 30 for cushioning and fixing in place the outer edge portion of the touch panel 14. The cushioning material 29 and the first fixing member 30 are disposed on overlap each other in a plan view at the inner edge portion 13a1. The front surface of the outer edge portion 13a2 of the frame-shaped portion 13a has fixed thereto a second fixing member 31 for fixing in place the cover panel 15 while cushioning it. The cushioning material 29 and the fixing members 30 and 31 extend along the sides of the frame-shaped portion 13a excluding the four corners thereof. The fixing members 30 and 31 are double-sided tapes having a base member with cushioning properties, for example.

As shown in FIGS. 3 and 4, the loop portion 13b overall has a short rectangular tube shape that is rectangular in a plan view, and includes a first loop portion 34 that protrudes towards the front from the outer edge of the outer edge portion 13a2 of the frame-shaped portion 13a, and a second loop portion 35 that protrudes towards the rear from the outer edge of the outer edge portion 13a2 of the frame-shaped portion 13a. In other words, the inner surface of the short rectangular tube shaped loop portion 13b substantially towards the center in the axis direction thereof (Z axis direction) has connected thereto the outer edge of the frame-shaped portion 13a along the entire length of the inner surface. The first loop portion 34 is disposed so as to surround the entire outer edge face of the touch panel 14 and the cover panel 15 disposed on the front of the frame-shaped portion 13a. The inner surface of the first loop portion 34 faces the outer edge faces of the touch panel 14 and the cover panel 15, whereas the outer surface thereof is exposed on the outside of the liquid crystal display device 10, and constitutes the outer appearance of the side face of the liquid crystal display device 10. On the other hand, the second loop portion 35 surrounds from the outside the front edge (attaching portion 16c) of the casing 16 disposed on the rear of the frame-shaped portion 13a. The inner surface of the second loop portion 35 faces the attaching portion 16c of the casing 16 to be described later, whereas the outer surface thereof is exposed on the outside of the liquid crystal display device 10, and constitutes the outer appearance of the side face of the liquid crystal display device 10. The protruding tip of the second loop portion 35 has a frame fixing tab 35a having a hook shape in a cross-sectional view, and by fixing the casing 16 to the frame fixing tab 35a, the casing 16 can be securely attached.

As shown in FIGS. 3 and 4, the attaching plate portion 13c protrudes from the rear of the outer edge portion 13a2 of the frame-shaped portion 13a, and has a plate shape extending along the respective sides of the frame-shaped portion 13a, the surface of the attaching plate portion 13c being substantially perpendicular to the surface of the frame-shaped portion 13a. The attaching plate portion 13c is individually provided on each side of the frame-shaped portion 13a. The attaching plate portion 13c disposed on the short side of the frame-shaped portion 13a facing the LED substrate 18 has an inner surface to which the outer surface of the second heat-dissipating portion 23b of the heat-dissipating portion 23 is attached. The attaching plate portion 13c is screwed onto the second heat-dissipating portion 23b by screw members SM, and has screw insertion holes 13c1 through which the screw members SM are inserted. The second heat-dissipating portion 23b has screw holes 36 that are threaded to engage the screw members SM. As a result, heat from the LEDs 17 transmitted from the first heat-dissipating portion 23a to the second heat-dissipating portion 23b is transmitted to the attaching plate portion 13c and then to the entire frame 13, thereby efficiently dissipating heat. The attaching plate portion 13c can be said to be fixed indirectly to the chassis 22 through the heat-dissipating portion 23. On the other hand, the attaching plate portions 13c respectively disposed on the pair of long sides and the short side opposite to that facing the LED substrate 18 are respectively screwed in by the screw members SM such that the inner surface of the attaching plate portions 13c are in contact with the outer surfaces of the side plates 22b of the chassis 22. The attaching plate portions 13c have formed therein screw insertion holes 13c1 for inserting the screw members SM therein, whereas the side plates 22b have screw holes 36 that are threaded to engage the screw members SM. A plurality of the screw members SM are attached to the attaching plate portion 13c along the extension direction thereof at a gap therebetween.

Next, the touch panel 14 attached to the frame 13 will be described. As shown in FIGS. 1, 3, and 4, the touch panel 14 is a position input device for use by the user to input position information within the display surface DS of the liquid crystal panel 11, and the touch panel 14 has formed thereon a prescribed touch panel pattern (not shown) on a glass substrate having a rectangular shape and being almost transparent with excellent light transmittance. Specifically, the touch panel 14 has a glass substrate having a rectangular shape in a manner similar to the liquid crystal panel 11, and has formed thereon transparent electrodes (not shown) for the touch panel constituting a so-called projection-type capacitive touch panel pattern on the front surface thereof. A plurality of the transparent electrodes for the touch panel are arranged in a matrix on the surface of the substrate. A terminal portion (not shown) to which wiring lines drawn from the transparent electrodes for the touch panel constituting the touch panel pattern are connected is formed on one short side of the touch panel 14, and by connecting a flexible substrate (not shown) to the terminal portion, it is possible to supply a potential from the touch panel driver circuit substrate to the transparent electrodes for the touch panel constituting the touch panel pattern. As shown in FIG. 5, the outer edge portion of the interior surface of the touch panel 14 is fixed to the inner edge portion 13a1 of the frame-shaped portion 13a of the frame 13 by the first fixing member 30 described above.

Next, the cover panel 15 attached to the frame 13 will be described. As shown in FIGS. 1, 3, and 4, the cover panel 15 is disposed on cover almost the entire touch panel 14 from the front, thereby protecting the touch panel 14 and the liquid crystal panel 11. The cover panel 15 covers the entire frame-shaped portion 13a of the frame 13 from the front and constitutes the front outer appearance of the liquid crystal display device 10. The cover panel 15 is made of a glass plate base member that has a rectangular shape and is almost transparent with excellent light transmittance, and it is preferable that the cover panel 15 be made of tempered glass. It is preferable that the tempered glass used for the cover panel 15 be a chemically strengthened glass including a chemically strengthened layer on the surface by applying a chemical strengthening treatment on the surface of a plate-shaped glass base, for example. This chemical strengthening treatment uses ion exchange to strengthen the plate-shaped glass base by substituting an alkali metal ion contained in the glass material with an alkali metal ion that has a larger ion radius. The chemically strengthened layer resulting from this treatment is a compressive strength layer (ion exchange layer) that has residual compressive stress. As a result, the cover panel 15 has a high mechanical strength and shock resistance, thereby more reliably preventing damage or scratches on the touch panel 14 and the liquid crystal panel 11 provided to the rear thereof.

As shown in FIGS. 3 and 4, the cover panel 15 has a rectangular shape in a plan view, like the liquid crystal panel 11 and the touch panel 14, and the plan view size thereof is slightly larger than that of the liquid crystal panel 11 and the touch panel 14. Therefore, the cover panel 15 has a protruding portion 15EP that protrudes outward in an eve shape beyond the entire outer edge of the liquid crystal panel 11 and the touch panel 14. The protruding portion 15EP has a rectangular substantially frame shape surrounding the liquid crystal panel 11 and the touch panel 14, and as shown in FIG. 5, the interior surface thereof is fixed to the outer edge portion 13a2 of the frame-shaped portion 13a of the frame 13 by the second fixing member 31. On the other hand, the central portion of the cover panel 15 facing the touch panel 14 is stacked onto the front of the touch panel 14 across an antireflective film AR.

As shown in FIGS. 3 and 4, a surface light-shielding layer 32 (light-shielding layer; surface light-shielding portion) is formed on the interior (rear) surface (surface facing the touch panel 14) in the outer edge portion of the cover panel 15 including the protruding portion 15EP. The surface light-shielding layer 32 is made of a light-shielding material such as a black coating, for example, and this light-shielding material is printed onto the interior surface of the cover panel 15, and is thus integrally formed with this surface.

When providing the surface light-shielding layer 32, it is possible to use printing methods such as screen printing or inkjet printing, for example. The surface light-shielding layer 32 is formed on portions overlapping the outer edge portions of the touch panel 14 and the liquid crystal panel 11 in a plan view in areas further inside the protruding portion 15EP in addition to the entire protruding portion 15EP of the cover panel 15. Thus, the surface light-shielding layer 32 is disposed on surround the display region of the liquid crystal panel 11, which allows light outside the display region to be blocked, thereby allowing for a high display quality for images displayed in the display region.

Next, the casing 16 attached to the frame 13 will be described. The casing 16 is made of a synthetic resin or a metal, and as shown in FIGS. 1, 3, and 4, has a substantially bowl shape open towards the front, covers members such as the frame-shaped portion 13a of the frame 13, the attaching plate portion 13c, the chassis 22, and the heat-dissipating portion 23, and constitutes the rear outer appearance of the liquid crystal display device 10. The casing 16 has a relatively flat bottom portion 16a, a curved portion 16b that rises from the outer edges of the bottom portion 16a while having a curved shape in a cross-sectional view, and an attaching portion 16c that rises substantially vertically from the outer edge of the curved portion 16b towards the front. The attaching portion 16c has a casing fixing tab 16d having a hook shape in a cross-sectional view, and the casing fixing tab 16d engages the frame fixing tab 35a of the frame 13, thereby securely attaching the casing 16 to the frame 13.

The backlight device 12 of the present embodiment is provided with a configuration for focusing light emitted therefrom in the second direction (Y axis direction), and the reasons and configurations therefor will be described below. As shown in FIGS. 3 and 5, light that is propagated inside the light guide plate 19 is reflected at the inclined surfaces 41a1 of the reflection units 41a constituting the light emission reflection portions 41 and brought towards the front, and emitted at an angle of incidence of less than or equal to the critical angle with respect to the light-exiting surface 19a. In this manner, light traveling in the first direction (X axis direction) is reflected by the reflection units 41a to the front, thereby enabling light to be focused towards the front, that is, from the light-exiting surface 19a towards the front in the direction normal to the light-exiting surface 19a. However, while the light emission reflection portion 41 has the effect of focusing reflected light in the first direction, it does not have much of a light focusing effect on reflected light in the second direction, and thus, there is the possibility of anisotropy in luminance of light emitted from the light-exiting surface 19a. In the present embodiment, light is focused in the second direction by the following configuration. That is, as shown in FIG. 2, the optical sheet 20 is constituted of one prism sheet (emission side anisotropic light focusing portion) 42 having light focusing anisotropy, which selectively applies a light focusing effect on light transmitted in the second direction, whereas the light-exiting surface 19a of the light guide plate 19 is provided with a light-exiting surface-side prism portion 43 (light-exiting surface side anisotropic light focusing portion) having light focusing anisotropy, which selectively applies a light focusing effect on light emitted in the second direction. Furthermore, the opposite plate surface 19c of the light guide plate 19 is provided with an opposite plate surface-side prism portion 44 (opposite plate surface-side anisotropic light focusing portions) having light focusing anisotropy, which selectively applies a light focusing effect in the second direction on light that is being propagated through the light guide plate 19. Next, the prism sheet 42, the light-exiting surface-side prism portion 43, and the opposite plate surface-side prism portion 44 will be described in detail.

Figure 9:
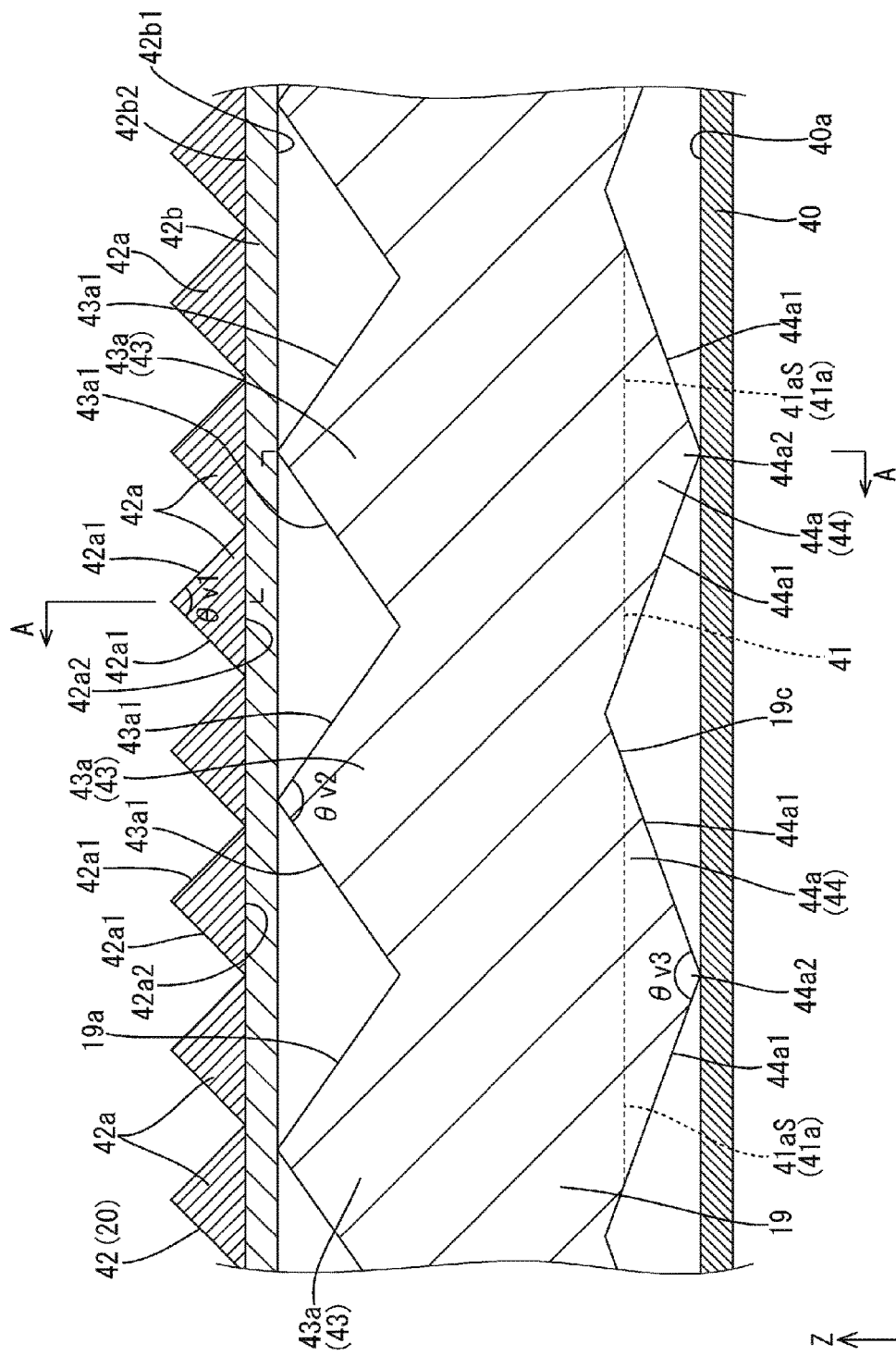
FIG. 9 is a cross-sectional view of a configuration of the backlight device of the liquid crystal display device along the shorter side direction (second direction, Y axis direction).

As shown in FIGS. 2 and 9, the prism sheet 42 includes a sheet base member 42b having a sheet shape of a prescribed thickness, and light-exiting side prisms 42a (light-exiting side light focusing units) having light focusing anisotropy, the light-exiting side prisms 42a being formed on the light-exiting plate surface 42b2 of the sheet base member 42b, which is opposite to the light-receiving plate surface 42b1 (on the light-exiting side) into which emitted light is radiated from the light guide plate 19. The sheet base member 42b is made of a substantially transparent synthetic resin, and is specifically made of a thermoplastic resin such as PET, for example, with an index of refraction of approximately 1.667, for example. The light-exiting side prisms 42a are formed integrally with the light-exiting plate surface 42b2, which is the front plate surface (light-emission side) of the sheet base member 42b. The light-exiting side prisms 42a are made of a transparent ultraviolet curable resin, which is a type of photocurable resin, and when manufacturing the first prism sheet 42, a not yet cured ultraviolet curable resin is filled into a mold and the sheet base member 42b is placed on the opening of that mold, thereby placing the ultraviolet curable resin, which has not yet been cured, in contact with the light-exiting plate surface 42b2, and the ultraviolet curable resin is irradiated with ultraviolet light through the sheet base member 42b in this state to cure the ultraviolet curable resin and provide the light-exiting side prisms 42a integrally with the sheet base member 42b. The ultraviolet curable resin from which the light-exiting side prisms 42a is made is an acrylic resin such as PMMA, for example, and has an index of refraction of approximately 1.59. The light-exiting side prisms 42a are provided so as to protrude towards the front (light emission side) along the third direction (Z axis direction) from the light-exiting plate surface 42b2 of the sheet base member 42b. The light-exiting side prisms 42a extend in a line along the first direction (X axis direction) while forming a substantially triangular (mountain) shape in a cross-sectional view along the second direction (Y axis direction), and a plurality of these light-exiting side prisms 42a are arranged in the second direction on the light-exiting plate surface 42b2. The light-exiting side prisms 42a have a uniform width (dimension in the second direction) along the entire length thereof in the first direction. Each light-exiting side prism 42a has a substantially isosceles triangular shape in a cross-sectional view, has a pair of inclined surfaces 42a1, and the vertex angle $\theta v1$ is substantially a right angle (90°). The plurality of light-exiting side prisms 42a arranged in the second direction all have substantially the same vertex angle $\theta v1$, and width and height dimensions of the bottom surface 42a2 and gaps between adjacent light-exiting side prisms 42a are also substantially the same, and thus, the light-exiting side prisms 42a are disposed at an even interval.

As shown in FIG. 9, when light enters the prism sheet 42 having such a configuration from the light guide plate 19, the light enters the light-receiving plate surface 42b1 of the sheet base member 42b from an air layer present between the light-exiting surface 19a of the light guide plate 19 and the sheet base member 42b of the prism sheet 42, and thus, the light refracts at that interface according to the incident angle. Additionally, when the light transmitted through the sheet base member 42b enters the light-exiting side prism 42a from the light-exiting plate surface 42b2 of the sheet base member 42b, the light also refracts at that interface according to the incident angle. When the light transmitted through the light-exiting side prism 42a has reached the inclined surface 42a1 of the light-exiting side prism 42a, if the incident angle exceeds the critical angle, then the light is totally reflected and returns back to the sheet base member 42b (retroreflected), whereas, if the incident angle does not exceed the critical angle, then the light is refracted and emitted through the interface. Of the light emitted from the inclined surface 42a1 of the light-exiting side prism 42a, light moving towards an adjacent light-exiting side prism 42a enters that adjacent light-exiting side prism 42a and returns back to the sheet base member 42b. In this manner, the direction of the light emitted from the light-exiting side prism 42a is regulated so as to become closer to the frontal direction, and light concentration is selectively applied in the second direction.

Next, the light-exiting surface-side prism portion 43 disposed in the light-exiting surface 19a of the light guide plate 19 will be described. The light-exiting surface-side prism portion 43 is formed integrally with the light guide plate 19. In order to form the light-exiting surface-side prism portion 43 integrally with the light guide plate 19, the light guide plate 19 is formed by injection molding, for example, and a transfer shape to be transferred as the light-exiting surface-side prism portion 43 is formed in advance in the mold surface of the mold. As shown in FIGS. 2, 6, and 9, the light-exiting surface-side prism portion 43 is arranged such that a plurality of light-exiting surface-side prisms 43a (light-exiting surface-side light focusing units) extending in the first direction (X axis direction) are arranged in the second direction (Y axis direction) on the light-exiting surface 19a. The light-exiting surface-side prisms 43a are provided so as to protrude towards the front (light emission side) along the third direction (Z axis direction) from the light-exiting surface 19a. The light-exiting surface-side prisms 43a extend in a line along the first direction (X axis direction) while forming a substantially triangular (mountain) shape in a cross-sectional view along the second direction. The light-exiting surface-side prisms 43a have a uniform width (dimension in the second direction) along the entire length thereof in the first direction. Each light-exiting surface-side prism 43a has a substantially isosceles triangular shape in a cross-sectional view and has a pair of inclined surfaces 43a1, and it is preferable that the vertex angle θv2 thereof be an obtuse angle (greater than or equal to 90°), more preferable that the vertex angle fall within the range of 100° to 150°, and even more preferable that the angle be approximately 110°. In other words, the vertex angle θv2 of the light-exiting surface-side prism 43a is greater than the vertex angle θv1 of the light-exiting side prism 42a. The plurality of light-exiting surface-side prisms 43a arranged in the second direction all have substantially the same vertex angle θv2, and width and height dimensions of the bottom surface, and gaps between adjacent light-exiting surface-side prisms 43a are also substantially the same, and thus, the light-exiting surface-side prisms 43a are disposed at an even interval.

As shown in FIG. 9, the light-exiting surface-side prism portion 43 having such a configuration applies an anisotropic light focusing effect on the light that has been propagated through the light guide plate 19 and reached the light-exiting surface 19a, in the following manner. If the light that has reached the light-exiting surface 19a is at an incident angle at or below the critical angle with respect to the inclined surface 43a1 of the light-exiting surface-side prism 43a, then this light is refracted and emitted from the inclined surface 43a1, thereby selectively focusing the light in the second direction. On the other hand, if the light that has reached the light-exiting surface 19a is at an incident angle that exceeds the critical angle with respect to the inclined surface 43a1 of the light-exiting surface-side prism 43a, then this light is totally reflected at the inclined surface 43a1, thereby being returned to the opposite plate surface 19c (retroreflected). In this manner, the direction of the light emitted from the light-exiting surface 19a is regulated so as to become closer to the frontal direction, and light concentration is selectively applied in the second direction.

Figure 7:
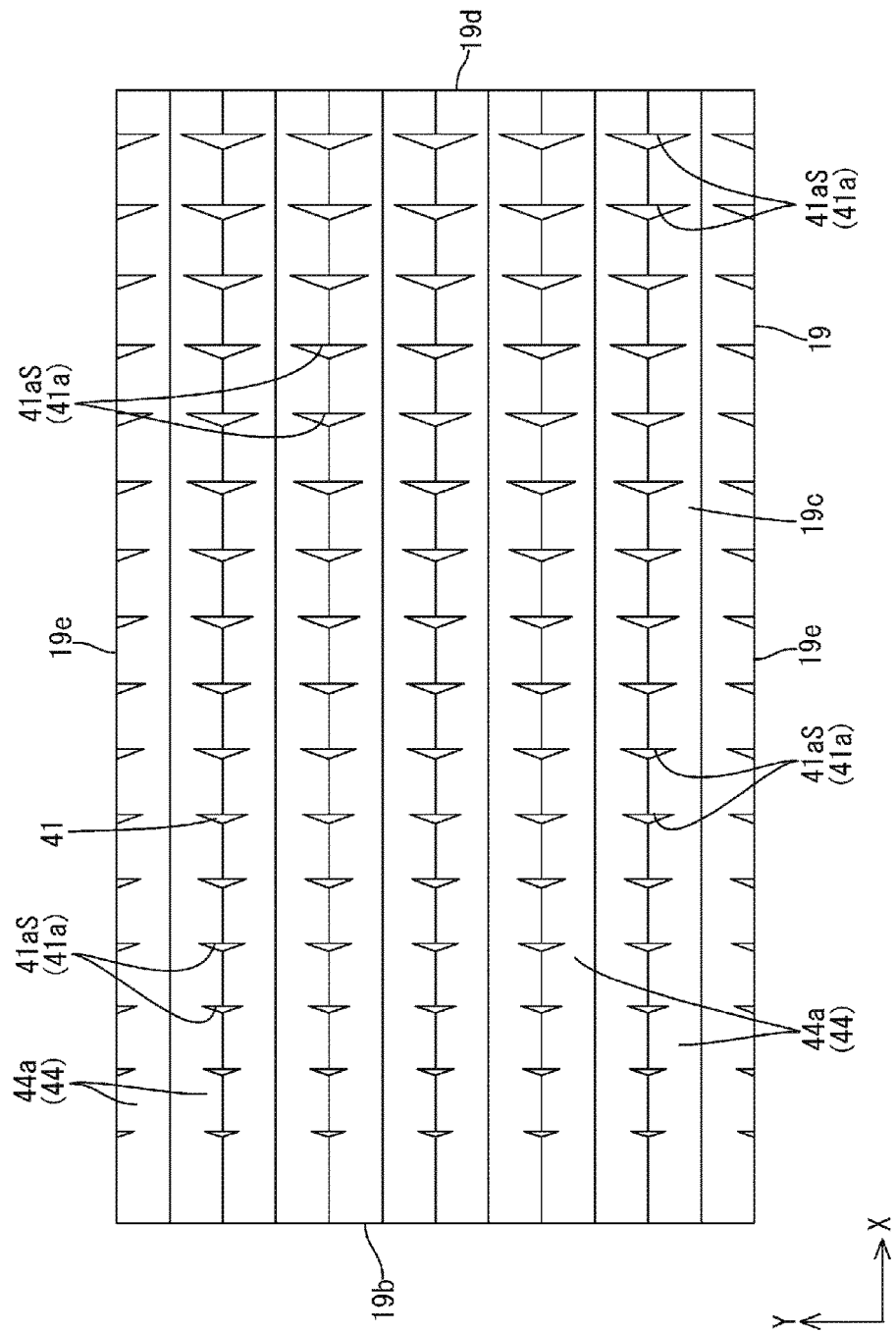
FIG. 7 is a bottom view of a light guide plate.

Next, the opposite plate surface-side prism portion 44 disposed in the opposite plate surface 19c of the light guide plate 19 will be described. The opposite plate surface-side prism portion 44 is formed integrally with the light guide plate 19. In order to form the opposite plate surface-side prism portion 44 integrally with the light guide plate 19, the light guide plate 19 is formed by injection molding, for example, and a transfer shape to be transferred as the opposite plate surface-side prism portion 44 is formed in advance in the mold surface of the mold. As shown in FIGS. 2, 7, and 9, the opposite plate surface-side prism portion 44 is arranged such that a plurality of opposite plate surface-side prisms 44a (opposite plate surface-side light focusing units) extending in the first direction (X axis direction) are arranged in the second direction (Y axis direction) on the opposite plate surface 19c. The opposite plate surface-side prisms 44a are provided so as to protrude towards the rear (opposite to the light emission side) along the third direction (Z axis direction) from the opposite plate surface 19c. The opposite plate surface-side prisms 44a extend in a line along the first direction (X axis direction) while forming a substantially triangular (mountain) shape in a cross-sectional view along the second direction. The opposite plate surface-side prisms 44a have a uniform width (dimension in the second direction) along the entire length thereof in the first direction. Each opposite plate surface-side prism 44a (excluding those disposed in either end in the second direction) has a substantially isosceles triangular shape in a cross-sectional view and has a pair of inclined surfaces 44a1, and it is preferable that the vertex angle θv3 thereof be an obtuse angle (greater than or equal to 90°), more preferable that the vertex angle fall within the range of 100° to 150°, and even more preferable that the angle be approximately 140°. In other words, the vertex angle θv3 of the opposite plate surface-side prism 44a is greater than the vertex angle θv1 of the light-exiting side prism 42a. Also, the vertex angle θv3 of the opposite plate surface-side prism 44a is greater than the vertex angle θv2 of the light-exiting surface-side prism 43a. The plurality of opposite plate surface-side prisms 44a arranged in the second direction all have substantially the same vertex angle θv3 and width and height dimensions of the bottom surface, and gaps between adjacent opposite plate surface-side prisms 44a are also substantially the same, and thus, the opposite plate surface-side prisms 44a are disposed at an even interval. As shown in FIG. 2, the two opposite plate surface-side prisms 44a on both ends in the second direction of the opposite plate surface 19c of the light guide plate 19 have a substantially right triangular shape in a cross-sectional view and have only one inclined surface 44a1, and the vertex angle is approximately half the vertex angle θv3 of the opposite plate surface-side prisms 44a towards the center. In other words, the two opposite plate surface-side prisms 44a disposed in either end in the second direction have a shape in which the central opposite plate surface-side prisms 44a are split in half at the vertex portion along the first direction and the third direction.

Figure 10:
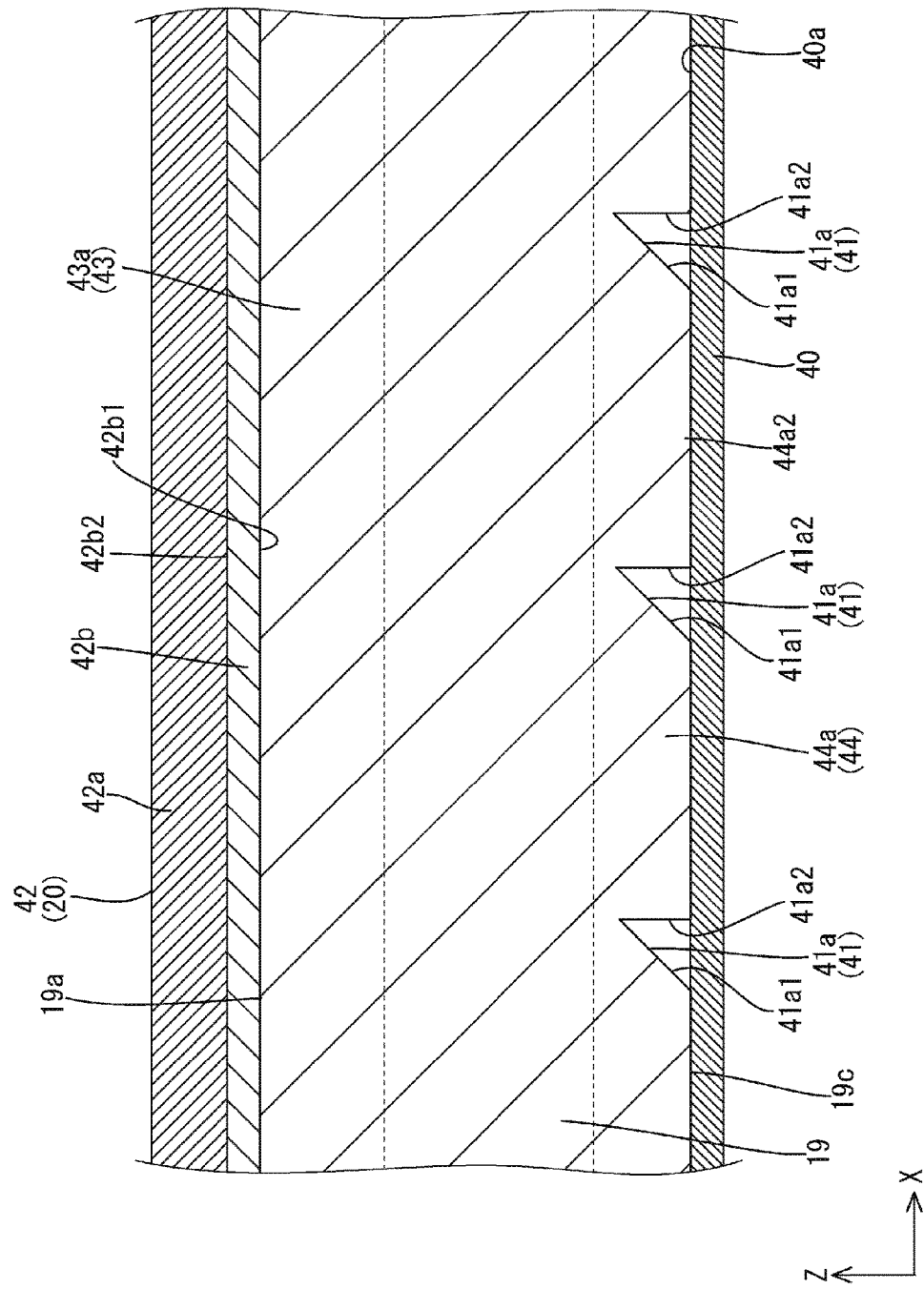
FIG. 10 is a cross-sectional view along the line A-A of FIG. 9.

As shown in FIG. 9, the opposite plate surface-side prism 44a having such a configuration applies an anisotropic light focusing effect on the light that has been propagated through the light guide plate 19 and reached the opposite plate surface 19c, in the following manner. If the light that has reached the opposite plate surface 19c is at an incident angle that exceeds the critical angle with respect to the inclined surface 44a1 of the opposite plate surface-side prism 44a, then this light totally reflected at the inclined surface 44a1, thereby being refracted so as to travel towards the front in the second direction. In this manner, the light that has been refracted by the opposite plate surface-side prisms 44a so as to travel towards the front is reflected at the light emission reflection portion 41 as shown in FIG. 10, thereby traveling upward towards the light-exiting surface 19a. On the other hand, if the light that has reached the light-exiting surface 19a is at an incident angle at or below the critical angle with respect to the inclined surface 44a1 of the opposite plate surface-side prism 44a, then, as shown in FIG. 9, this light is refracted at the inclined surface 43a1 and emitted towards the reflective sheet 40. After the light emitted towards the reflective sheet 40 is reflected by the reflective surface 40a of the reflective sheet 40 and travels back towards the opposite plate surface 19c, it enters the inclined surfaces 44a1 of the opposite plate surface-side prisms 44a, and then is refracted so as to travel again towards the front in the second direction. When the light that was reflected by the light emission reflection portion 41 and traveling towards the light-exiting surface 19a is retroreflected by the light-exiting surface-side prism portion 43 at the light-exiting surface 19a, the light once again travels towards the opposite plate surface 19c on which the opposite plate surface-side prisms 44a are disposed. In this manner, the direction of the light that has been propagated in the light guide plate 19 and has reached the opposite plate surface 19c is regulated so as to become closer to the frontal direction, and light concentration is selectively applied in the second direction as the light travels upward towards the light-exiting surface 19a.

As described above, as shown in FIGS. 9 and 10, light emitted by the LEDs 17 that has entered the light guide plate 19 is selectively focused in the second direction by the opposite plate surface-side prism portion 44 disposed in the opposite plate surface 19c in the process of being propagated in the light guide plate 19, and as a result of being reflected by the light emission reflection portion 41, the light travels upward towards the light-exiting surface 19a. The light that has reached the light-exiting surface 19a is selectively focused in the second direction by the light-exiting surface-side prism portion 43 and emitted. The light emitted from the light-exiting surface 19a is selectively focused even further in the second direction by the light-exiting side prisms 42a in the process of passing through the prism sheet 42. In this manner, it is possible to include, in the light that was emitted from the light-exiting surface 19a towards the prism sheet 42, a large portion of light that would be emitted by the light-exiting side prisms 42a without being retroreflected. In this manner, the usage rate of light can be sufficiently increased, and it is possible to increase the luminance of light emitted by the backlight device 12. Furthermore, as a result of the opposite plate surface-side prism portion 44 being disposed in the opposite plate surface 19c of the light guide plate 19, it is possible to decrease the number of parts required and to contribute to the thinning of the backlight device 12, compared to an arrangement whereby an anisotropic light focusing portion is added to the light-emitting side of the light guide plate 19. Additionally, the light being propagated through the light guide plate 19 is more susceptible to multiple reflection between the light-exiting surface-side prism portion 43 and the opposite plate surface-side prism portion 44, and thus, the light can be suitably diffused in the first direction inside the light guide plate 19. In this manner, the light guide plate 19 is less susceptible to bright and dark portions forming in portions of the light-exiting surface 19a towards the light-receiving face 19b close to the LEDs 17, and the emitted light is less susceptible to uneven luminance.

As shown in FIG. 9, in the prism sheet 42, the vertex angle θv1 of the light-exiting side prisms 42a is less than both vertex angles θv2 and θv3 of the light-exiting surface-side prisms 43a and the opposite plate surface-side prisms 44a as previously described, and thus, compared to the light-exiting surface-side prism portion 43 and the opposite plate surface-side prism portion 44, the light-exiting side prisms 42a cause more light to be retroreflected, and the emission angle of the light is more tightly regulated, thereby providing the strongest light focusing effect. By contrast, light supplied to the prism sheet 42 is anisotropically focused by the opposite plate surface-side prism portion 44 at the opposite plate surface 19c of the light guide plate 19, and then anisotropically focused by the light-exiting surface-side prism portion 43 at the light-exiting surface 19a. Thus, the proportion of light retroreflected at the light-exiting side prisms 42a of the prism sheet 42 is low, and as a result, the light is efficiently emitted by the light-exiting side prisms 42a. In this manner, the usage rate of light can be sufficiently increased, and it is possible to improve the luminance of light emitted by the backlight device 12.

Figure 8:
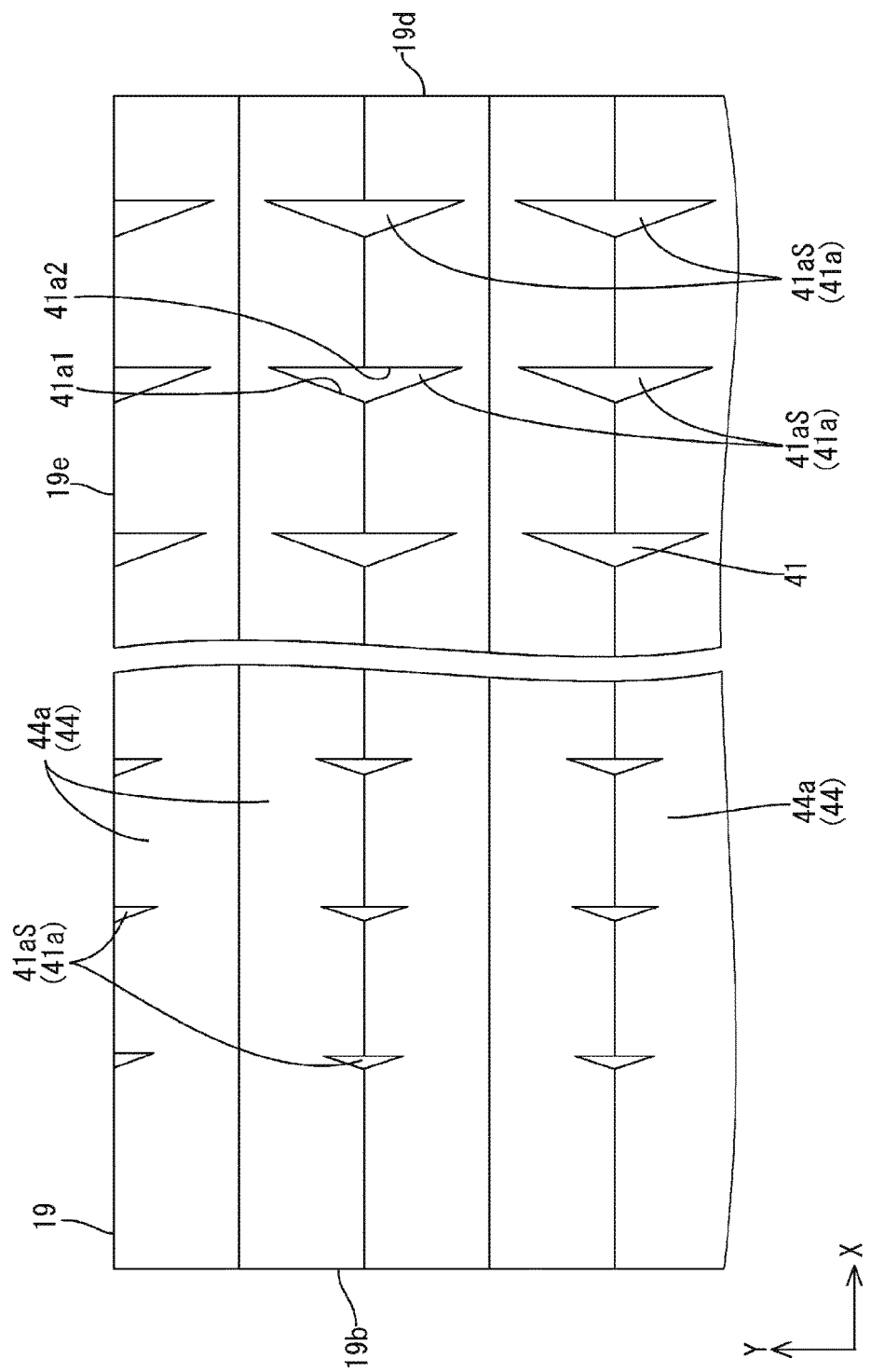
FIG. 8 is a bottom view of a portion of the light guide plate in the vicinity of the edge thereof towards the light-receiving face and in the vicinity of the edge thereof towards the opposite edge face.

Here, the relationship between the light emission reflection portion 41 and the opposite plate surface-side prism portion 44 disposed in the opposite plate surface 19c of the light guide plate 19 will be described in detail. As shown in FIGS. 8 and 9, the reflection units 41a of the light emission reflection portion 41 are formed by partially cutting the vertex portions 44a2 of the opposite plate surface-side prisms 44a of the opposite plate surface-side prism portion 44. Thus, the bottom side portions, which are opposite to the vertex portions 44a2 of the opposite plate surface-side prisms 44a, do not have the reflection units 41a formed therethrough. The height dimension (dimension in the third direction) of the reflection unit 41a is less than the height dimension of the opposite plate surface-side prism 44a. By such a configuration, as shown in FIG. 7, the reflection units 41a extend along the second direction but are not continuous over the entire length of the light guide plate 19 in the second direction, with a plurality of interruptions therebetween. In other words, the reflection units 41a can be said to be constituted of a plurality of split reflection units 41aS that are arranged discontinuously along the second direction with gaps therebetween. Furthermore, the reflection units 41a are formed by partially cutting the vertex portions 44a2 of the opposite plate surface-side prisms 44a, thereby forming openings to the side along the second direction. The number of such split reflection units 41aS of the reflection units 41a is the same as the total number of opposite plate surface-side prisms 44a of the opposite plate surface-side prism portion 44. Also, the central position of the reflection units 41a in the second direction substantially coincides with the second direction arrangement of the vertex portions 44a2 of the opposite plate surface-side prisms 44a. The reflection units 41a, which are aligned in the first direction, are arranged so as to be gradually larger in the height direction (depth direction), the farther way from the light-receiving face 19b (LEDs 17) the reflection units 41a are in the first direction (see FIG. 3), and thus, the farther away the reflection units 41a are from the light-receiving face 19b in the first direction, the larger the width dimension is (range in second direction over which the reflection units 41a are formed). Thus, as shown in FIG. 8, the reflection units 41a disposed towards the light-receiving face 19b in the first direction have a relatively smaller width and a relatively smaller surface area, whereas the reflection units 41a disposed towards the opposite edge face 19d in the first direction have a relatively larger width and a relatively larger surface area. Each split reflection unit 41aS has an isosceles triangular shape in a plan view.

In the reflection unit 41a, the amount of light reflected tends to be proportional to the surface area thereof, and thus, in order to attain the necessary amount of light reflection, the surface area must be set accordingly. This similarly applies to the light emission reflection portions 41, and in order to attain the necessary amount of light reflection by the light emission reflection portions 41, the total surface area of the light emission reflection portions 41 (total combined surface area of the reflection units 41a) must also be set accordingly. Here, if the reflection unit were to be formed so as to extend along the entire length of the light guide plate 19 in the second direction, the third direction dimension of the reflection unit would need to be formed at or above a certain size in order to attain the above-mentioned surface area of the reflection unit. By contrast, if the reflection units 41a are constituted of a plurality of split reflection units 41aS that are arranged discontinuously with gaps therebetween in the second direction, it is possible to set the third direction dimensions of the reflection units 41a to be relatively larger when setting the above-mentioned surface area of the reflection units 41a. Therefore, when manufacturing the light guide plate 19 by resin molding and integrally forming the light emission reflection portions 41 on the opposite plate surface 19c, it is easier to form the split reflection units 41aS of the reflection units 41a as designed on the opposite plate surface 19c. In this manner, it is possible for the light emission reflection portions 41 to appropriately exhibit optical properties. If the reflection units are formed so as to extend along the entire length of the light guide plate 19 in the second direction, then by reducing the number of reflection units arranged in the first direction it is possible to adjust the total of the surface areas of the reflection units, but this would result in a larger gap between reflection units in the first direction, which presents the risk of uneven luminance occurring. By the reflection units 41a being constituted of the plurality of split reflection units 41aS arranged in a discontinuous manner with gaps therebetween, there is no need to modify the number of and gap between the reflection units 41a in the first direction, and thus, there is little risk of uneven luminance in the light emitted by the backlight device 12. Furthermore, the reflection units 41a are formed by partially cutting the vertex portions 44a2 of the opposite plate surface-side prisms 44a, thereby forming openings along the second direction, which allows for excellent light focusing performance by the opposite plate surface-side prism portion 44. Specifically, if the reflection units have a side face along the first direction without any openings in the second direction, the light is refracted or reflected by the side face along the first direction, which presents the risk of decreased light focusing performance by the opposite plate surface-side prism portion. The reflection units 41a are formed by partially cutting the vertex portions 44a2 of the opposite plate surface-side prisms 44a, thereby forming openings along the second direction, which allows for excellent light focusing performance by the opposite plate surface-side prism portion 44, and enables the luminance of the light emitted by the backlight device 12 to be further increased.

Figure 11:
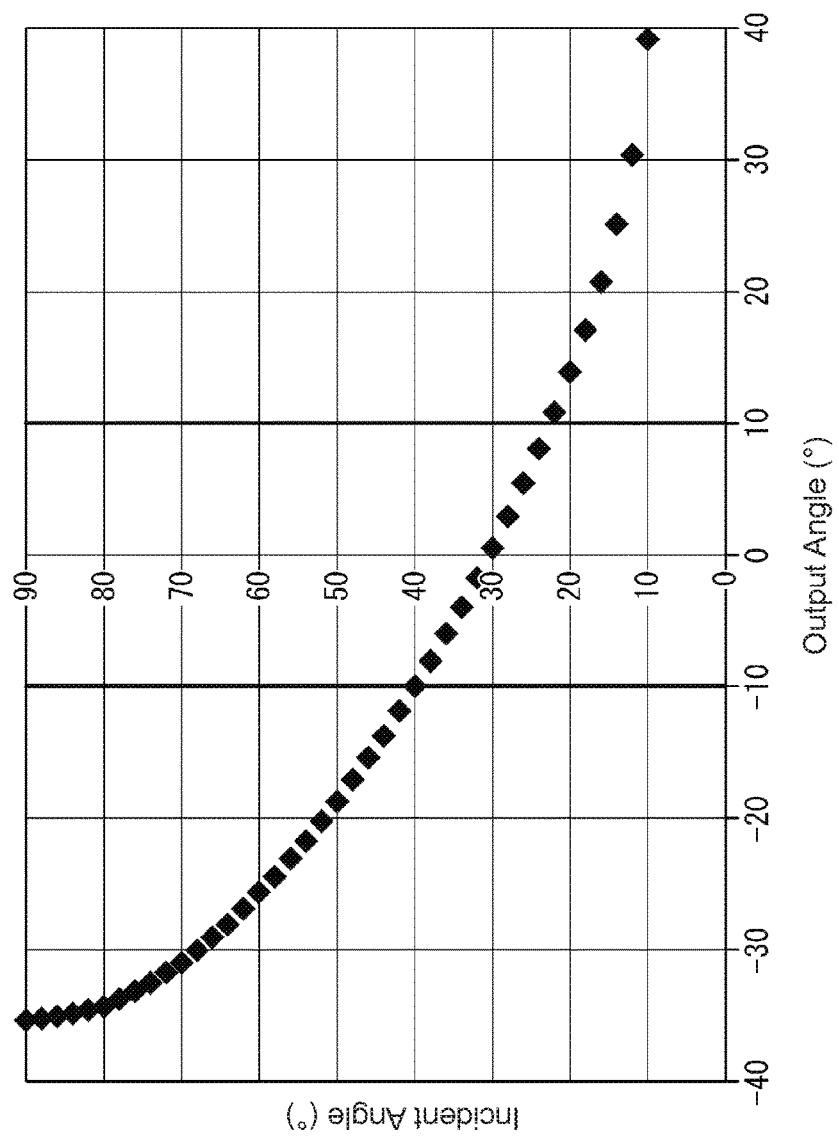
FIG. 11 is a graph representing a relationship between the incident angle of light against the prism sheet and the exit angle of light from the prism sheet.

The following test was performed in order to find out the necessary angle of light supplied to the prism sheet 42 in order to improve frontal luminance of light emitted from the prism sheet 42. Namely, the relationship between the incident angle of light incident on the light-receiving plate surface 42b1 of the sheet base member 42b of the prism sheet 42 and the exit angle of light exiting the inclined face 42a1 of the light-exiting side prism 42a was calculated according to Snell's law, and results thereof are shown in FIG. 11. As a specific method of calculation, first, the exit angle of light from the light-receiving plate surface 42b1 is determined from the incident angle of light on the light-receiving plate surface 42b1, and then, as a result of the exit angle of light from the light-receiving plate surface 42b1 being equal to the incident angle of light on the light-exiting plate surface 42b2 and the bottom surface 42a2 of the light-exiting side prism 42a, the angle of light exiting the light-exiting plate surface 42b2 and the bottom surface 42a2 of the light-exiting side prism 42a is determined (see FIG. 9). Then, as a result of the fact that the exit angle of light from the light-exiting plate surface 42b2 and the bottom surface 42a2 of the light-exiting side prism 42a is equal to the incident angle of light on the inclined face 42a1 of the light-exiting side prism 42a, the angle of light exiting the inclined face 42a1 of the light-exiting side prism 42a is determined (see FIG. 9). The indices of refraction of the sheet base member 42b and the light-exiting side prism 42a, and the vertex angle θv1 of the light-exiting side prism 42a are as already described, and calculations are performed with the assumption that the index of refraction of the external air layer is 1.0. In FIG. 11, the vertical axis represents the incident angle of light on the light-receiving plate surface 42b1 of the sheet base member 42b (with a unit of °), and the horizontal axis represents the exit angle of light from the inclined face 42a1 of the light-exiting side prism 42a (with a unit of °), an exit angle of 0° being the angle at which the light is parallel to the front surface. According to FIG. 11, it can be understood that in order for the exit angle of light from the inclined face 42a1 of the light-exiting side prism 42a to be within the range of ±10°, for example, then the incident angle of light on the light-receiving plate surface 42b1 of the sheet base member 42b needs to be in the range of 23° to 40°. In other words, if the light supplied to the prism sheet 42, that is, the light emitted from the light-exiting surface 19a of the light guide plate 19 has an exit angle in the range of 23° to 40°, then the light exiting the light-exiting side prism 42a of the prism sheet 42a is at an exit angle in the range of ±10° with respect to the frontal direction, enabling the frontal luminance of this exiting light to be improved.

Next, Comparison Experiment 1 was performed in order to determine whether uneven luminance in light exiting from the light-exiting surface occurs with a configuration in which the opposite plate surface-side prism portion 44 was provided on the opposite plate surface 19c of the light guide plate 19 as in the present embodiment, and a configuration in which the opposite plate surface-side prism portion is not provided on the opposite plate surface of the light guide plate. In Comparison Experiment 1, a configuration in which a light emission reflection portion is provided on the opposite plate surface of the light guide plate, and a light-exiting surface-side prism portion constituted of a plurality of light-exiting surface-side prisms having a vertex angle of 140° is provided on the light-exiting surface is Comparison Example 1, a configuration in which a light emission reflection portion is provided on the opposite plate surface of the light guide plate, and a light-exiting surface-side prism portion constituted of a plurality of light-exiting surface-side prisms having a vertex angle of 110° is provided on the light-exiting surface is Comparison Example 2, a configuration in which a light emission reflection portion is provided on the opposite plate surface of the light guide plate, and a lenticular lens portion constituted of a plurality of cylindrical lenses is provided on the light-exiting surface is Comparison Example 3, and a configuration in which an opposite plate surface 19c of a light guide plate 19 is provided with a light emission reflection portion 41 and an opposite plate surface-side prism portion 44 constituted of a plurality of opposite plate surface-side prisms 44a having a vertex angle of 140°, and in which the light-exiting surface 19a is provided with a light-exiting surface-side prism portion constituted of a plurality of light-exiting surface-side prisms having a vertex angle of 110° is Working Example 1. The light guide plate 19 of Working Example 1 is the same as what was described in previous paragraphs. The lenticular lens portion provided on the light guide plate of Comparison Example 3 has a configuration in which a plurality of cylindrical lenses having a substantially semicylindrical shape extending along the first direction are arranged along the second direction such that the extension directions of the cylindrical lenses are substantially parallel to each other. The light emission reflection portion and the light-exiting surface-side prism portion of the light guide plate of Comparison Examples 1 and 2 have a similar structure to the light emission reflection portion 41 and the light-exiting surface-side prism portion 43 described in previous paragraphs. Similarly, the light emission reflection portion of the light guide plate Comparison Example 3 has a similar structure to the light emission reflection portion 41 described in previous paragraphs. However, the opposite plate surfaces of the light guide plates of Comparison Examples 1 to 3 are not provided with an opposite plate surface-side prism portion 44, and thus, the reflection units provided on the respective light guide plates of Comparison Examples 1 to 3 are provided so as to extend continuously (with no interruption) across the entire length of the light guide plates in the second direction.

Figure 12:
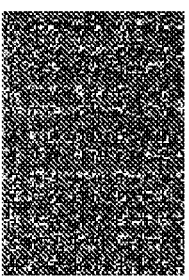
FIG. 12 is a table of Comparison Experiment 1 showing photographs taken from the light-exiting surface of light guide plates of Comparison Examples 1 to 3 and Working Example 1, and determination results for uneven luminance.

In Comparison Experiment 1, the presence or absence of uneven luminance was determined for the light guide plates of Comparison Experiments 1 to 3 and Working Example 1 on the basis of photographs taken from the light-exiting surface side in a state where light from LEDs is radiated into the light-receiving face and light is being emitted from the light-exiting surface, and results of this experiment are shown in the table of FIG. 12. FIG. 12 shows photographs taken from the light-exiting surface side of the light guide plates of Comparison Examples 1 to 3 and Working Example 1 with light being radiated from the light-exiting surfaces, and determination results for uneven luminance on the basis of these photographs. The photographs shown in FIG. 12 show, in particular, the portion of the light-exiting surfaces of the light guide plates towards the light-receiving faces, and LEDs, which are not shown, are disposed directly below the photographs. According to FIG. 12, whereas uneven luminance is visible with the light guide plates of Comparison Examples 1 to 3, uneven luminance is mostly not visible with the light guide plate 19 of Working Example 1. Specifically, the light guide plates of Comparison Examples 1 and 2 have configurations in which the opposite plate surface-side prism portion is not disposed in the opposite plate surface and the light-exiting surface-side prism portion constituted of light-exiting surface-side prisms having a triangular cross-section is disposed in the light-exiting surface, and thus, it is difficult for light that was totally reflected at the inclined faces of the light-exiting surface-side prisms to spread over a wide range in the first direction, which means that such configurations are susceptible to uneven luminance of light exiting the light-exiting surface. By contrast, the light guide plate of Comparison Example 3 has a configuration in which the opposite plate surface-side prism portion is not disposed in the opposite plate surface and the lenticular lens portion constituted of the cylindrical lenses is disposed in the light-exiting surface, which facilitates the spread of light that was totally reflected by the curved surfaces of the cylindrical lenses over a wide range in the first direction. Thus, whereas Comparison Example 3 is less susceptible to uneven luminance in light exiting the light-exiting surface than Comparison Examples 1 and 2, some minor unevenness in luminance is visible. On the other hand, in the case of the light guide plate 19 of Working Example 1, the opposite plate surface-side prism portion 44 is disposed in the opposite plate surface 19c and the light-exiting surface-side prism portion 43 is disposed in the light-exiting surface 19a, and thus, light propagated through the light guide plate 19 undergoes multiple reflection between the light-exiting surface-side prism portion 43 and the opposite plate surface-side prism portion 44, enabling the light to spread over a wider range in the first direction than for Comparison Example 3. In this manner, Working Example 1 is less susceptible than Comparison Example 3 to uneven luminance in light exiting the light-exiting surface 19a, and in particular, is less susceptible to bright and dark portions being formed in portions of the light-exiting surface 19a towards the light-receiving face 19b close to the LEDs, and almost no unevenness in luminance is visible.

Figure 13:
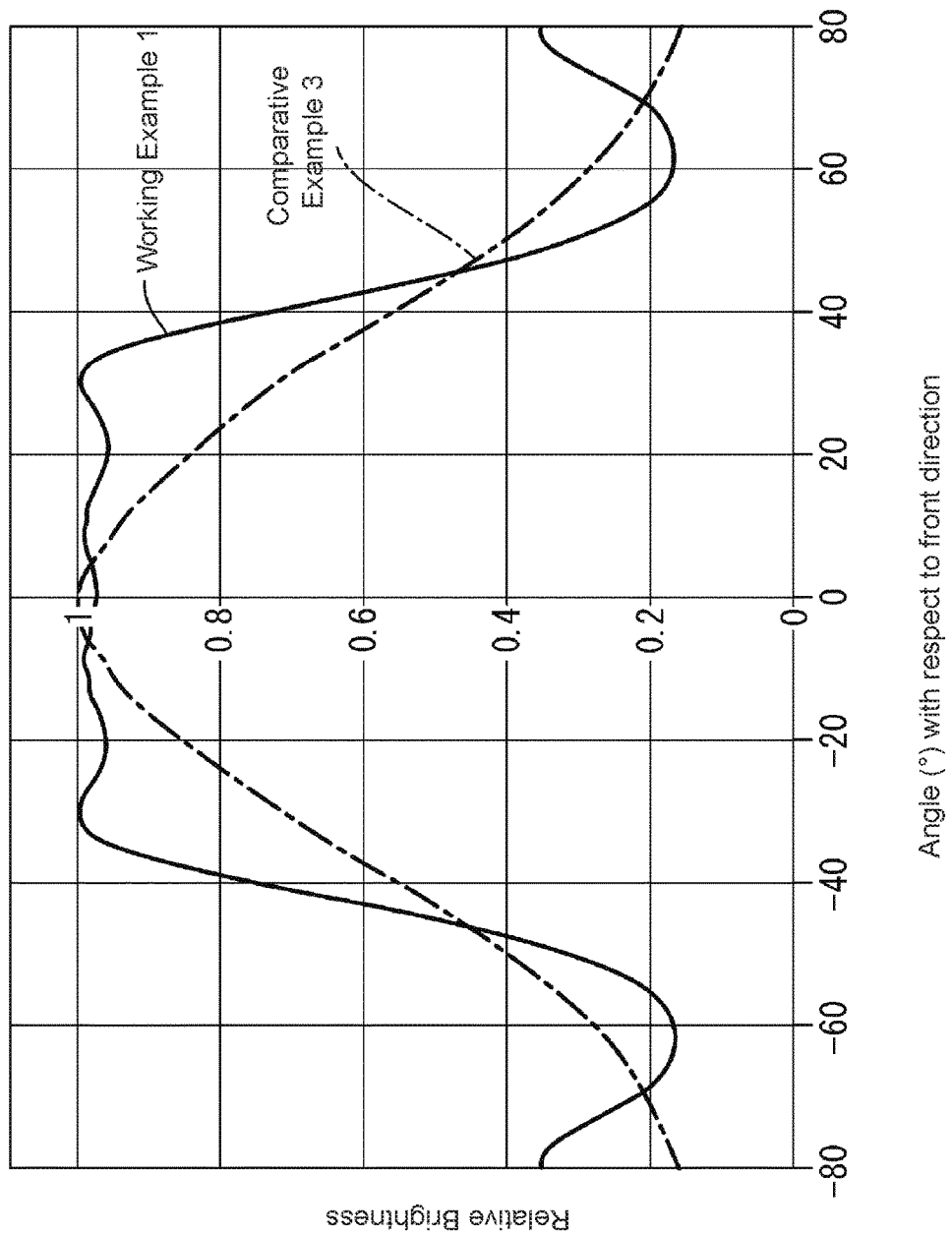
FIG. 13 is a graph of Comparison Experiment 2 showing luminance angular distributions in a second direction of light emitted from the light guide plates of Comparison Example 3 and Working Example 1.
Figure 14:
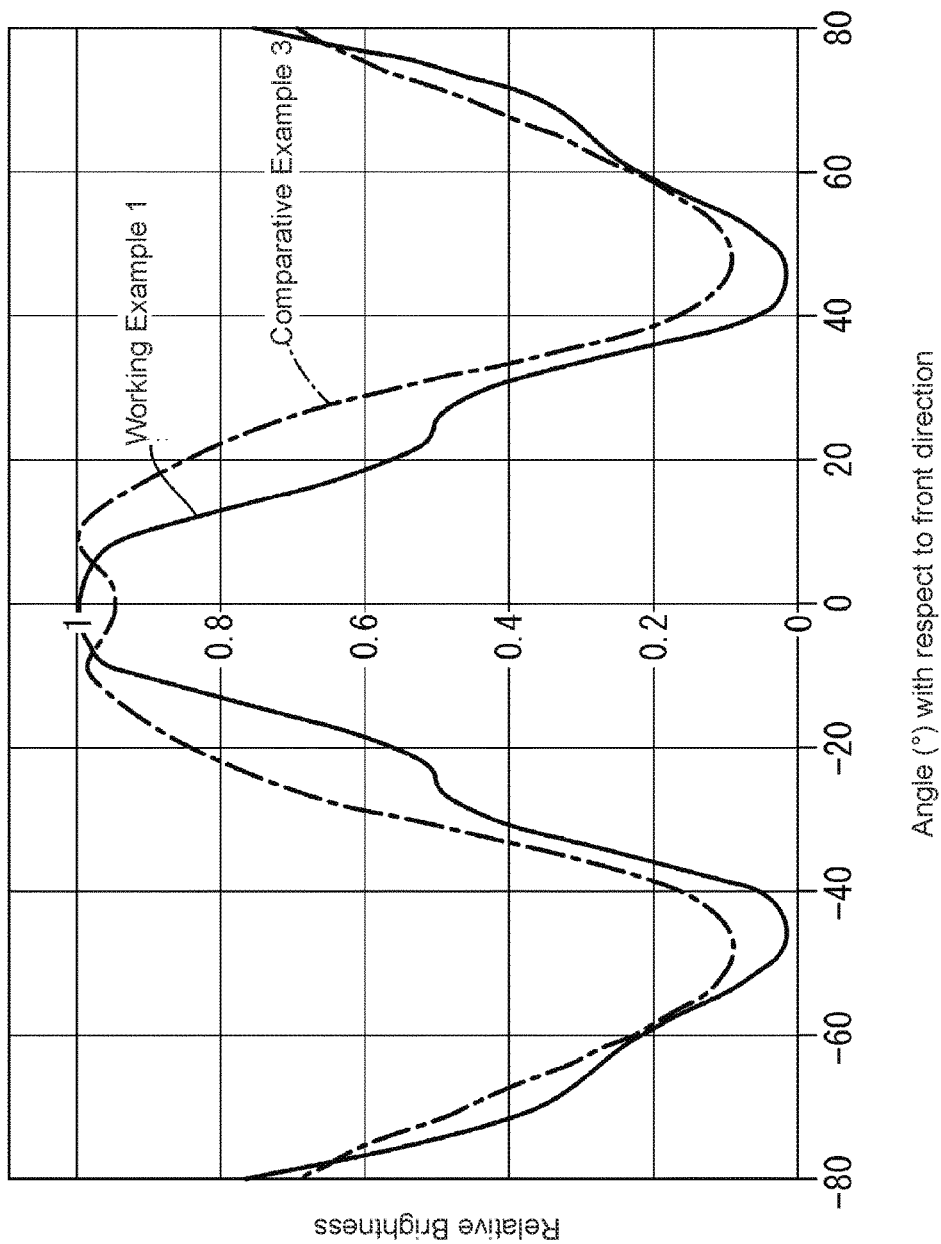
FIG. 14 is a graph of Comparison Experiment 2 showing luminance angular distributions in a second direction of emitted light obtained by passing light emitted by the light guide plates of Comparison Example 3 and Working Example 1 through a prism sheet.

Next, Comparison Experiment 2 described below was performed using the light guide plate of Comparison Example 3 and the light guide plate 19 of Working Example 1, which were described in Comparison Experiment 1. In Comparison Experiment 2, the luminance distribution of light exiting the light guide plates of Comparison Example 3 and Working Example 1 and the luminance distribution of light that has exited the respective light guide plates, passed through the prism sheet 42, and exited therefrom were both measured, and the results thereof are shown in FIGS. 13 and 14. Specifically, in Comparison Experiment 2, by radiating light from LEDs on the light-receiving faces of the respective light guide plates of Comparison Example 3 and Working Example 1, light was emitted from the light-exiting surfaces of the light guide plates, and in that state, the luminance distribution of light exiting the light-exiting surface was measured. Furthermore, the prism sheet 42 was layered onto the light-exiting side of each light guide plate of Comparison Experiment 3 and Working Example 1, and the luminance distribution of the light exiting through the prism sheet 42 was measured. The prism sheet 42 used in Comparison Experiment 2 is the same as what was described in previous paragraphs. FIG. 13 shows the results of measuring the luminance distribution of light exiting the light guide plates of Comparison Example 3 and Working Example 1, and FIG. 14 shows the results of measuring the luminance distribution of light that has exited the respective light guide plates of Comparison Example 3 and Working Example 1, passed through the prism sheet 42, and exited therefrom. FIG. 13 indicates the relative luminance (no unit) of light emitted from the light guide plate on the vertical axis, and indicates the angle (with a unit of "°") of the light with respect to the frontal direction in the second direction on the horizontal axis. FIG. 14 indicates the relative luminance (no unit) of light emitted from the prism sheet 42 on the vertical axis, and indicates the angle (with a unit of "°") of the light with respect to the frontal direction in the second direction on the horizontal axis. The relative luminance on the vertical axis of FIG. 13 is a value relative to a reference luminance (1.0) measured for a case in which the measurement is made from the frontal direction (angle of 0°) for when the light guide plate according to Comparison Example 3 is used. The relative luminance on the vertical axis of FIG. 14 is a value relative to a reference luminance (1.0) measured for a case in which the measurement is made from the frontal direction (angle of 0°) for when the light guide plate 19 according to Working Example 1 is used. In FIGS. 13 and 14, the solid line curve represents Working Example 1, and the one-dot-chain line curve represents Comparison Example 3.

The results of Comparison Experiment 2 will be described below. As seen in FIG. 13, compared to the light emitted from the light guide plate of Comparison Example 3, the light emitted from the light guide plate 19 of Working Example 1 includes a relatively large amount of components having a direction of progression of ±40° relative to the frontal direction, and in particular, includes a large amount of components having a direction of progression of ±20° to ±40° relative to the frontal direction. As seen in FIG. 14, compared to the light that was emitted from the light guide plate of Comparison Example 3 and then passed through the prism sheet 42, the light that was emitted from the light guide plate 19 of Working Example 1 and then passed through the prism sheet 42 includes a relatively large amount of components having a direction of progression of ±10° relative to the frontal direction, whereas there are relatively few components having a direction of progression of ±10° to ±30° relative to the frontal direction. In other words, the light that has exited the light guide plate 19 of Working Example 1 and has passed through the prism sheet 42 is focused to a greater degree in the frontal direction than for Comparison Example 3. As already described, the frontal luminance of the light exiting the prism sheet 42 tends to be proportional to the amount of light having an exit angle in the range of ±23° to ±40° among the light exiting the light guide plate. Thus, as shown in FIGS. 13 and 14, a result was attained in which the frontal luminance of light that has exited the light guide plate 19 of Working Example 1 and passed through the prism sheet 42 is greater than the frontal luminance of light that has exited the light guide plate of Comparison Example 3 and passed through the prism sheet 42.

Next, Comparison Experiment 3 was performed in order to determine how the luminance changes when the vertex angles of the light-exiting surface-side prisms 43a and the opposite plate surface-side prisms 44a are changed in the light guide plate 19 of the present embodiment, which includes the light-exiting surface-side prism portion 43 and the opposite plate surface-side prism portion 44. In Comparison Experiment 3, in addition to using the light guide plate of Comparison Example 3 and the light guide plate 19 of Working Example 1, which were described in Comparison Experiment 1, a light guide plate 19 in which the light-exiting surface-side prisms 43a have a vertex angle θv2 of 150° and the opposite plate surface-side prisms 44a have a vertex angle θv3 of 150° is designated as Working Example 2, a light guide plate 19 in which the light-exiting surface-side prisms 43a have a vertex angle θv2 of 120° and the opposite plate surface-side prisms 44a have a vertex angle θv3 of 140° is designated as Working Example 3, a light guide plate 19 in which the light-exiting surface-side prisms 43a have a vertex angle θv2 of 110° and the opposite plate surface-side prisms 44a have a vertex angle θv3 of 100° is designated as Working Example 4, a light guide plate 19 in which the light-exiting surface-side prisms 43a have a vertex angle θv2 of 140° and the opposite plate surface-side prisms 44a have a vertex angle θv3 of 140° is designated as Working Example 5, a light guide plate 19 in which the light-exiting surface-side prisms 43a have a vertex angle θv2 of 100° and the opposite plate surface-side prisms 44a have a vertex angle θv3 of 140° is designated as Working Example 6, a light guide plate 19 in which the light-exiting surface-side prisms 43a have a vertex angle θv2 of 140° and the opposite plate surface-side prisms 44a have a vertex angle θv3 of 100° is designated as Working Example 7, and a light guide plate 19 in which the light-exiting surface-side prisms 43a have a vertex angle θv2 of 110° and the opposite plate surface-side prisms 44a have a vertex angle θv3 of 130° is designated as Working Example 8. The prism sheet 42 was layered onto the light-exiting side of each light guide plate of Comparison Experiment 3 and Working Examples 1 to 8, and the luminance of the light exiting through the prism sheet 42 was measured, the results of which are shown in FIG. 15. The prism sheet 42 used in Comparison Experiment 3 is the same as what was described in previous paragraphs. FIG. 15 is a table showing the relative luminance (with a unit of "%") of emitted light obtained by passing light emitted by the light guide plates of Comparison Example 3 and Working Examples 1 to 8 through the prism sheet 42. The relative luminance shown in FIG. 15 is a value relative to a reference luminance (100%) measured for a case in which the light guide plate according to Comparison Example 3 is used.

The results of Comparison Experiment 3 will be described below. As seen from FIG. 15, when the light guide plates 19 of Working Examples 1 to 8 are used, the luminance of light exiting the prism sheet 42 becomes greater than for the light guide plate of Comparison Example 3, and an improvement in luminance of 5% or greater can be seen in all Working Examples. Among these, Working Examples 1 to 3 are preferable due to exhibiting an improvement in luminance of 10% or greater. Working Examples 1 to 2 are even more preferable due to exhibiting an improvement in luminance of 15% or greater. Working Example 1 exhibits the greatest luminance, and thus, Working Example 1 is most preferable.

Figure 16:
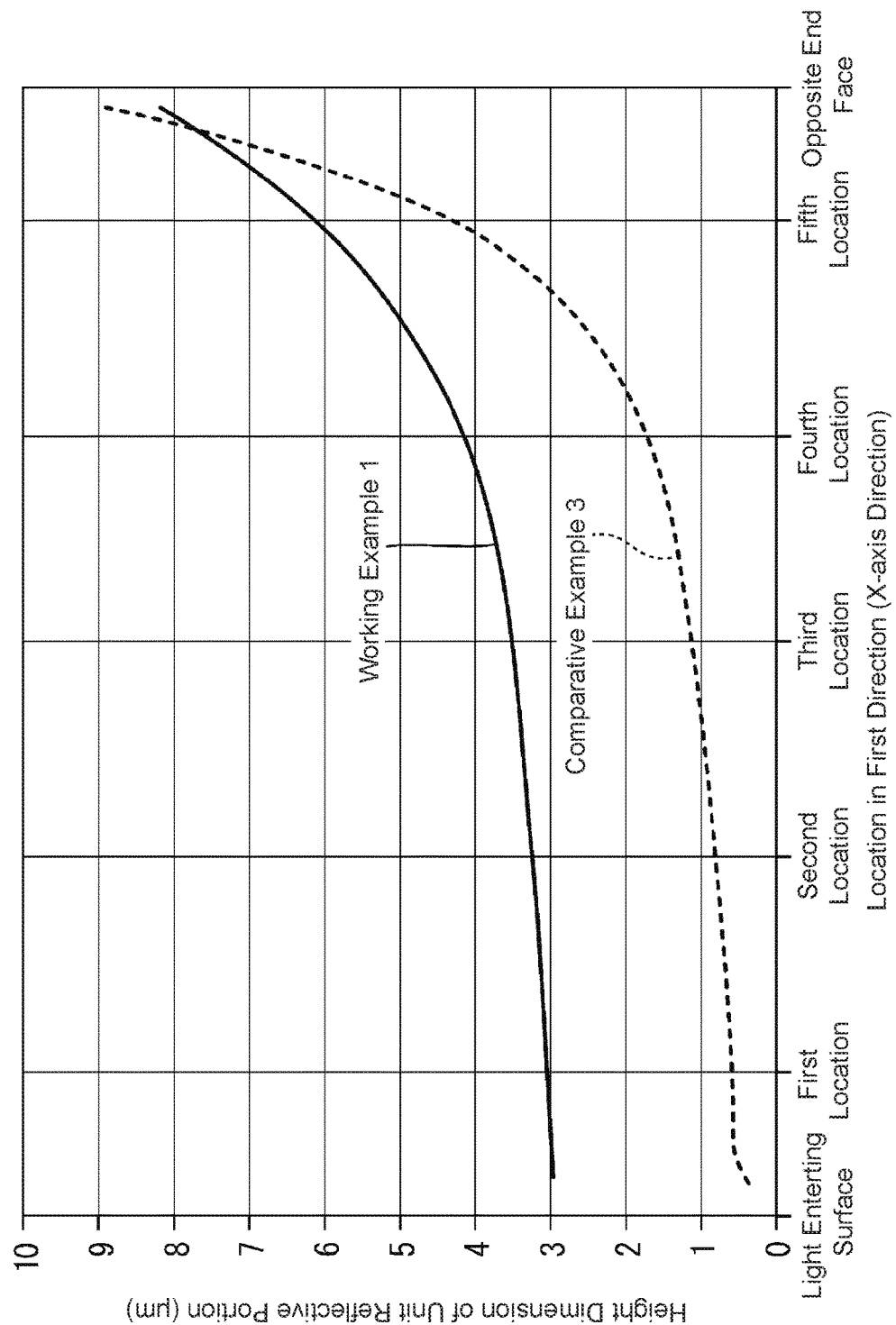
FIG. 16 is a graph of Comparison Experiment 4 showing the height dimensions of reflection units forming light emission reflection portions of the respective light guide plates of Comparison Example 3 and Working Example 1.

Next, the light guide plate of Comparison Example 3 and the light guide plate 19 of Working Example 1 described in Comparison Experiment 1 were used to perform Comparison Experiment 4 to determine what kind of change occurs in the reproducibility of the shape of the reflection units of the light emission reflection portion according to the presence or absence of the opposite plate surface-side prism portion 44. The opposite plate surface of the light guide plate of Comparison Example 3 is not provided with the opposite plate surface-side prism portion 44. Thus, the reflection units provided on the light guide plate of Comparison Example 3 are provided so as to extend continuously (with no interruption) across the entire length of the light guide plate in the second direction, and the number of reflection units arranged in the first direction (X axis direction) is the same as the number of reflection units 41a provided on the light guide plate 19 of Working Example 1. In Comparison Experiment 4, the height of the reflection units of the light emission reflection portion was measured in different positions in the first direction on the light guide plate of Comparison Example 3 and the light guide plate 19 of Working Example 1, the results of which are shown in FIG. 16. Each light guide plate was divided into six substantially equal parts; the positions where the divisions were made were designated in order from the light-receiving face as a first position, a second position, a third position, a fourth position, and a fifth position; and the reproducibility of the shape of the reflection units 41a at each position was determined, the results of which are shown in FIG. 17. In FIG. 16, the vertical axis indicates the height (in μm) of the reflection units, and the horizontal axis indicates the positions on the respective light guide plates in the first direction. Among the positions in the first direction on the horizontal axis of FIG. 16, the left end of FIG. 16 indicates the position at the light-receiving face of each light guide plate, and the right end of the same drawing indicates the position at the opposite edge face of each light guide plate. FIG. 17 shows the height dimensions of reflection units from the first to fifth positions, and the determination results for the reproducibility of the shapes of the reflection units. The reproducibility of the shapes of the reflection units is determined on the basis of the degree of divergence present between the distribution of light exiting a light guide plate generated in an optical simulation (a theoretical value) and the distribution of light exiting a light guide plate that was actually formed by resin molding. If the divergence exceeds an allowable range, this indicates "bad shape reproducibility" and if the divergence does not exceed the allowable range, this indicates "good shape reproducibility."

The results of Comparison Experiment 4 will be described below. As seen in FIG. 15, in both the light guide plate 19 of Working Example 1 and the light guide plate of Comparison Example 3, the height of the reflection units gradually increases from the light-receiving face towards the opposite edge face. However, as seen in FIG. 15, the height of the reflection units 41a provided on the light guide plate 19 of Working Example 1 is greater overall than the height of the reflection units provided on the light guide plate of Comparison Example 3. This is because, whereas the reflection units provided on the light guide plate of Comparison Example 3 are formed so as to extend continuously over the entire length of the light guide plate in the second direction, the reflection units 41a provided on the light guide plate 19 of Working Example 1 are constituted of a plurality of split reflection units 41aS, which are arranged discontinuously in the second direction with gaps therebetween. Reasons thereof are described in detail below. First, the surface area of the reflection unit is proportional to the amount of light reflected by the reflection unit, and thus, in order to attain the necessary amount of light reflection, the surface area of the reflection unit must be set according to the target amount of light reflection. Here, in the light guide plate of Comparison Example 3, the reflection units are formed so as to extend continuously along the entire length of the light guide plate in the second direction, and thus, in order to set the surface area of the reflection units as described above, the height of the reflection units cannot be set too high. By contrast, in the light guide plate of Working Example 1, the reflection units 41a are constituted of a plurality of split reflection units 41aS that are arranged discontinuously with gaps therebetween in the second direction, and thus, it is possible to set the height of the reflection units 41a to be greater when setting the surface area of the reflection units 41a as described above. For these reasons, the height of the reflection units 41a provided on the light guide plate 19 of Working Example 1 is greater overall than the height of the reflection units provided on the light guide plate of Comparison Example 3.

Next, as seen in FIG. 16, the shape reproducibility of the reflection unit is excellent when the height of the reflection units exceeds roughly 3.2 μm. In the light guide plate of Comparison Example 3, the shape reproducibility of the reflection units is not good in the first to fourth positions, and the shape reproducibility in the fifth position is excellent. By contrast, in the light guide plate 19 of Working Example 1, the shape reproducibility of the reflection units is excellent in the second to fifth positions, and the shape reproducibility in the first position is good. This is because, whereas most of the plurality of reflection units 41a provided on the light guide plate 19 of Working Example 1 have a height exceeding 3.2 μm, which is the standard height that determines whether or not the shape reproducibility of the reflection units is good, most of the plurality of reflection units provided on the light guide plate of Comparison Example 3 have a height that does not exceed the standard value (3.2 μm). As described above, by provided an opposite plate surface-side prism portion 44 in addition to the light emission reflection portion 41 on the opposite plate surface 19c of the light guide plate 19 as in Working Example 1, and splitting the reflection units 41a of the light emission reflection portion 41 into a plurality of split reflection units 41aS, it is possible to sufficiently increase the height of the reflection units 41a, which enables the split reflection units 41aS, which constitute the reflection unit 41a on the opposite plate surface 19c, to be formed as designed when manufacturing the light guide plate 19 by resin molding. In this manner, it is possible for the light emission reflection portions 41 to appropriately exhibit optical properties. One method to increase the height of the reflection units of the light guide plate of Comparison Example 3 is to decrease the number of reflection units aligned in the first direction, for example, thereby setting the total of the surface areas of the respective reflection units to be a certain value. However, this results in a wide gap between the reflection units arranged in the first direction, which presents the risk of uneven luminance occurring in light exiting the light guide plate. However, by the reflection units 41a being constituted of the plurality of split reflection units 41aS arranged in a discontinuous manner with gaps therebetween as in the light guide plate 19 of Working Example 1, there is no need to modify the number of and gap between the reflection units 41a in the first direction, and thus, there is little risk of uneven luminance in the light emitted by the light guide plate 19.

The backlight device 12 (illumination device) of the present embodiment, as described above, includes: LEDs 17 (light sources); a light guide plate 19 having a rectangular plate shape, at least one of a pair of edge faces forming opposing sides of outer edge faces of the light guide plate being a light-receiving face 19b into which light emitted by the LEDs 17 is radiated, one plate surface of the light guide plate 19 being a light-exiting surface 19a from which light exits, another plate surface thereof being an opposite plate surface 19c; a prism sheet 42 (light-exiting side anisotropic light focusing portion) that is disposed in a light-exiting side of the light guide plate 19, the prism sheet 42 being formed by arranging, in a second direction along a pair of edge faces 19b and 19d of the outer edge faces of the light guide plate 19 including the light-receiving face 19b, a plurality of light-exiting side prisms 42a (light-exiting side light focusing units) that extend along a first direction along side edge faces 19e, which are a pair of edge faces that form opposing sides of the outer edge faces of the light guide plate 19 and do not include the light-receiving face 19b; a light-exiting surface-side prism portion 43 (light-exiting surface-side anisotropic light focusing prism portion) that is disposed in the light-exiting surface 19a of the light guide plate 19, and that is formed by arranging a plurality of light-exiting surface-side prisms 43a (light-exiting surface-side unit light focusing units), extending in the first direction, along the second direction; a light emission reflection portion 41 that is disposed in the opposite plate surface 19c of the light guide plate 19 and that is formed by arranging a plurality of reflection units 41a, extending in the second direction, along the first direction with gaps therebetween; and an opposite plate surface-side prism portion 44 (opposite plate surface-side anisotropic light focusing prism portion) that is disposed in the opposite plate surface 19c of the light guide plate 19, and that is formed by arranging a plurality of opposite plate surface-side prisms 44a (opposite plate surface-side light focusing units) extending in the first direction, in the second direction.

In this manner, light emitted from the LEDs 17 enters the light-receiving face 19b of the light guide plate 19, is propagated inside the light guide plate 19, and in the process is reflected by the light emission reflection portions 41 disposed in the opposite plate surface 19c of the light guide plate 19. The light emission reflection portions 41 formed by arranging a plurality of reflection units 41a, extending in the second direction, along the first direction with gaps therebetween, and thus, by reflecting light traveling in the light guide plate 19 along the first direction off of the plurality of reflection units 41a, the light can be caused to travel upward towards the light-exiting surface 19a. In this manner, it is possible to cause the light to be emitted from the light-exiting surface 19a.

The light that has reached the light-exiting surface 19a of the light guide plate 19 is anisotropically focused by the light-exiting surface-side prism portion 43 disposed in the light-exiting surface 19a of the light guide plate 19. In other words, the light-exiting surface-side prism portion 43 has a configuration in which a plurality of light-exiting surface-side prisms 43a, extending along the first direction, are arranged in the second direction, and thus, the light emitted from the light-exiting surface-side prisms 43a is selectively focused in the second direction, which is the direction along which the light-exiting surface-side prisms 43a are aligned. The light emitted from the light-exiting surface 19a is further anisotropically focused by the prism sheet 42 disposed on the light-exiting side of the light guide plate 19. In other words, the prism sheet 42 has a configuration in which a plurality of light-exiting side prisms 42a, extending along the first direction, are arranged in the second direction, and thus, the light emitted from the light-exiting side prisms 42a is selectively focused in the second direction, which is the direction along which the light-exiting side prisms 42a are aligned.

In this manner, the light emitted from the backlight device 12 is first selectively focused in the second direction by the light-exiting surface-side prism portion 43, and then selectively focused in the second direction by the prism sheet 42, causing the light to travel towards the front in an excellent manner. However, when the light that has been anisotropically focused by the light-exiting surface-side prism portion 43 has entered the prism sheet 42, there is still a lot of light that is retroreflected by the light-exiting side prisms 42a, which means that the usage rate of light is not sufficiently high, which has meant that there is room for improvement in the luminance of light emitted by the backlight device 12.

However, the opposite plate surface-side prism portion 44 is disposed in the opposite plate surface 19c of the light guide plate 19, and the opposite plate surface-side prism portion 44 has a configuration in which a plurality of opposite plate surface-side prisms 44a, extending along the first direction, are arranged in the second direction, and thus, the light that was propagated in the light guide plate 19 and has reached the opposite plate surface 19c is selectively focused in the second direction, which is the direction along which the opposite plate surface-side prisms 44a are aligned. The light that has been anisotropically focused at the opposite plate surface 19c is caused to travel upward towards the light-exiting surface 19a by the light emission reflection portions 41 and then further selectively focused in the second direction by the light-exiting surface-side prism portion 43 at the light-exiting surface 19a. In this manner, it is possible to include, in the light that was emitted from the light-exiting surface 19a towards the prism sheet 42, a large portion of light that would be emitted by the light-exiting side prisms 42a without being retroreflected. In this manner, the usage rate of light can be sufficiently increased, and it is possible to increase the luminance of light emitted by the backlight device 12. Furthermore, as a result of the opposite plate surface-side prism portion 44 being disposed in the opposite plate surface 19c of the light guide plate 19, it is possible to decrease the number of parts required and to contribute to the thinning of the backlight device 12, compared to an arrangement whereby an anisotropic light focusing portion is added to the light-emitting side of the light guide plate 19.

Also, in the light emission reflection portion 41, the reflection units 41a are constituted of a plurality of split reflection units 41aS that are arranged discontinuously along the second direction with gaps therebetween. In the reflection unit 41a, the amount of light reflected tends to be proportional to the surface area thereof, and thus, in order to attain the necessary amount of light reflection, the surface area must be set accordingly. Here, if the reflection unit were to be formed so as to extend along the entire length of the light guide plate 19 in the second direction, the dimension of the reflection unit in the direction normal to the plate surface of the light guide plate 19 would need to be formed at or above a certain size in order to attain the above-mentioned surface area of the reflection unit. By contrast, if the reflection units 41a are constituted of a plurality of split reflection units 41aS that are arranged discontinuously with gaps therebetween in the second direction, it is possible to set the dimensions of the reflection units 41a in the direction normal to the plate surface of the light guide plate 19 to be relatively larger when setting the above-mentioned surface area of the reflection units 41a. Therefore, when manufacturing the light guide plate 19 by resin molding and integrally forming the light emission reflection portions 41 on the opposite plate surface 19c, for example, it is easier to form the split reflection units 41aS of the reflection units 41a as designed on the opposite plate surface 19c. In this manner, it is possible for the light emission reflection portions 41 to appropriately exhibit optical properties.

If the reflection units are formed so as to extend along the entire length of the light guide plate 19 in the second direction, then by reducing the number of reflection units arranged in the first direction it is possible to adjust the total of the surface areas of the reflection units, but this would result in a larger gap between reflection units in the first direction, which presents the risk of uneven luminance occurring. By the reflection units 41a being constituted of the plurality of split reflection units 41aS arranged in a discontinuous manner with gaps therebetween, there is no need to modify the number of and gap between the reflection units 41a in the first direction, and thus, there is little risk of uneven luminance in the light emitted by the backlight device 12.

Also, in the light emission reflection portion 41, the reflection units 41a are formed by partially cutting the vertex portions 44a2 of the opposite plate surface-side prisms 44a constituting the opposite plate surface-side prism portion 44, thereby forming openings along the second direction. If the reflection units have a side face along the first direction without any openings in the second direction, the light is refracted or reflected by the side face along the first direction, which presents the risk of decreased light focusing performance by the opposite plate surface-side prism portion. The light emission reflection portion 41 is formed such that the reflection units 41a are formed by partially cutting the vertex portions 44a2 of the opposite plate surface-side prisms 44a, thereby forming openings along the second direction, which allows for excellent light focusing performance by the opposite plate surface-side prism portion 44, and enables the luminance of the light emitted by the backlight device 12 to be further increased.

Additionally, the opposite plate surface-side prism portion 44 has a configuration in which the opposite plate surface-side light focusing units are the opposite plate surface-side prisms 44a having a substantially triangular cross-section. In this manner, the opposite plate surface-side light focusing units constituting the opposite plate surface-side prism portion 44 are opposite plate surface-side prisms 44a having a substantially triangular cross-section, and thus, it is possible to adjust the intensity and the like of the focusing effect on light that has reached the opposite plate surface 19c of the light guide plate 19 according to the vertex angle θv3.

Also, in the prism sheet 42, the light-exiting side light focusing units are light-exiting side prisms 42a having a substantially triangular cross-section, and the vertex angle θv1 of the light-exiting side prisms 42a is less than the vertex angle θv3 of the opposite plate surface-side prisms 44a. In this manner, the light-exiting side light focusing units constituting the prism sheet 42 are light-exiting side prisms 42a having a substantially triangular cross-section, and thus, it is possible to adjust the intensity and the like of the focusing effect on light that has reached the light-exiting surface 19a of the light guide plate 19 according to the vertex angle θv1.

Also, in the prism sheet 42, the vertex angle θv1 of the light-exiting side prisms 42a is less than the vertex angle θv3 of the opposite plate surface-side prisms 44a, and thus, compared to the opposite plate surface-side prism portion 44, the light-exiting side prisms 42a cause more light to be retroreflected, and the emission angle of the light is more tightly regulated, thereby providing a stronger light focusing effect. By contrast, light supplied to the prism sheet 42 is anisotropically focused by the opposite plate surface-side prism portion 44 at the opposite plate surface 19c of the light guide plate 19, and then anisotropically focused by the light-exiting surface-side prism portion 43 at the light-exiting surface 19a. Thus, the proportion of light retroreflected at the light-exiting side prisms 42a of the prism sheet 42 is low, and as a result, the light is efficiently emitted by the light-exiting side prisms 42a. In this manner, the usage rate of light can be increased, and it is possible to increase the luminance of light emitted by the backlight device 12.

The light-exiting side prisms 42a have a vertex angle θv1 of 90°, whereas the opposite plate surface-side prisms 44a have a vertex angle θv3 in the range of 100° to 150°. In this manner, light that has been anisotropically focused by the opposite plate surface-side prisms 44a, which have a vertex angle θv3 of 100° to 150°, at the opposite plate surface 19c of the light guide plate 19 is anisotropically focused by the light-exiting surface-side prism portion 43 at the light-exiting surface 19a, and then is anisotropically focused by the light-exiting side prisms 42a having a vertex angle θv1 of 90°. In this manner, the usage rate of light can be further increased, and it is possible to further increase the luminance of light emitted by the backlight device 12.

Also, in the light-exiting surface-side prism portion 43, the light-exiting surface-side light focusing units are light-exiting surface-side prisms 43a having a substantially triangular cross-section, and the vertex angle θv2 of the light-exiting surface-side prisms 43a is greater than the vertex angle θv1 of the light-exiting side prisms 42a. In this manner, the light-exiting surface-side prisms 43a constituting the light-exiting surface-side prism portion 43 are light-exiting surface-side prisms 43a having a substantially triangular cross-section, and thus, it is possible to adjust the intensity and the like of the focusing effect on light that has reached the light-exiting surface 19a of the light guide plate 19 according to the vertex angle θv2.

Also, in the prism sheet 42, the vertex angle θv1 of the light-exiting side prisms 42a is less than both vertex angles θv2 and θv3 of the opposite plate surface-side prisms 44a and the light-exiting surface-side prisms 43a, and thus, compared to the opposite plate surface-side prism portion 44 and the light-exiting surface-side prism portion 43, the light-exiting side prisms 42a cause more light to be retroreflected, and the emission angle of the light is more tightly regulated, thereby providing the strongest light focusing effect. By contrast, light supplied to the prism sheet 42 is anisotropically focused by the opposite plate surface-side prism portion 44 at the opposite plate surface 19c of the light guide plate 19, and then anisotropically focused by the light-exiting surface-side prism portion 43 at the light-exiting surface 19a. Thus, the proportion of light retroreflected at the light-exiting side prisms 42a of the prism sheet 42 is low, and as a result, the light is efficiently emitted by the light-exiting side prisms 42a. In this manner, the usage rate of light can be further increased, and it is possible to further increase the luminance of light emitted by the backlight device 12.

The light-exiting side prisms 42a have a vertex angle θv1 of 90°, whereas the light-exiting surface-side prisms 43a have a vertex angle θv2 in the range of 100° to 150°. In this manner, light that has been anisotropically focused by the opposite plate surface-side prism portion 44 at the opposite plate surface 19c of the light guide plate 19 is anisotropically focused by the light-exiting surface-side prisms 43a, which have a vertex angle θv2 of 100° to 150°, at the light-exiting surface 19a, and then is anisotropically focused by the light-exiting side prisms 42a having a vertex angle θv1 of 90°. In this manner, the usage rate of light can be further increased, and it is possible to further increase the luminance of light emitted by the backlight device 12.

The light-exiting surface-side prisms 43a have a vertex angle θv2 of 110°, whereas the opposite plate surface-side prisms 44a have a vertex angle θv3 of 140°. In this manner, it is possible to attain the greatest luminance of light emitted by the backlight device 12.

The light-exiting surface-side prism portion 43 and the opposite plate surface-side prism portion 44 are formed integrally with the light guide plate 19. In this manner, compared to a case in which the light-exiting surface-side prism portion and the opposite plate surface-side prism portion were provided as separate items from the light guide plate 19, the number of parts is reduced, which is preferable from the perspective of cost reduction and the like.

Also, the liquid crystal display device 10 (display device) of the present embodiment includes the backlight device 12 and the liquid crystal panel 11 (display panel), which performs display using light from the backlight device 12. According to the liquid crystal display device 10 configured in this manner, excellent display quality can be attained because the light emitted from the backlight device 12 has a high front luminance with uneven luminance unlikely to occur.

The display panel is a liquid crystal panel 11 having liquid crystal sealed between a pair of substrates 11a and 11b. Such a display device can be applied as a liquid crystal display device 10 to various applications such as displays for smartphones and tablet PCs, for example.

<Embodiment 2>

Embodiment 2 of the present invention will be described with reference to FIGS. 18 to 20. In Embodiment 2, a light-exiting surface 119a of a light guide plate 119 is provided with flat portions 45 in addition to a light-exiting surface-side prism portion 143. Descriptions of structures, operations, and effects similar to those of Embodiment 1 will be omitted.

Figure 18:
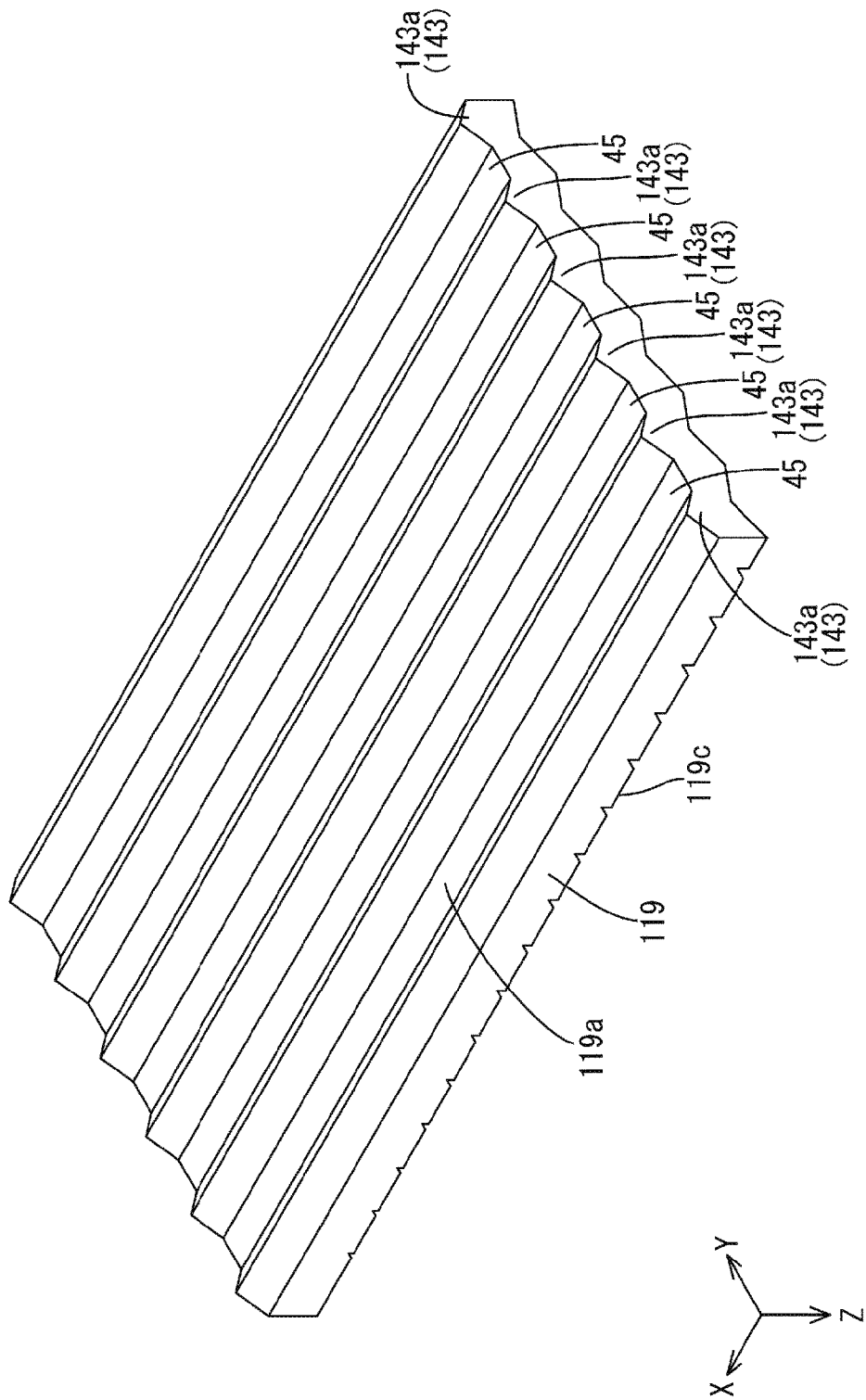
FIG. 18 is a perspective view of a light guide plate according to Embodiment 2 of the present invention.
Figure 19:
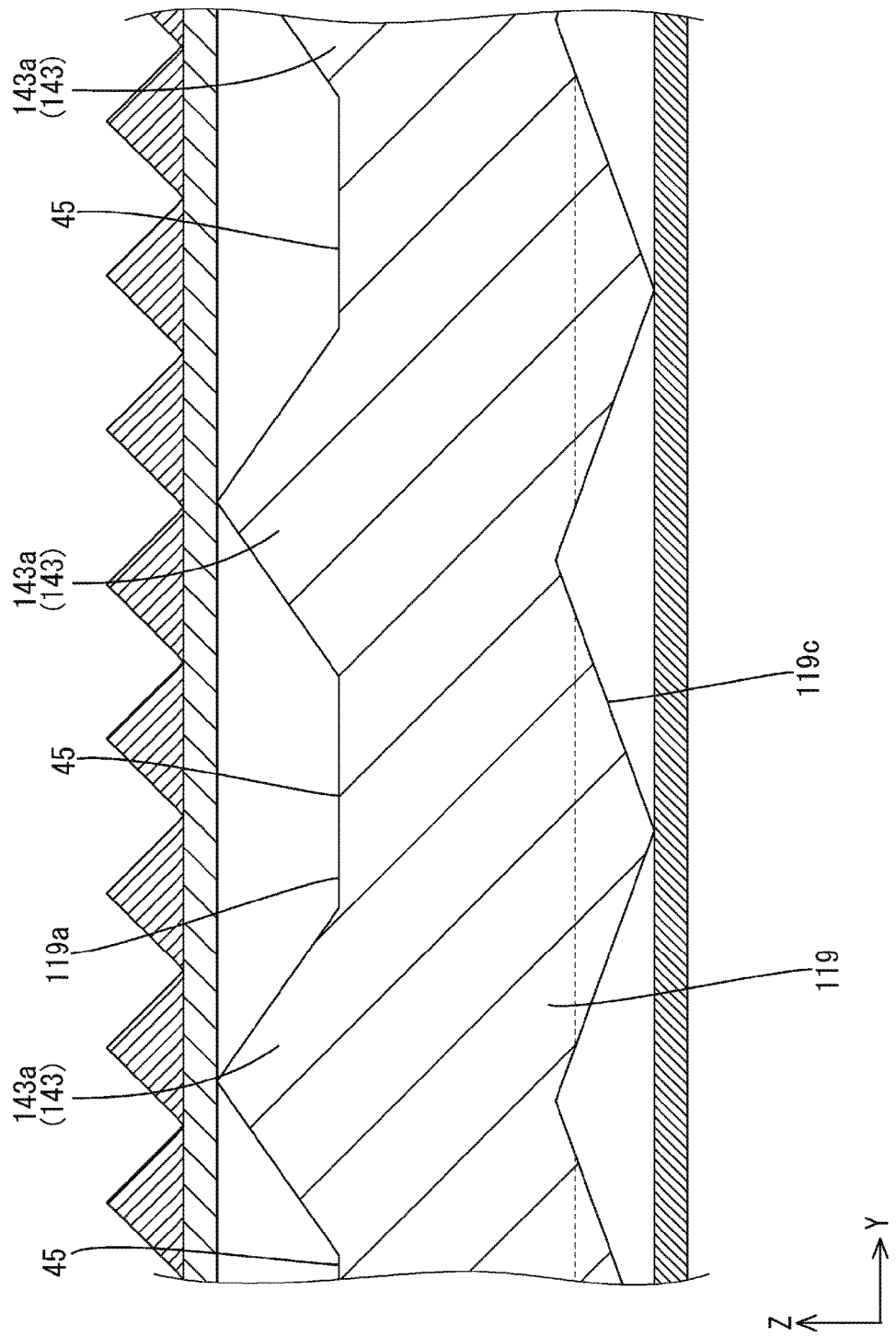
FIG. 19 is a cross-sectional view of a configuration of the backlight device along the shorter side direction (second direction, Y axis direction).

As shown in FIGS. 18 and 19, a light-exiting surface 119a of a light guide plate 119 of the present embodiment, in addition to the light-exiting surface-side prism portion 143, is provided with flat portions 45 that are flat along the first direction (X axis direction) and the second direction (Y axis direction). Specifically, the light-exiting surface 119a of the light guide plate 119 is provided with a plurality of light-exiting surface-side prisms 143a that are arranged in the second direction at a prescribed interval, and the flat portions 45, which are each interposed between the light-exiting surface-side prisms 143a that are adjacent to each other. The light-exiting surface-side prisms 143a and the flat portions 45 are arranged alternately in the second direction. The width dimension (dimension in the second direction) of the flat portions 45 is less than the width dimension of the light-exiting surface-side prisms 143a. In addition, the flat portions 45 are provided so as to extend along the entire length of the light guide plate 119 in the first direction. The light-exiting surface-side prisms 143a are disposed in both edges of the light guide plate 119 in the second direction, and if the number of light-exiting surface-side prisms 143a is "n," the number of flat portion 45 is n−1. In other words, the number of light-exiting surface-side prisms 143a provided is greater than the number of flat portions 45 provided.

Next, the effects of the flat portions 45 will be described. Light that has entered the light guide plate 119 from the LEDs is propagated inside the light guide plates 119 and reaches the light-exiting surface 119a. The light that has reached the light-exiting surface 119a at least includes components that are anisotropically focused by the light-exiting surface-side prisms 143a and emitted, components that are totally reflected by the light-exiting surface-side prisms 143a and returned towards the opposite plate surface 119c, and components that are totally reflected by the flat portions 45 and returned to the opposite plate surface 119c. Among these, the light that is returned to the opposite plate surface 119c by the flat portions 45 spreads over a wider range in the second direction as it is propagated in the light guide plate 119 compared to the light that was totally reflected by the light-exiting surface-side prisms 143a and returned to the opposite plate surface 119c. Thus, light that is being propagated in the light guide plate 119 is appropriately scattered in the second direction, is anisotropically focused by the light-exiting surface-side prisms 143a, and then emitted, and thus, the emitted light is not susceptible to uneven luminance.

Next, Comparison Experiment 5 was performed in order to ascertain whether or not uneven luminance occurs in the light emitted from the light-exiting surface of the light guide plate depending on the presence or absence of the flat portions 45 and the proportion take up by the flat portions 45. In Comparison Experiment 5, the same light guide plate as in Working Example 1 described in Comparison Experiment 1 of Embodiment 1 (light guide plate that does not include flat portions) is designated as Comparison Example 4, a light guide plate 119 provided with flat portions 45 taking up 20% of the area of the light-exiting surface 119a is designated as Working Example 9, and a light guide plate 119 provided with flat portions 45 taking up 40% of the area of the light-exiting surface 119a is designated as Working Example 10. Here, the "proportion of area taken up by the flat portions 45" refers to the ratio of the surface area of the flat portion 45 to the surface area of the entire light-exiting surface 119a (combined surface area of the light-exiting surface-side prism portion 143 and the flat portion 45). The light guide plates 119 of Working Examples 9 and 10 have the same structure as the light guide plate 119 described in previous paragraphs other than that the proportion of area taken up by the flat portions 45 differs. In addition, the light guide plate 119 of Working Examples 9 and 10 has the same structure as the light guide plate of Comparison Example 4 other than the flat portions 45 being provided on the light-exiting surface 119a. In Comparison Experiment 5, the presence or absence of uneven luminance was determined for the light guide plates of Comparison Experiments 1 to 4 and Working Examples 9 and 10 on the basis of photographs taken from the light-exiting surface side in a state where light from LEDs is radiated into the light-receiving face and light is being emitted from the light-exiting surface, and results of this experiment are shown in the table of FIG. 20. FIG. 20 shows photographs taken from the light-exiting surface side of the light guide plates of Comparison Example 4 and Working Examples 9 and 10 with light being radiated from the light-exiting surfaces, and determination results for uneven luminance on the basis of these photographs. The photographs shown in FIG. 20 show, in particular, the portion of the light-exiting surfaces of the light guide plates towards the light-receiving faces, and LEDs, which are not shown, are disposed directly below the photographs.

The results of Comparison Experiment 5 will be described below. According to FIG. 20, whereas uneven luminance is somewhat visible with the light guide plates of Comparison Example 4, uneven luminance is mostly not visible with the light guide plate 119 of Working Examples 9 and 10. In particular, in the light guide plate 119 of Working Example 10, uneven luminance is effectively not visible. Thus, it can be seen that as the proportion of area taken up by the flat portions 45 increases, uneven luminance becomes less visible. In Comparison Experiment 5, the light guide plate of Comparison Experiment 4 is determined to exhibit "some uneven luminance," but this is an evaluation relative to the determination of the light guide plate 119 of Working Example 9 to be exhibiting "almost no uneven luminance."

As described above, according to the present embodiment, flat portions 45 that are flat along the first direction and the second direction are disposed in the light-exiting surface 119a of the light guide plate 119 between light-exiting surface-side prisms 143a that are adjacent to each other in the second direction. In this manner, the light that was propagated in the light guide plate 119 and that has reached the light-exiting surface 119a is totally reflected by the flat portions 45 and returned back to the opposite plate surface 119c. The light that is returned to the opposite plate surface 119c by the flat portions 45 spreads in the second direction as it is propagated in the light guide plate 119 compared to the light that was totally reflected by the light-exiting surface-side prisms 143a and returned to the opposite plate surface 119c. Thus, the light emitted by the backlight device is less susceptible to uneven luminance.

<Embodiment 3>

Embodiment 3 of the present invention will be described with reference to FIG. 21 or 22. Embodiment 3 shows a case in which the shape of light-exiting surface-side prisms 243a constituting the light-exiting surface-side prism portion 243 differs from that of Embodiment 1. Descriptions of structures, operations, and effects similar to those of Embodiment 1 will be omitted.

Figure 21:
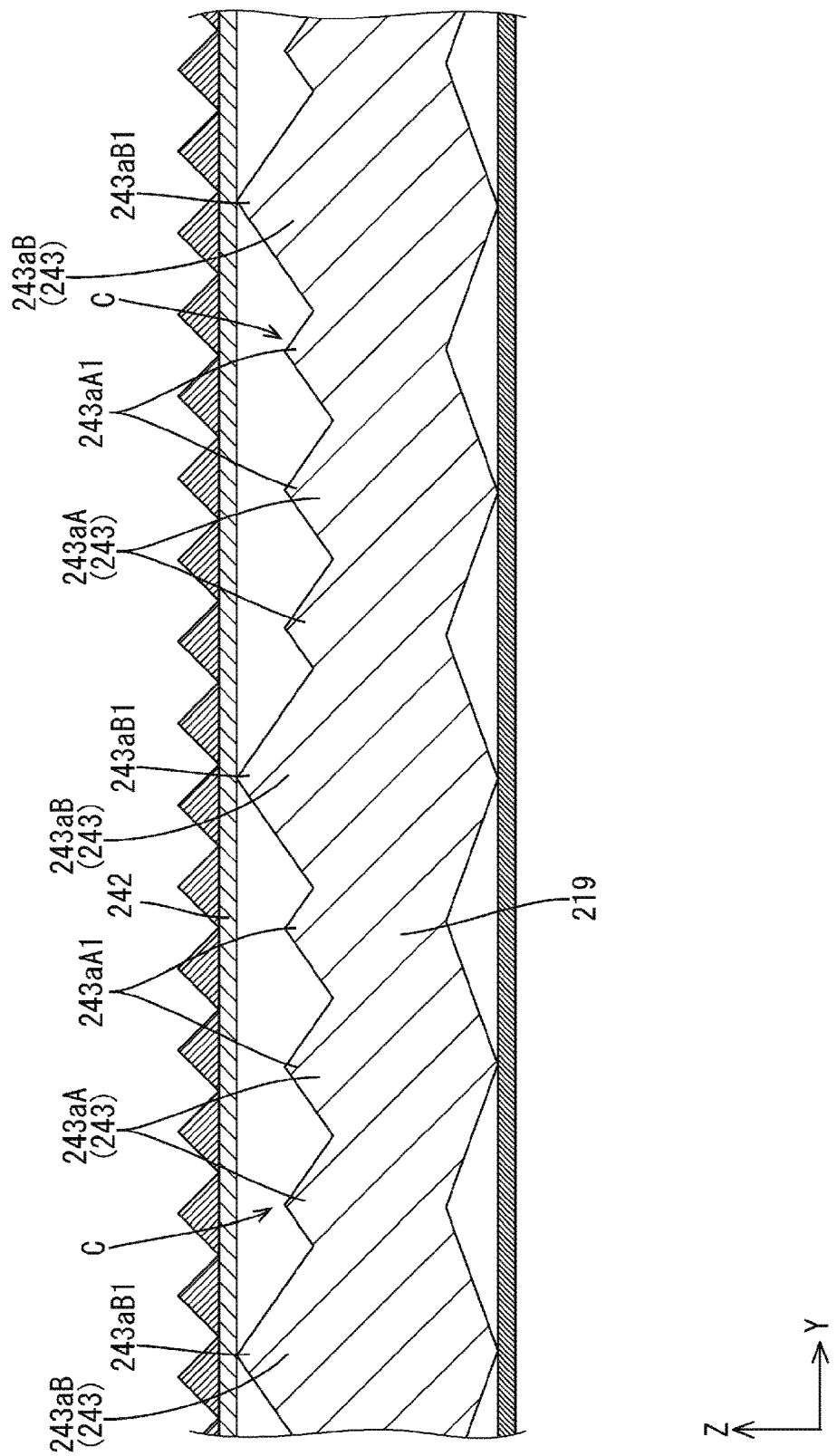
FIG. 21 is a cross-sectional view of a configuration of the backlight device along the shorter side direction (second direction, Y axis direction) according to Embodiment 3 of the present invention.
Figure 22:
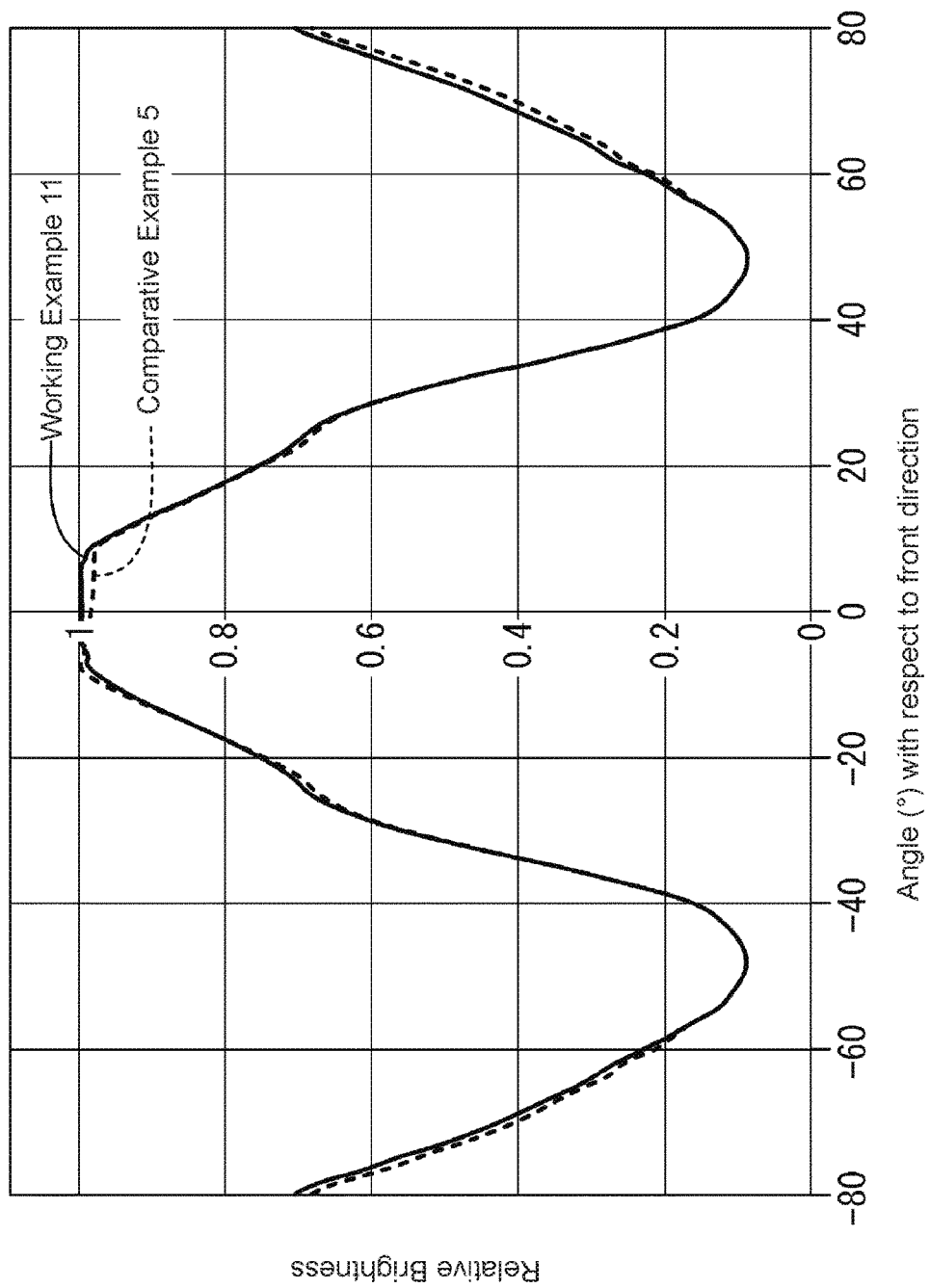
FIG. 22 is a graph of Comparison Experiment 6 showing luminance angular distributions in a second direction of emitted light obtained by passing light emitted by the light guide plates of Comparison Example 5 and Working Example 11 through a prism sheet.

As shown in FIG. 21, the light-exiting surface-side prism portion 243 of the present embodiment includes first light-exiting surface-side prisms 243aA having a relatively lower height, and second light-exiting surface-side prisms 243aB having a relatively greater height. Of these, the second light-exiting surface-side prisms 243aB have the same height, vertex angle, and the like as the light-exiting surface-side prisms 43a of Embodiment 1. The first light-exiting surface-side prisms 243aA have substantially isosceles triangular shapes in a cross-sectional view along the second direction (Y axis direction) with the vertex angle thereof being the same as the vertex angle of the second light-exiting surface-side prisms 243aB. In other words, the first light-exiting surface-side prisms 243aA and the second light-exiting surface-side prisms 243aB have similar cross-sectional shapes to each other.

As shown in FIG. 21, the second light-exiting surface-side prisms 243aB have a greater width and height of the bottom surface than the first light-exiting surface-side prisms 243aA, and specifically, the width and height of the bottom surface of the second light-exiting surface-side prism 243aB are approximately twice that of the first light-exiting surface-side prism 243aA. Thus, the vertex portions 243aB1 of the second light-exiting surface-side prisms 243aB are at a higher position (closer to the prism sheet 242) than the vertex portions 243aA1 of the first light-exiting surface-side prisms 243aA, and are in contact with the rear plate surface (towards the light guide plate 219) of the prism sheet 242. By contrast, the vertex portions 243aA1 of the first light-exiting surface-side prisms 243aA are at a lower position (farther from the prism sheet 242) than the vertex portions 243aB1 of the second light-exiting surface-side prisms 243aB, and are at a gap C from the rear plate surface of the prism sheet 242. In other words, the first light-exiting surface-side prisms 243aA are not in contact with the rear surface of the prism sheet 242. In this manner, the contact area between the light guide plate 219 and the prism sheet 242 is less than in Embodiment 1, and an air layer is present in the gap C between the light guide plate 219 and the prism sheet 242, which mitigates sticking together of the light guide plate 219 and the prism sheet 242. In addition, the second light-exiting surface-side prisms 243aB are disposed intermittently in the second direction, and specifically, are arranged such that three first light-exiting surface-side prisms 243aA are sandwiched between adjacent second light-exiting surface-side prisms 643aB. In this manner, the second light-exiting surface-side prisms 243aB are arranged intermittently at a certain interval (every three first light-exiting surface-side prisms 243aA), enabling the gap C between the first light-exiting surface-side prisms 243aA and the prism sheet 242 to be maintained in a stable manner.

Next, the following Comparison Experiment 6 was performed using a light guide plate having light-exiting surface-side prisms that all have the same height, and the light guide plate 219 having light-exiting surface-side prisms 243aA and 243aB having differing heights. In Comparison Experiment 6, the same light guide plate as Working Example 1 described in Comparison Experiment 1 of Embodiment 1 (light guide plate having light-exiting surface-side prisms that all have the same height) is designated as Comparison Example 5, and the light guide plate 219 having light-exiting surface-side prisms 243aA and 243aB having differing heights is designated as Working Example 11. The light guide plate 219 of Working Example 11 has the same structure as the light guide plate 219 described in previous paragraphs. In addition, the light guide plate 219 of Working Example 11 has the same structure as the light guide plate of Comparison Example 5 other than the light-exiting surface-side prisms 243aA and 243aB having differing heights. In Comparison Experiment 6, the luminance distribution of light exiting the light guide plates of Comparison Example 5 and Working Example 11, passed through the prism sheet 242, and exiting therefrom was measured, and the results thereof are shown in FIG. 22. Specifically, in Comparison Experiment 6, by radiating light from LEDs on the light-receiving faces of the respective light guide plates of Comparison Example 5 and Working Example 11, light is emitted from the light-exiting surfaces of the light guide plates, and further passes through the prism sheet 242 stacked on the light-exiting side of the light guide plates, and the luminance distribution of this light was measured. The prism sheet 242 used in Comparison Experiment 6 is the same as what was described in Embodiment 1. FIG. 22 shows the results of measuring the luminance distribution of light exiting the light guide plates of Comparison Example 5 and Working Example 11, passed through the prism sheet 242, and exiting therefrom. FIG. 22 indicates the relative luminance (no unit) of light emitted from the prism sheet 242 on the vertical axis, and indicates the angle (with a unit of "°") of the light with respect to the frontal direction in the second direction on the horizontal axis. The relative luminance on the vertical axis of FIG. 22 is a value relative to a reference luminance (1.0) measured for a case in which the measurement is made from the frontal direction (angle of 0°) for when the light guide plate 219 according to Working Example 11 is used. In FIG. 22, the solid line curve represents Working Example 11, and the broken line curve represents Comparison Example 5.

The results of Comparison Experiment 6 will be described below. Based on FIG. 22, it can be seen the luminance distribution of exiting light is substantially equal between the light guide plate of Comparison Example 5 and the light guide plate 219 of Working Example 11. This means that even if the light-exiting surface-side prism portion 243 of the light guide plate 219 of Working Example 11 includes two types of light-exiting surface-side prisms 243aA and 243aB having differing heights, the two types of light-exiting surface-side prisms 243aA and 243aB have similar cross-sectional shapes, and thus, there is almost no change in light focusing performance (optical performance) as compared to the light guide plate of Comparison Example 5. In addition, the light guide plate 219 of Working Example 11 exhibits the effect of not readily sticking to the prism sheet 242, which is disposed in the light-exiting side thereof.

According to the present embodiment described above, the plurality of light-exiting surface-side prisms 243a constituting the light-exiting surface-side prism portion 243 include the first light-exiting surface-side prisms 243aA (first light-exiting surface-side light focusing units) having vertex portions 243aA1 that are relatively low and second light-exiting surface-side prisms 243aB (second light-exiting surface-side light focusing units) having vertex portions 243aB1 that are relatively high, and a gap C is present between the first light-exiting surface-side prisms 243aA and the prism sheet 242. In this manner, the gap C is formed between the first light-exiting surface-side prisms 243a A included among the plurality of light-exiting surface-side prisms 243a and the prism sheet 242, which means that the prism sheet 242 is less susceptible to sticking to the light-exiting surface-side prism portion 243. In this manner, it is possible to mitigate the occurrence of uneven luminance for the light emitted by the backlight device.

<Embodiment 4>

Embodiment 4 of the present invention will be described with reference to FIG. 23 or 24. Embodiment 4 shows a case in which a light-exiting surface-side lenticular lens portion 46 is provided instead of the light-exiting surface-side prism portion 43 of Embodiment 1. Descriptions of structures, operations, and effects similar to those of Embodiment 1 will be omitted.

Figure 23:
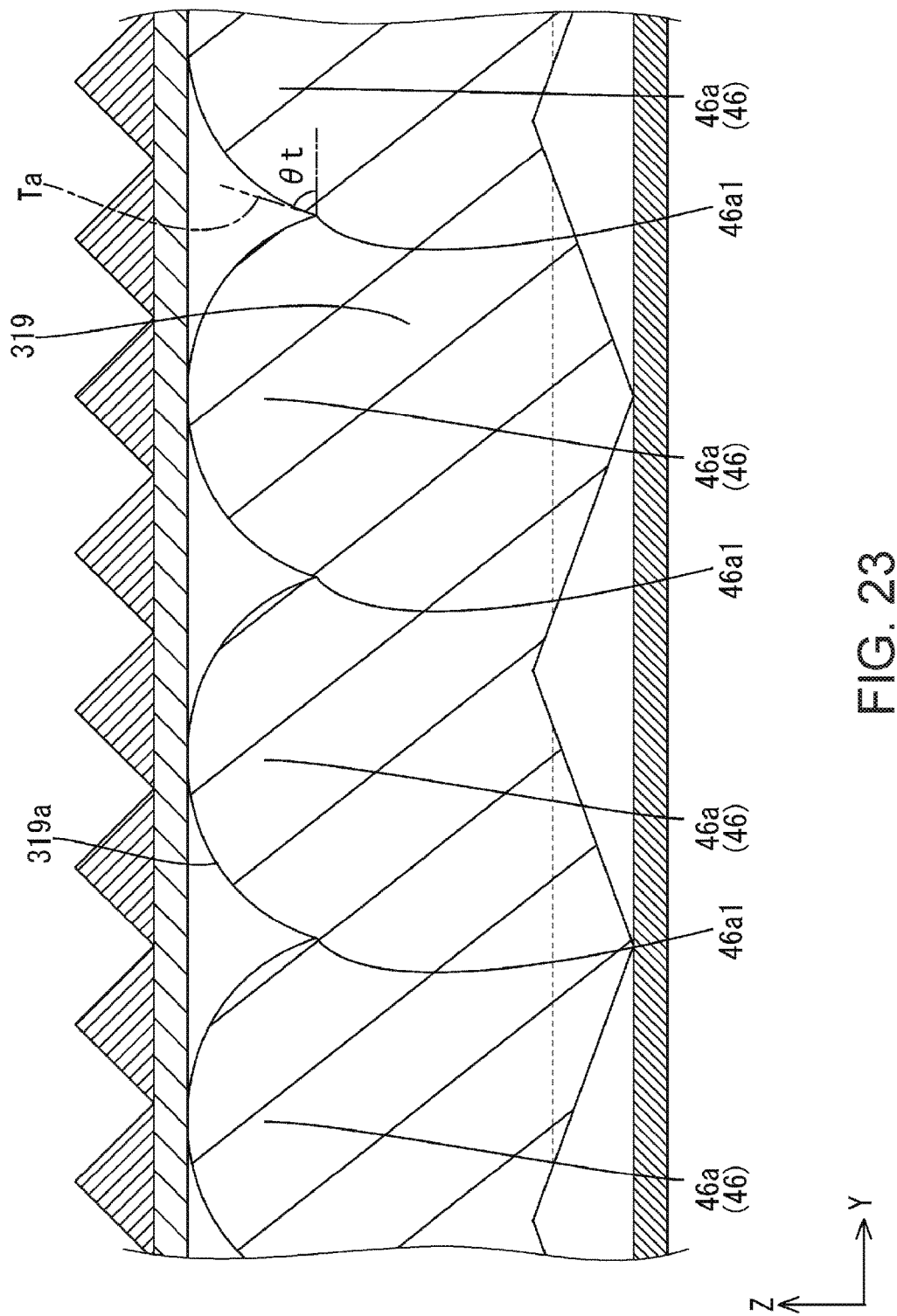
FIG. 23 is a cross-sectional view of a configuration of the backlight device along the shorter side direction (second direction, Y axis direction) according to Embodiment 4 of the present invention.

As shown in FIG. 23, the light-exiting surface 319a of the light guide plate 319 of the present embodiment is provided with a light-exiting surface-side lenticular lens portion 46 (light-exiting surface-side anisotropic light focusing portion) that can selectively focus emitted light in the second direction (Y axis direction). The light-exiting surface-side lenticular lens portion 46 is arranged such that cylindrical lenses 46a (light-exiting surface-side light focusing units) extending in the first direction (X axis direction) are arranged in the second direction. The light-exiting surface-side lenticular lens portion 46 is formed integrally with the light guide plate 319. In order to form the light-exiting surface-side lenticular lens portion 46 integrally with the light guide plate 319, the light guide plate 319 is formed by injection molding, for example, and a transfer shape to be transferred as the light-exiting surface-side lenticular lens portion 46 is formed in advance in the mold surface of the mold. The cylindrical lenses 46a have a substantially semi-cylindrical shape in which the axis line direction thereof matches the first direction, and the surfaces thereof facing the front have an arc shape. The cylindrical lenses 46a have a substantially semicircular cross-section along the arrangement direction thereof (second direction), which is perpendicular to the extension direction thereof (first direction).

As shown in FIG. 23, if the light inside the cylindrical lens 46a is at an incident angle at or below the critical angle with respect to arc-shaped surface (interface), then this light is refracted and emitted from the outer surface of the cylindrical lens 46a, thereby selectively focusing the light in the second direction. Thus, the second direction is the focusing direction of the cylindrical lenses 46a. Light that has passed through the focal point of the cylindrical lens 46a is refracted at the arc-shaped outer surface, thereby enabling the light to be emitted substantially parallel to the frontal direction. In this manner, a light focusing effect is attained in which light traveling towards the second direction, from among the light emitted from the light-exiting surface 319a, is selectively made to travel upward such that the direction of travel of the light matches (approaches) the frontal direction. On the other hand, if the light inside the cylindrical lens 46a is at an incident angle greater than or equal to the critical angle with respect to arc-shaped surface, then this light is totally reflected by the outer surface of the cylindrical lens 46a and travels inside the cylindrical lens 46a in the first direction, thereby allowing the light to be diffused in the first direction. In this manner, it is possible to reduce uneven luminance in the light emitted from the light-exiting surface 319a. If an angle formed between the second direction and a tangent line Ta at a base edge 46a1 on the arc-shaped surface of the cylindrical lens 46a is a "tangent angle," then the tangent angle θt is approximately 70°, for example.

Next, Comparison Experiment 7 was performed in order to ascertain what type of change occurs in the effect of mitigating uneven luminance depending on the shape of the cylindrical lenses 46a. As shown in Comparison Experiment 7, where an angle formed between the second direction and a tangent line Ta at a base edge 46a1 on the arc-shaped surface of the cylindrical lens 46a is a "tangent angle", light guide plates 319 were prepared respectively including light-exiting surface-side lenticular lens portions 46 constituted of cylindrical lenses 46a having tangent angles θt of 20°, 30°, 40°, 60°, and 70°. In Comparison Experiment 7, the presence or absence of uneven luminance was determined on the basis of photographs taken from the light-exiting surface 319a side in a state where light from LEDs is radiated into the light guide plates 319 where the tangent angles θt are respectively 20°, 30°, 40°, 60°, and 70°, and light is being emitted from the light-exiting surfaces 319a of the light guide plates 319, and results of this experiment are shown in the table of FIG. 24. FIG. 24 shows photographs taken from the light-exiting surface 319a side with light being radiated from the light-exiting surfaces 319a of the light guide plates 319 where the tangent angles θt are 20°, 30°, 40°, 60°, and 70°, and determination results for uneven luminance on the basis of these photographs. The photographs shown in FIG. 24 show, in particular, the portion of the light-exiting surfaces 319a of the light guide plates 319 towards the light-receiving faces, and LEDs, which are not shown, are disposed directly below the photographs.

The results of Comparison Experiment 7 will be described below. According to FIG. 24, the less the tangent angle θt is, the greater the difference in brightness is between positions directly on the LEDs and positions between the LEDs, resulting in visibly uneven luminance, whereas the greater the tangent angle θt is, the smaller the difference in brightness is between positions directly on the LEDs and positions between the LEDs, resulting in the uneven luminance not being readily seen. Specifically, when the tangent angle θt is 20° or 30°, it is determined that "uneven luminance is present" whereas when the tangent angle θt is 40°, 60°, or 70°, it is determined that "uneven luminance is absent". From the perspective of preventing uneven luminance, it is preferable that the cylindrical lenses 46a have a tangent angle θt of 40° or greater.

As described above, according to the present embodiment, in the light-exiting surface-side lenticular lens portion 46 (light-exiting surface-side anisotropic light focusing portion), the light-exiting surface-side light focusing units are cylindrical lenses 46a having arc-shaped surfaces. In this manner, compared to a case in which the light-exiting surface-side light focusing units are prisms having triangular cross-sections, it is possible to further avoid uneven luminance in light emitted from the backlight device.

<Embodiment 5>

Embodiment 5 of the present invention will be described with reference to FIG. 25. Embodiment 5 shows a case in which the cross-sectional shape of the reflection units 441a of the light emission reflection portion 441 has been modified from that of Embodiment 1. Descriptions of structures, operations, and effects similar to those of Embodiment 1 will be omitted.

Figure 25:
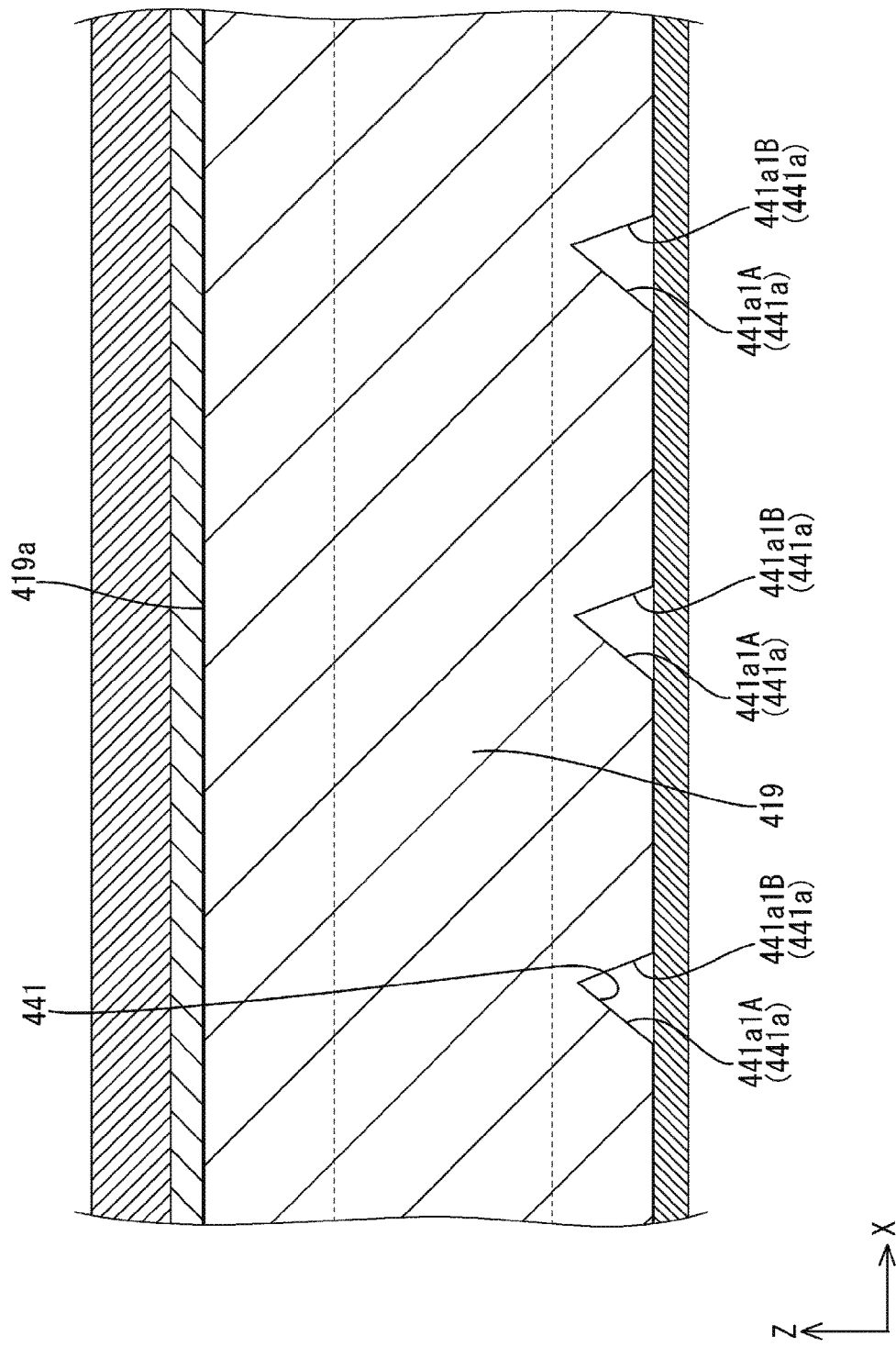
FIG. 25 is a cross-sectional view of a configuration of the backlight device along the longer side direction (first direction, X axis direction) according to Embodiment 5 of the present invention.

As shown in FIG. 25, the reflection units 441a of the light emission reflection portion 441 of the present embodiment have a non-right triangular cross-section. The reflection units 441a have a pair of inclined surfaces 441a1A and 441a1B that are inclined with respect to the third direction (Z axis direction) and the first direction (X axis direction). Of these, the first inclined surface 441a1A towards the light-receiving face (not shown; to the left of FIG. 25) in the first direction forms an angle with respect to the first direction that is smaller than the angle formed between the first direction and the second inclined surface 441a1B disposed towards the opposite edge face (not shown; to the right of FIG. 25) in the first direction. Specifically, the angle between the first inclined surface 441a1A and the first direction is approximately 50°, for example, while the angle between the second inclined surface 441a1B and the first direction is approximately 70°, for example. Even with such a configuration, the reflection units 441a primarily reflect light at the first inclined surfaces 441a1A, thereby producing light incident on the light-exiting surface 419a that does not exceed the critical angle, thereby encouraging light to be emitted from the light-exiting surface 419a. Also, the reflection units 441a are arranged so as to become gradually taller in the height direction (third direction) with the areas (surface areas) of the inclined surfaces 441a1A and 441a1B becoming gradually larger, moving away from the light-receiving face (not shown) in the first direction.

<Embodiment 6>

Embodiment 6 of the present invention will be described with reference to FIG. 26. Embodiment 6 shows a case in which the configuration of the prism sheet 542 differs from that of Embodiment 1. Descriptions of structures, operations, and effects similar to those of Embodiment 1 will be omitted.

Figure 26:
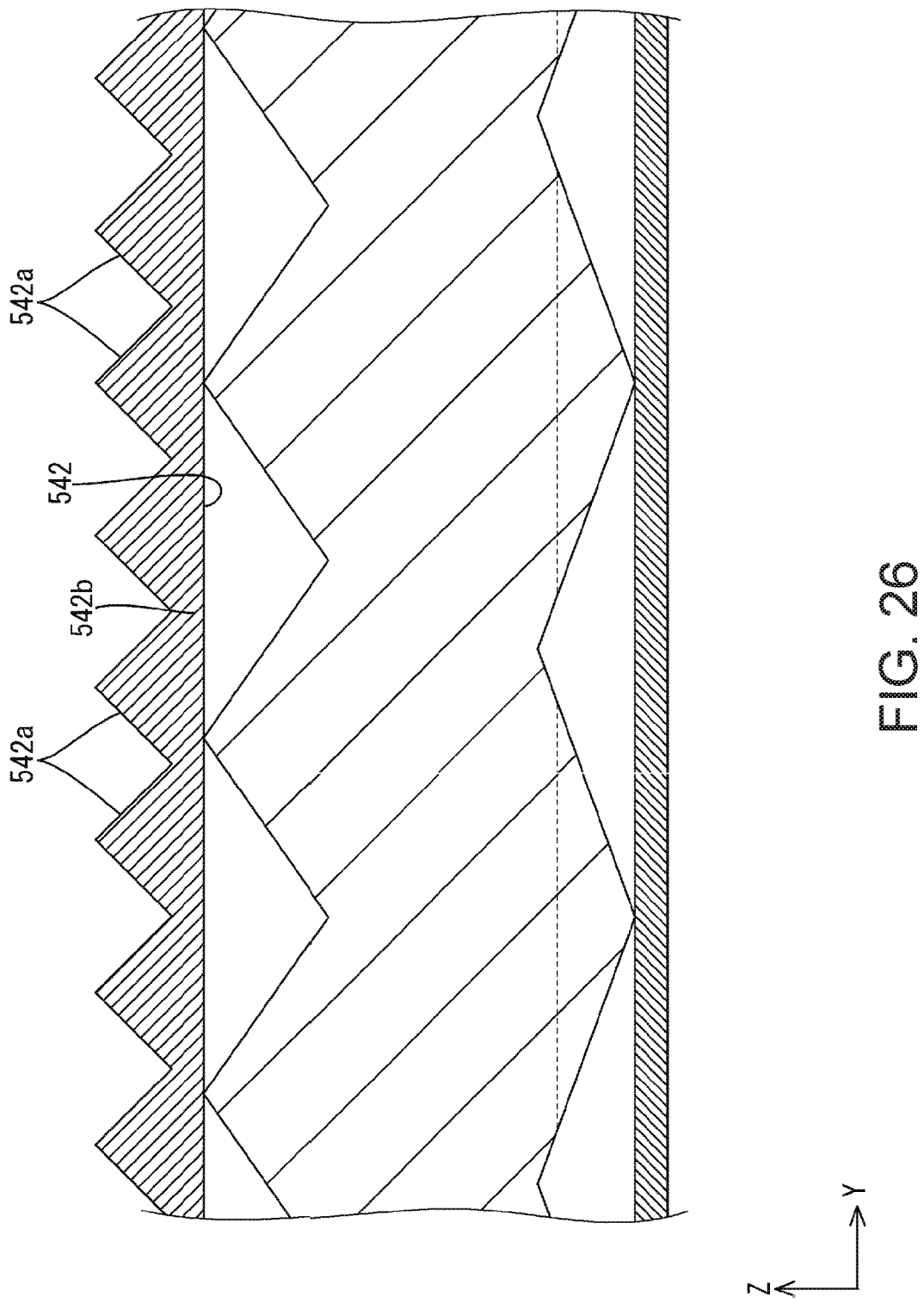
FIG. 26 is a cross-sectional view of a configuration of the backlight device along the shorter side direction (second direction, Y axis direction) according to Embodiment 6 of the present invention.

As shown in FIG. 26, the prism sheet 542 of the present embodiment has a configuration in which light-exiting side prisms 542a and a sheet base member 542b are formed integrally and of the same material. The prism sheet 542 is made of polycarbonate (PC), for example, with an index of refraction of approximately 1.59. Even with such a configuration, operations and effects similar to those of Embodiment 1 can be attained.

<Embodiment 7>

Embodiment 7 of the present invention will be described with reference to FIG. 27. Embodiment 7 shows a case in which the shape of second light-exiting surface-side prisms 643aB is modified from Embodiment 3. Descriptions of structures, operations, and effects similar to those of Embodiment 3 will be omitted.

Figure 27:
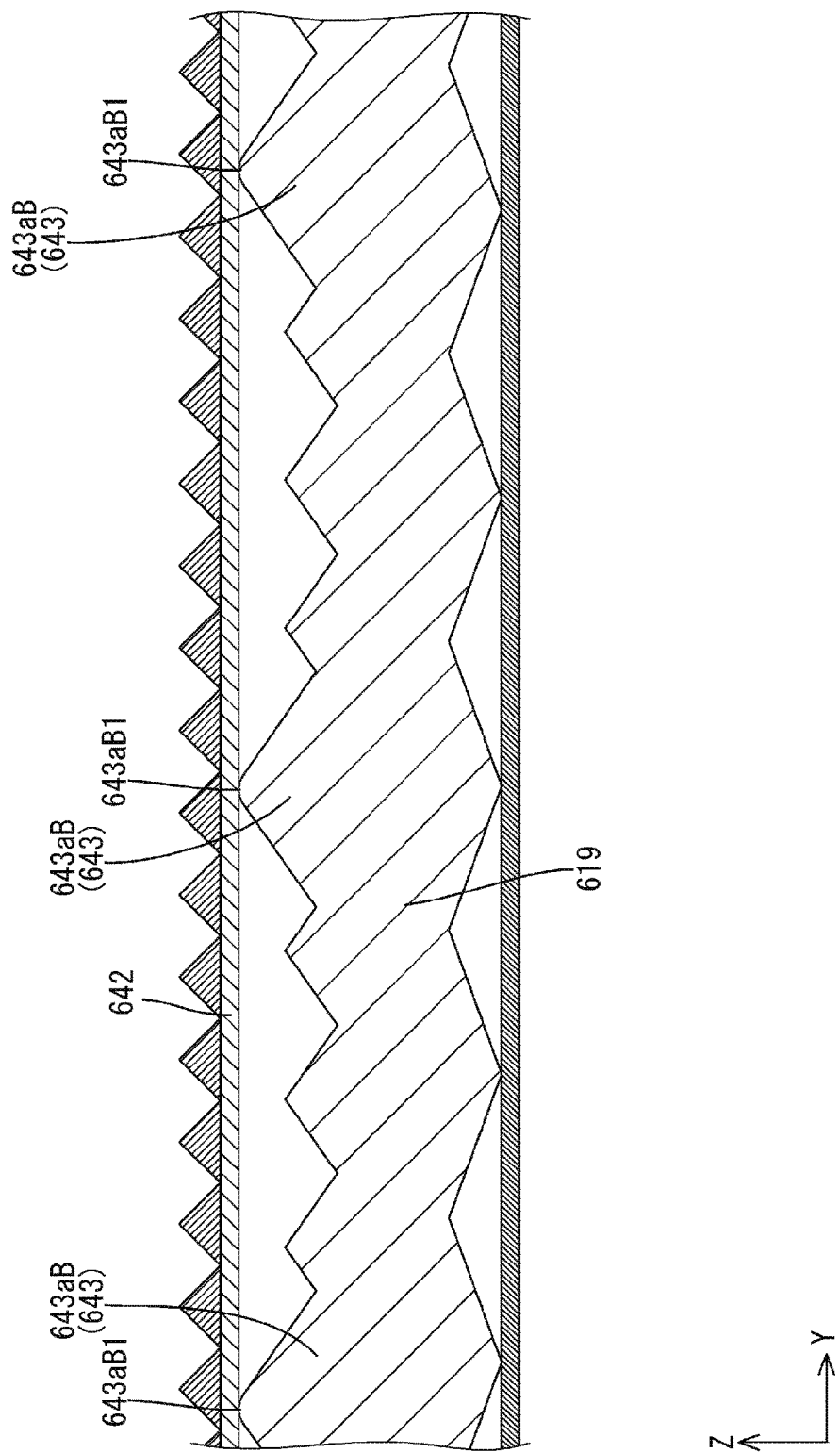
FIG. 27 is a cross-sectional view of a configuration of the backlight device along the shorter side direction (second direction, Y axis direction) according to Embodiment 7 of the present invention.

As shown in FIG. 27, the second light-exiting surface-side prisms 643aB of the light-exiting surface-side prism portion 643 according to the present embodiment are configured such that the vertex portion 643aB1 thereof is rounded to an arc shape so as to have a curved surface. The vertex portion 643aB1 of the second light-exiting surface-side prism 643aB is in direct contact with the rear surface of a prism sheet 642, but as a result of the rounded shape, there is less susceptibility for the vertex portion 643aB1 of the second light-exiting surface-side prism 643aB scraping past the prism sheet 642 and causing abrasions to be formed in the prism sheet 642, or for the prism sheet 642 interfering with the vertex portion 643aB1 of the second light-exiting surface-side prism 643aB to deform the vertex portion 643aB1. In this manner, the light guide plate 619 and the prism sheet 642 are less susceptible to degradation in optical characteristics.

<Embodiment 8>

Embodiment 8 of the present invention will be described with reference to FIG. 28. Embodiment 8 shows a case in which a light-exiting surface-side lenticular lens portion 746 having a configuration similar to Embodiment 4 above is provided instead of the light-exiting surface-side prism portion 143 of Embodiment 2. Descriptions of structures, operations, and effects similar to those of Embodiments 2 and 4 will be omitted.

Figure 28:
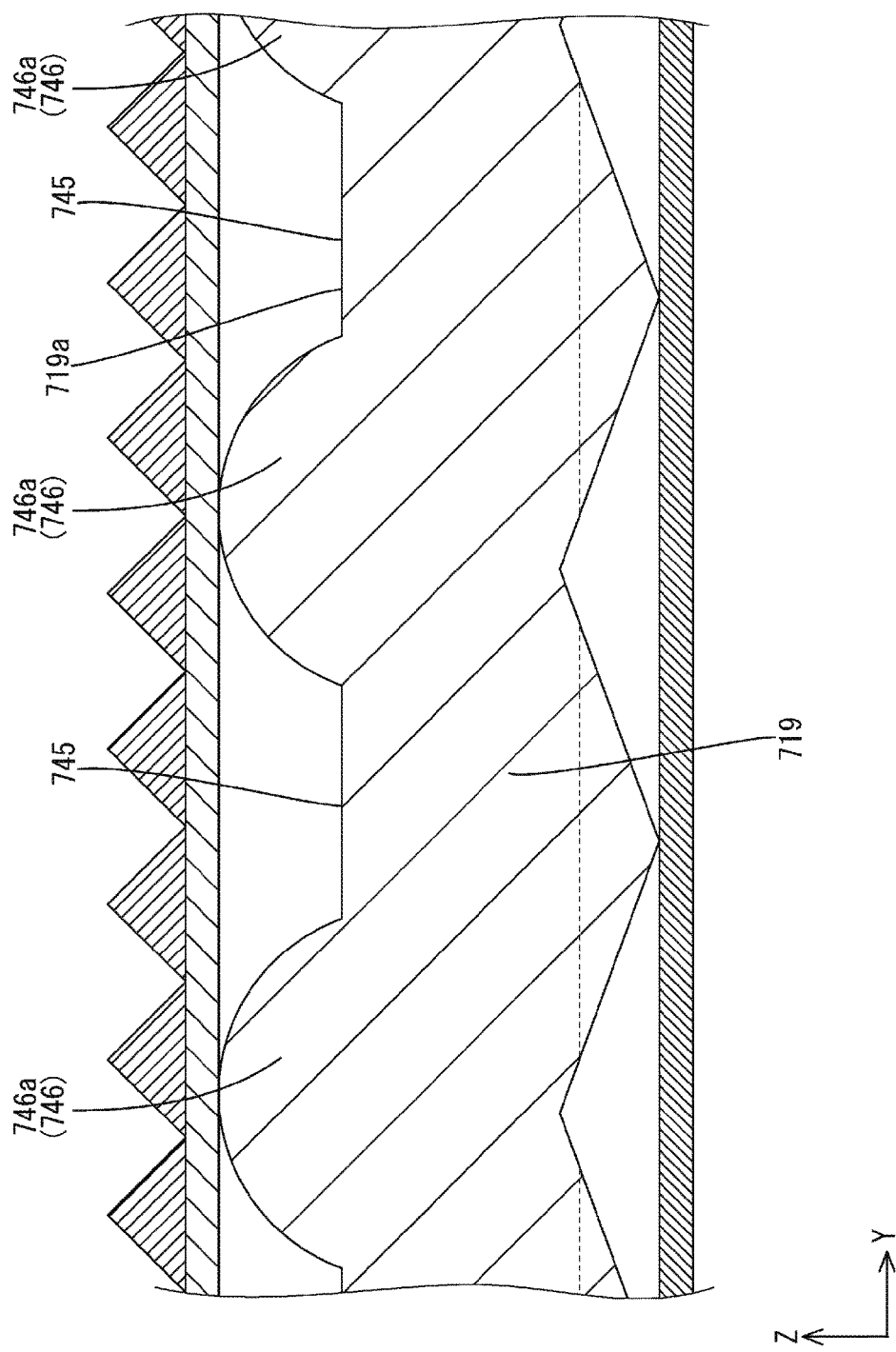
FIG. 28 is a cross-sectional view of a configuration of the backlight device along the shorter side direction (second direction, Y axis direction) according to Embodiment 8 of the present invention.

As shown in FIG. 28, in the light-exiting surface 719a of the light guide plate 719 of the present embodiment a plurality of flat portions 745 and cylindrical lenses 746a of the light-exiting surface-side lenticular lens portion 746 are arranged in the second direction (Y axis direction). The flat portions 745 and the cylindrical lenses 746a are arranged alternately and repeatedly in the second direction. As a result of such a configuration, it is possible to attain the effect of mitigating uneven luminance by the flat portions 745 and the effect of mitigating uneven luminance by the cylindrical lenses 746a, and thus, it is possible to further reduce susceptibility to uneven luminance of the light exiting the light guide plate 719.

<Embodiment 9>

Embodiment 9 of the present invention will be described with reference to FIG. 29. Embodiment 9 shows a case in which a light-exiting surface-side lenticular lens portion 846 having a configuration similar to Embodiment 4 above is provided instead of the light-exiting surface-side prism portion 243 of Embodiment 3. Descriptions of structures, operations, and effects similar to those of Embodiments 3 and 4 will be omitted.

Figure 29:
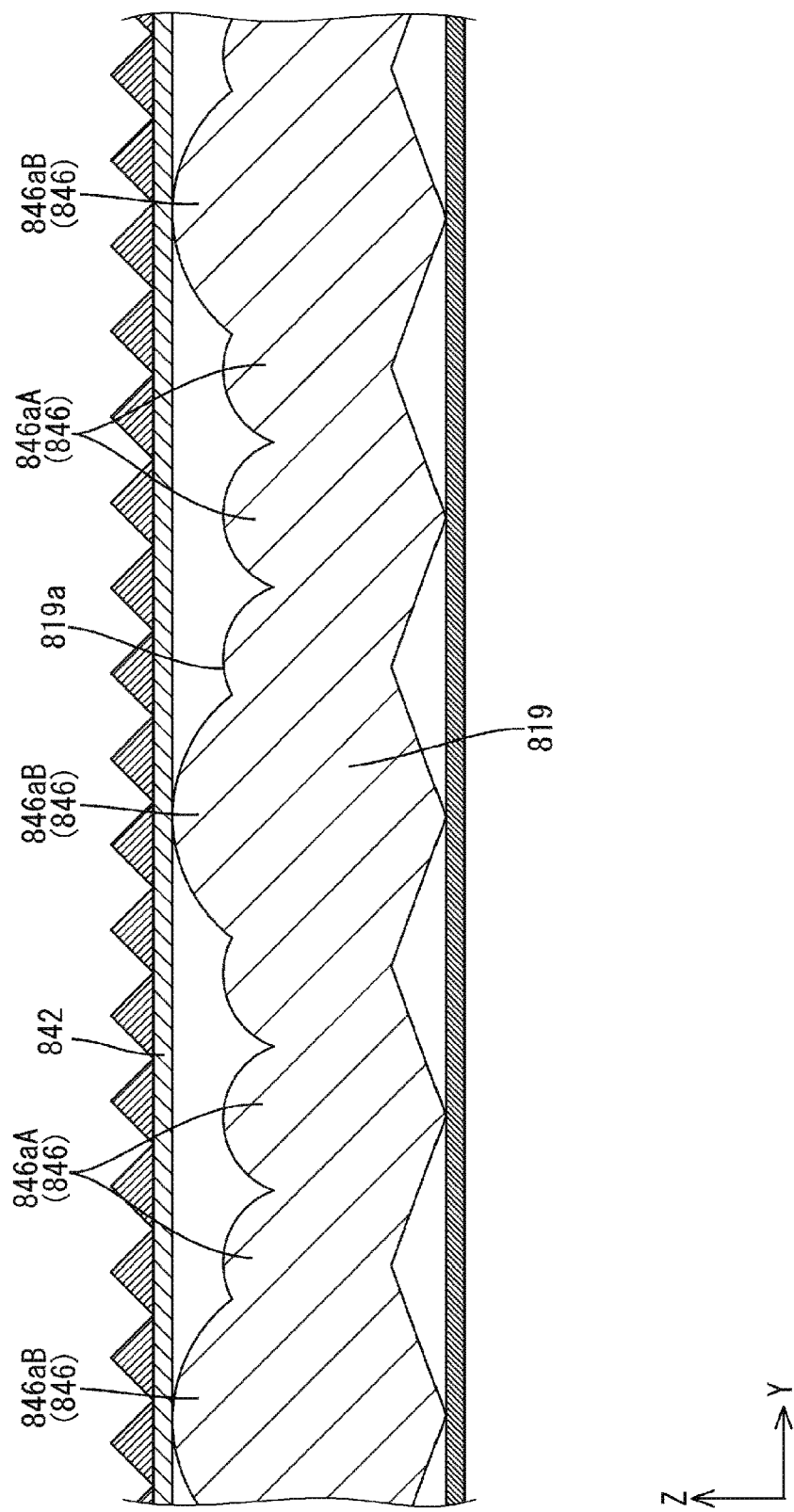
FIG. 29 is a cross-sectional view of a configuration of the backlight device along the shorter side direction (second direction, Y axis direction) according to Embodiment 9 of the present invention.

As shown in FIG. 29, the light-exiting surface 819a of the light guide plate 819 of the present embodiment is provided with the light-exiting surface-side lenticular lens portion 846 including first cylindrical lenses 846aA having a relatively lower height, and second cylindrical lenses 846aB having a relatively greater height. Of these, the first cylindrical lenses 846aA has the same height, tangent angle, and the like as the cylindrical lenses 46 of Embodiment 4. The second cylindrical lenses 846aB have substantially semicircular shapes in a cross-sectional view along the second direction (Y axis direction) with the tangent angle thereof being the same as the tangent angle of the first cylindrical lenses 846aA. In other words, the second cylindrical lenses 846aB and the first cylindrical lenses 846aA have similar cross-sectional shapes to each other. According to such a configuration, it is possible to mitigate adhesion of the light guide plate 819 to the prism sheet 842, and the light exiting the light guide plate 819 is less susceptible to uneven luminance.

<Other Embodiments>

The present invention is not limited to the embodiments shown in the drawings and described above, and the following embodiments are also included in the technical scope of the present invention, for example.

(1) In the embodiments, a case was described in which a plurality of reflection units constituting the light emission reflection portion are arranged at an even interval along the first direction (arranged at an even pitch), but the present invention also includes an uneven pitch arrangement for the plurality of reflection units along the first direction. In such a case, it is preferable that the interval between adjacent reflection units be set so as to be gradually shorter from the light-receiving face towards the opposite edge face of the light guide plate, so as to mitigate uneven luminance.

(2) In the configuration of (1) (where a plurality of reflection units are arranged at an uneven pitch), it is possible to set the height of the plurality of reflection units so as to be uniform along the first direction.

(3) In the embodiments, the height of the reflection units of the light emission reflection portion was set to be less than the height of the opposite plate surface-side prisms of the opposite plate surface-side prism portion, but it is possible, for example, to set the height of the reflection units to be approximately the same height as the opposite plate surface-side prisms. Furthermore, it is possible to set the height of the reflection units to be greater than the height of the opposite plate surface-side prisms, and in such a case, the reflection units continuously extend along the entire length of the light guide plate in the second direction.

(4) Aside from Embodiments 1 and 5, it is possible to appropriately modify the specific cross-sectional shape of the reflection units of the light emission reflection portion. The cross-sectional shape of the reflection units can be an isosceles triangle, for example. In addition, it is possible to modify the specific angle of each of the vertices of the reflection units with triangular cross-sections. Furthermore, specific values such as the height, width, and the interval in the first direction of the reflection units constituting the light emission reflection portion can be appropriately modified.

(5) In the embodiments above, the opposite plate surface-side prisms constituting the opposite plate surface-side prism portion have an isosceles triangular cross-sectional shape, but a configuration can be adopted in which the cross-sectional shape of the opposite plate surface-side prisms is, for example, a scalene triangle in which the sides all have different lengths, a right triangle, or the like.

(6) In the embodiments above, the light-exiting surface-side prisms constituting the light-exiting surface-side prism portion have an isosceles triangular cross-sectional shape, but a configuration can be adopted in which the cross-sectional shape of the light-exiting surface-side prisms is, for example, a scalene triangle in which the sides all have different lengths, a right triangle, or the like.

(7) Aside from the embodiments above, specific values such as the vertex angle, height, width, and the interval in the second direction of the opposite plate surface-side prisms constituting the opposite plate surface-side prism portion can be appropriately modified. Similarly, specific values such as the vertex angle, height, width, and the interval in the second direction of the light-exiting surface-side prisms constituting the light-exiting surface-side prism portion can be appropriately modified. Similarly, specific values such as the vertex angle, height, width, and the interval in the second direction of the light-exiting side prisms constituting the prism sheet can be appropriately modified.

(8) In the embodiments above, the opposite plate surface-side prism portion provided on the opposite plate surface of the light guide plate was described as being constituted of opposite plate surface-side prisms having triangular cross-sections, but instead of such an opposite plate surface-side prism portion, an opposite plate surface-side lenticular lens portion constituted of a plurality of cylindrical lenses having a substantially semicylindrical form with an axis direction matching the first direction (X axis direction) may be provided on the opposite plate surface of the light guide plate as an "opposite plate surface-side anisotropic light focusing portion".

(9) In the embodiments above, the prism sheet was described as being provided with light-exiting side prisms having triangular cross-sections, but instead of such light-exiting side prisms, a plurality of cylindrical lenses having a substantially semicylindrical form with an axis direction matching the first direction (X axis direction) may be provided on the prism sheet.

(10) In the embodiments above, the light-exiting surface-side prism portion or the light-exiting surface-side lenticular lens portion was described as being provided integrally on the light-exiting surface of the light guide plate, but a configuration can be adopted in which the light-exiting surface-side prism portion or the light-exiting surface-side lenticular lens portion is provided as a separate item on the light guide plate, and the separate light-exiting surface-side prism portion or light-exiting surface-side lenticular lens portion is disposed so as to coincide in position with the light-exiting surface of the light guide plate. In such a case, it is preferable that the index of refraction of the material forming the separate light-exiting surface-side prism portion or the light-exiting surface-side lenticular lens portion be the same as the index of refraction of the material forming the light guide plate. Furthermore, it is preferable that the material forming the separate light-exiting surface-side prism portion or the light-exiting surface-side lenticular lens portion be the same as the material forming the light guide plate.

(11) In Embodiment 2, a configuration was described in which the flat portions and the light-exiting surface-side prisms are arranged alternately and repeatedly in the second direction, but it is also possible to have a configuration in which a plurality of light-exiting surface-side prisms are sandwiched between two flat portions in the second direction.

(12) Aside from Embodiment 2, it is possible to appropriately modify the specific proportion taken up by the flat portions of the area of the light-exiting surface of the light guide plate. Similarly, in Embodiment 8, it is possible to appropriately modify the specific proportion of area taken up by the flat portions.

(13) In Embodiment 2, a case was described in which flat portions were provided on the light-exiting surface of the light guide plate, but it is also possible to provide flat portions on the opposite plate surface of the light guide plate. In such a case, the flat portions would be interposed between the plurality of opposite plate surface-side prisms arranged in the second direction and constituting the opposite plate surface-side prism portion.

(14) In Embodiment 3, a configuration was described in which the first light-exiting surface-side prisms have a similar cross-sectional shape to the second light-exiting surface-side prisms, but a configuration in which the first light-exiting surface-side prisms differ in cross-sectional shape from the second light-exiting surface-side prisms is also included in the present invention. Specifically, the vertex angle of the first light-exiting surface-side prisms may be different from the vertex angle of the second light-exiting surface-side prisms. Similarly, in Embodiment 9 as well, the tangent angle of the first cylindrical lens may differ from the tangent angle of the second cylindrical lens.

(15) In Embodiment 3, the light-exiting surface-side prism portion was described as being constituted of two types of light-exiting surface-side prisms having different heights, but the light-exiting surface-side prism portion can be constituted of three or more types of light-exiting surface-side prisms having different heights. Similarly, in Embodiment 9 as well, it is possible for the light-exiting surface-side lenticular lens portion to be constituted of three or more types of cylindrical lenses, each with differing heights.

(16) In Embodiment 3, the light-exiting surface-side prism portion was described as being constituted of two types of light-exiting surface-side prisms having different heights, but the present invention also includes a configuration in which the opposite plate surface-side prism portion is constituted of three or more types of opposite plate surface-side prisms having different heights. Similarly, two or more types of light-exiting side prisms having different heights may be provided on the prism sheet.

(17) Aside from Embodiment 4, it is possible to appropriately modify the specific tangent angle of the cylindrical lenses. Similarly, in Embodiments 8 and 9, it is possible to appropriately modify the specific tangent angle of the cylindrical lenses.

(18) In Embodiment 7, a case was described in which the vertex portions of the second light-exiting surface-side prisms were rounded, but the vertex portions of the first light-exiting surface-side prisms can also be similarly rounded. Furthermore, the vertex portions of the opposite plate surface-side prisms can also be rounded.

(19) In the embodiments above, only one prism sheet was included as an optical sheet, but it is possible to add other types of optical sheets (such as a diffusion sheet and a reflective type polarizing sheet). Also, it is possible to provide a plurality of prism sheets.

(20) In the embodiments above, one LED substrate is provided along the light-receiving face of the light guide plate, but the present invention also includes an arrangement in which two or more LED substrates are disposed along the light-receiving face of the light guide plate.

(21) In the embodiments above, one short edge face of the light guide plate is the light-receiving face and an LED substrate was provided so as to oppose the light-receiving face, but a configuration in which a long edge face of the light guide plate is the light-receiving face and an LED substrate is provided so as to oppose the light-receiving face is also included in the present invention. In such a case, the extension direction of the light-exiting side prisms, the light-exiting surface-side prisms, and the opposite plate surface-side prisms would be set to match the shorter side direction of the light guide plate, and the width direction (alignment direction) of the light-exiting side prisms, the light-exiting surface-side prisms, and the opposite plate surface-side prisms would be set to match the longer side direction of the light guide plate.

(22) Besides what was described in (21), the present invention also includes configurations in which a pair of short edge faces of the light guide plate are the light-receiving faces and a pair of LED substrates are provided so as to oppose the respective light-receiving faces, or in which a pair of long edge faces of the light guide plate are the light-receiving faces and a pair of LED substrates are provided so as to oppose the respective light-receiving faces.

(23) In the embodiments, the light guide plate is described as being rectangular, but the light guide plate may be square. In addition, the light guide plate need not necessarily be a perfect rectangle, and cutouts may be formed in portions of the outer edges.

(24) In the embodiments, top-emitting type LEDs were used, but the present invention can also be applied to a configuration using side-emitting type LEDs in which side faces that are adjacent to the mounting surface by which the LEDs are mounted onto the LED substrate is the light-emitting surface.

(25) In the embodiments above, the touch panel pattern on the touch panel was of a projected capacitive type, but besides this, the present invention can be applied to a surface capacitive type, a resistive film type, an electromagnetic induction type touch panel pattern, or the like.

(26) Instead of the touch panel in the embodiments above, a parallax barrier panel (switching liquid crystal panel) may be formed, the parallax barrier panel having a parallax barrier pattern for allowing a viewer to see a three dimensional image (3D image) by separating by parallax images displayed in the display surface of the liquid crystal panel. In addition, it is possible to have both a parallax barrier panel and a touch panel.

(27) It is also possible to form a touch panel pattern on the parallax barrier panel in (26) such that the parallax barrier panel doubles as a touch panel.

(28) In the embodiments above, the display size of the liquid crystal panel used in the liquid crystal display device is approximately 20 inches, but the specific display size of the liquid crystal panel can be appropriately modified to a size other than 20 inches. In particular, if the display size is only a few inches, it is suitable to be used in electronic devices such as smartphones.

(29) In the respective embodiments above, the colored portions of the color filters provided in the liquid crystal panel included the three colors of R, G, and B, but it is possible for the colored portions to include four or more colors.

(30) In the respective embodiments above, LEDs were used as the light source, but other types of light sources such as organic EL elements may also be used.

(31) In the embodiments above, the frame is made of metal, but can also be made of a synthetic resin.

(32) In the respective embodiments above, the cover panel is made of tempered glass that is tempered by being chemically strengthened, but a tempered glass that is strengthened by air cooling (physical strengthening) naturally can be used.

(33) In the respective embodiments above, a tempered glass being used as the cover panel was shown as an example, but an ordinary glass material (non-tempered glass) or a synthetic resin can also be used.

(34) In the respective embodiments above, a cover panel is used on the liquid crystal display device, but the cover panel can be omitted. Similarly, the touch panel can also be omitted.

(35) In the embodiments above, TFTs are used as the switching elements in the liquid crystal display device, but the present invention can be applied to a liquid crystal display device that uses switching elements other than TFTs (thin film diodes (TFD), for example), and, besides a color liquid crystal display device, the present invention can also be applied to a black and white liquid crystal display device.

DESCRIPTION OF REFERENCE CHARACTERS

10 liquid crystal display device (display device)
11 liquid crystal panel (display panel)
11a, 11b substrate
12 backlight device (illumination device)
17 LED (light source)
19, 119, 219, 319, 419, 619, 719, 819 light guide plate
19a, 119a, 319a, 419a, 719a, 819a light-exiting surface
19b light-receiving face
19c, 119c opposite plate surface (plate surface)
19e side edge face (pair of edge faces not including light-receiving face)
41, 441 light emission reflection portion
41a, 441a reflection unit
41aS split reflection unit
42, 242, 542, 642 prism sheet (light-exiting side anisotropic light focusing portion)
42a, 542a light-exiting side prism (light-exiting side light focusing unit)

43, 143, 243, 643 light-exiting surface-side prism portion (light-exiting surface-side anisotropic light focusing portion)
43a, 143a light-exiting surface-side prism (light-exiting surface-side light focusing unit)
44 opposite plate surface-side prism portion (opposite plate surface-side anisotropic light focusing portion)
44a opposite plate surface-side prism (opposite plate surface-side light focusing unit)
44a2 vertex portion
45, 745 flat portion
46, 746, 846 light-exiting surface-side lenticular lens portion (light-exiting surface-side anisotropic light focusing portion)
46a, 746a cylindrical lens (light-exiting surface-side light focusing unit)
243aA first light-exiting surface-side prism (first light-exiting surface-side light focusing unit)
243aA1 vertex portion
243aB, 643aB second light-exiting surface-side prism (second light-exiting surface-side light focusing unit)
243aB1, 643aB1 vertex portion
846aA first cylindrical lens (first light-exiting surface-side light focusing unit)
846aB second cylindrical lens (second light-exiting surface-side light focusing unit)
C gap
θv1 vertex angle of light-exiting side prism 42a
θv2 vertex angle of light-exiting surface-side prism 43a
θv3 vertex angle of opposite plate surface-side prism 44a

What is claimed is:

1. An illumination device, comprising:
a light source;
a light guide plate having a rectangular plate shape, a light-receiving face formed from at least one of a pair of edge faces forming opposing sides among outer edge faces of the light guide plate and into which light emitted by the light source is radiated, a light-exiting surface formed from one plate surface of the light guide plate and from which light exits, and an opposite plate surface formed from another plate surface of the light guide plate; and
a light-exiting side anisotropic light focusing member disposed on a light-exiting side of the light guide plate, the light-exiting side anisotropic light focusing member being formed by arranging a plurality of light-exiting side light focusing units that extend along a first direction in a second direction, the first direction being parallel to a pair of edge faces of the light guide plate that do not include the light-receiving face, and the second direction being perpendicular to the first direction,
wherein the light guide plate further includes:
a light-exiting surface-side anisotropic light focusing portion that is disposed integrally with the light guide plate in the light-exiting surface of the light guide plate, and that is formed by arranging a plurality of light-exiting surface-side light focusing units, extending in the first direction, along the second direction;
a light emission reflection portion that is disposed integrally with the light guide plate in the opposite plate surface of the light guide plate and that is formed by arranging a plurality of reflection units, extending in the second direction, along the first direction with gaps therebetween; and
an opposite plate surface-side anisotropic light focusing portion that is disposed in the opposite plate surface of the light guide plate, and that is formed by arranging a plurality of opposite plate surface-side light focusing units, extending in the first direction, along the second direction,
wherein the opposite plate surface-side anisotropic light focusing portion is configured such that the opposite plate surface-side light focusing units are opposite plate surface-side prisms having a substantially triangular cross-section, and
wherein, in the light emission reflection portion, the reflection units are formed by partially cutting vertex portions of the opposite plate surface-side light focusing units of the opposite plate surface-side anisotropic light focusing portion, thereby forming openings along the second direction.

2. The illumination device according to claim 1, wherein, in the light emission reflection portion, the reflection units are constituted by a plurality of split reflection units that are arranged discontinuously along the second direction with gaps therebetween.

3. The illumination device according to claim 1,
wherein the light-exiting side anisotropic light focusing portion is configured such that the light-exiting side light focusing units are light-exiting side prisms having a substantially triangular cross-section, and
wherein the light-exiting side prisms have a smaller vertex angle than the opposite plate surface-side prisms.

4. The illumination device according to claim 3, wherein the light-exiting side prisms have a vertex angle of 90°, whereas the opposite plate surface-side prisms have a vertex angle of 100° to 150°.

5. The illumination device according to claim 3,
wherein the light-exiting surface-side anisotropic light focusing portion is configured such that the light-exiting surface-side light focusing units are light-exiting surface-side prisms having a substantially triangular cross-section, and
wherein the light-exiting surface-side prisms have a larger vertex angle than the light-exiting side prisms.

6. The illumination device according to claim 5, wherein the light-exiting side prisms have a vertex angle of 90°, whereas the light-exiting surface-side prisms have a vertex angle of 100° to 150°.

7. The illumination device according to claim 6, wherein the light-exiting surface-side prisms have a vertex angle of 110°, whereas the opposite plate surface-side prisms have a vertex angle of 140°.

8. The illumination device according to claim 1, wherein, in the light-exiting surface-side anisotropic light focusing portion, the light-exiting surface-side light focusing units are cylindrical lenses having arc-shaped surfaces.

9. The illumination device according to claim 1, wherein the opposite plate surface-side anisotropic light focusing portion is formed integrally with the light guide plate.

10. The illumination device according to claim 1, wherein flat portions that are flat along the first direction and the second direction are disposed in the light-exiting surface of the light guide plate between the light-exiting surface-side light focusing units that are adjacent to each other in the second direction.

11. The illumination device according to claim 1,
wherein a plurality of said light-exiting surface-side light focusing units included in the light-exiting surface-side anisotropic light focusing portion include a first light-exiting surface-side light focusing unit having a vertex portion at a relatively low position, and a second light-exiting surface-side light focusing unit having a vertex portion at a relatively high position, and wherein a gap is present between the first light-exiting surface-side light focusing unit and the light-exiting side anisotropic light focusing portion.

12. A display device, comprising:

the illumination device according to claim 1; and a display panel that performs display using light from the illumination device.

13. The display device according to claim 12, wherein the display panel is a liquid crystal panel including a pair of substrates and liquid crystal sealed therebetween.

* * * * *